United States Patent [19]

Sheikh

[11] 4,058,850
[45] Nov. 15, 1977

[54] PROGRAMMABLE CONTROLLER

[75] Inventor: Sikander Sheikh, Webster, N.Y.

[73] Assignee: Xerox Corporation, Stamford, Conn.

[21] Appl. No.: 496,667

[22] Filed: Aug. 12, 1974

[51] Int. Cl.² .................... G06F 9/06; G03G 15/00
[52] U.S. Cl. ........................................ 364/900; 355/14
[58] Field of Search ............... 235/151.1, 151; 444/1;
340/172.5; 355/3, 14, 16, 17, 24; 178/6.6 A;
346/74 R, 74 ES

[56] References Cited

U.S. PATENT DOCUMENTS

| 3,593,299 | 2/1971 | Driscoll et al. | 340/172.5 |
| 3,593,313 | 7/1971 | Tomaszewski et al. | 340/172.5 |
| 3,676,851 | 7/1972 | Eastman | 340/172.5 |
| 3,760,375 | 9/1973 | Irwin et al. | 340/172.5 |
| 3,768,076 | 10/1973 | Recoque | 340/172.5 |

Primary Examiner—Joseph F. Ruggiero

[57] ABSTRACT

An improved programmable controller which includes a non-destructive memory program storage means wherein the controller is programmable by altering the program by substitution of the non-destructive memory storage means. The memory program storage means is comprised of a first memory portion which stores an operation program for the apparatus and a second memory portion which controls the sequence of execution of the operation program. The second memory portion can simultaneously address a location in the first memory portion and a location in an input-output data interface memory.

9 Claims, 38 Drawing Figures

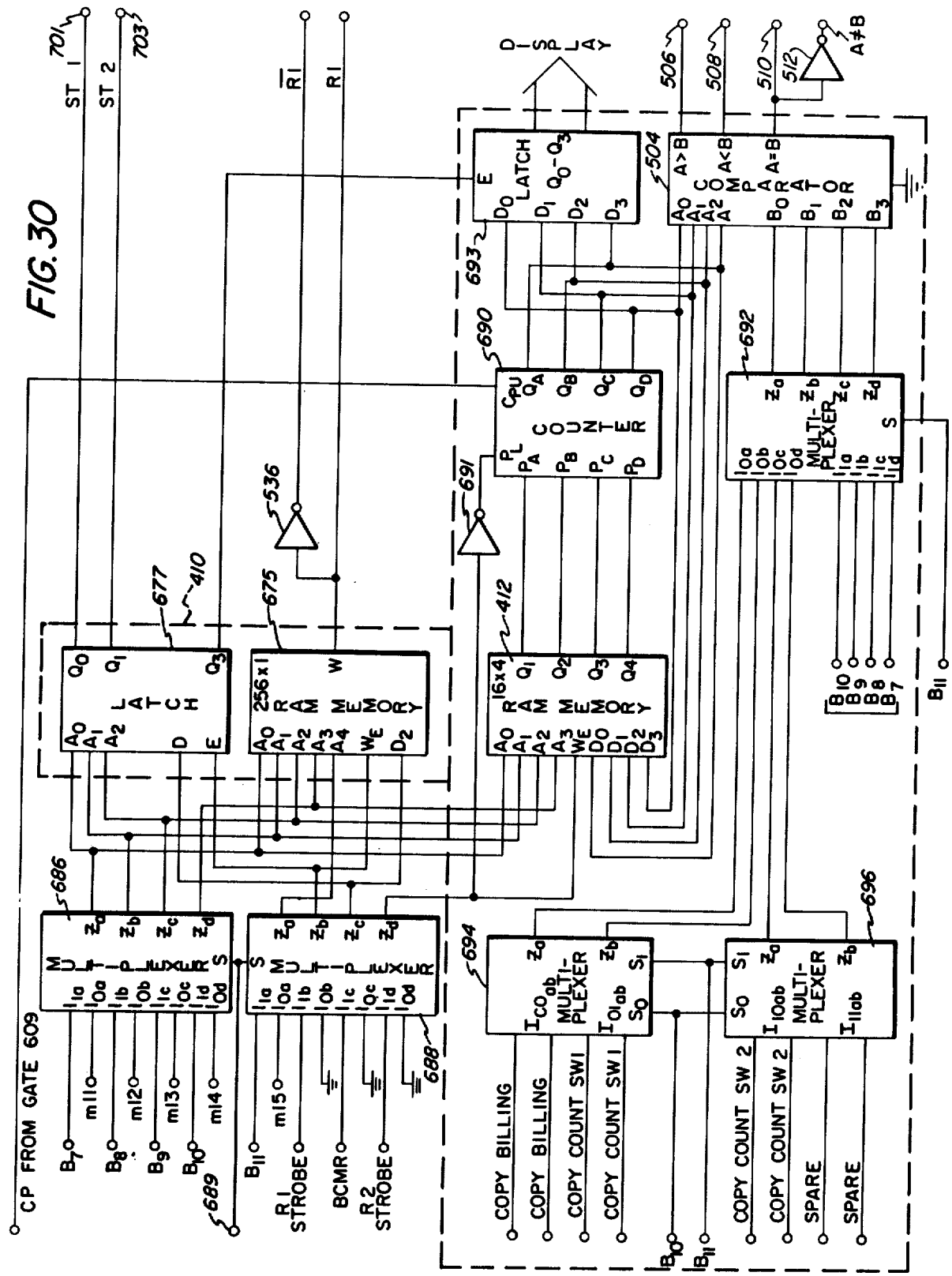

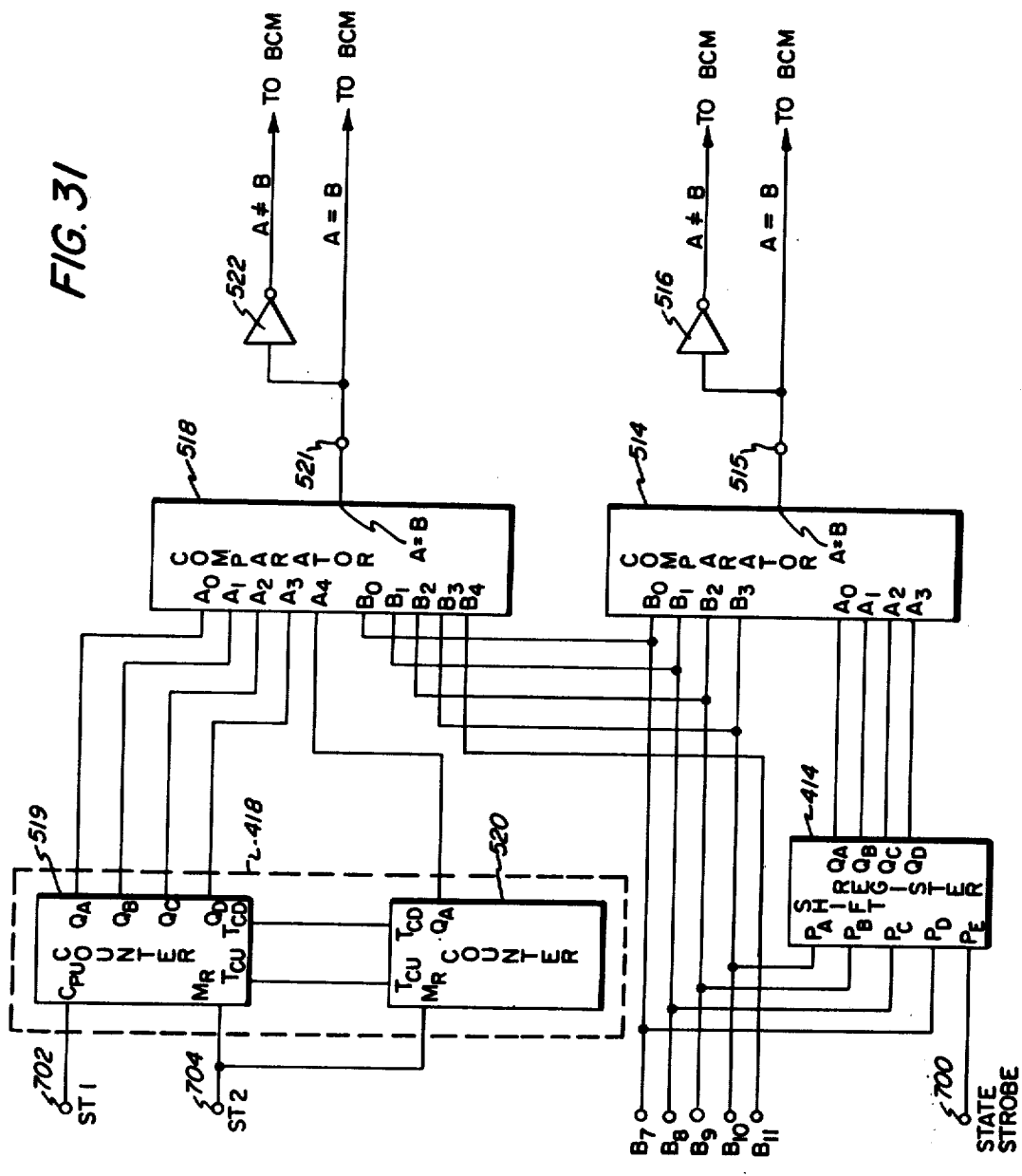

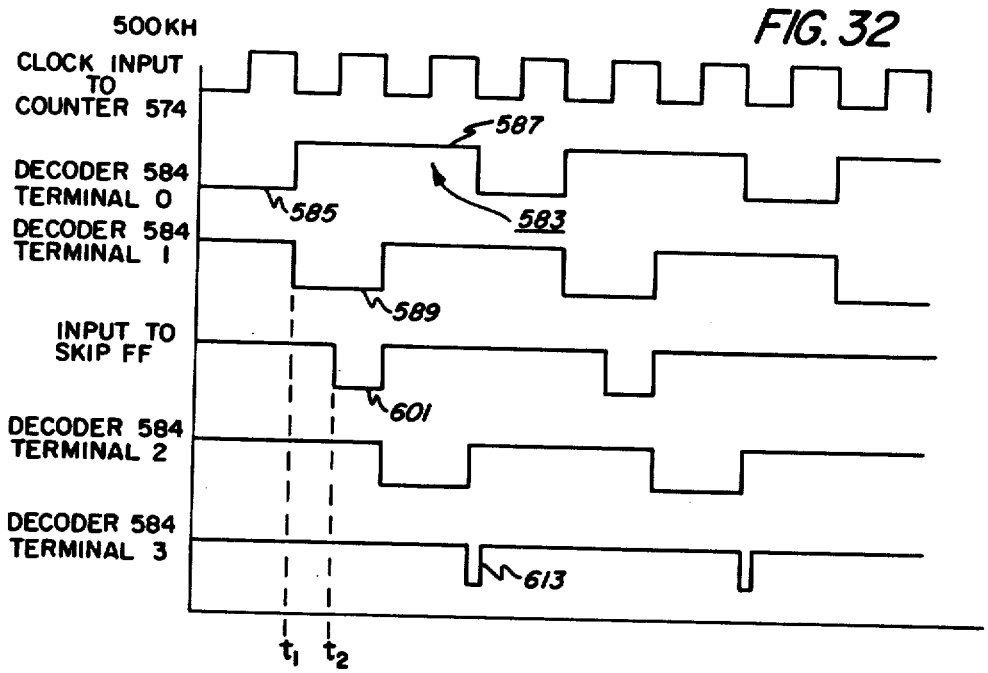
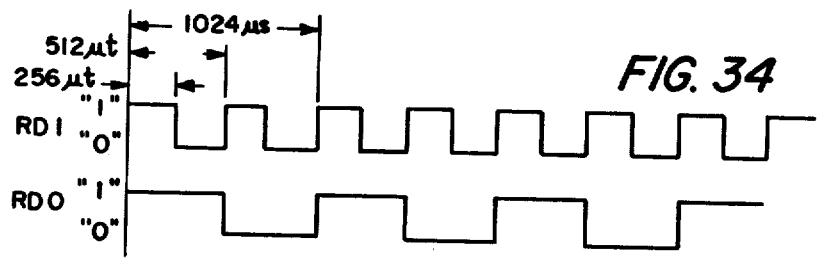
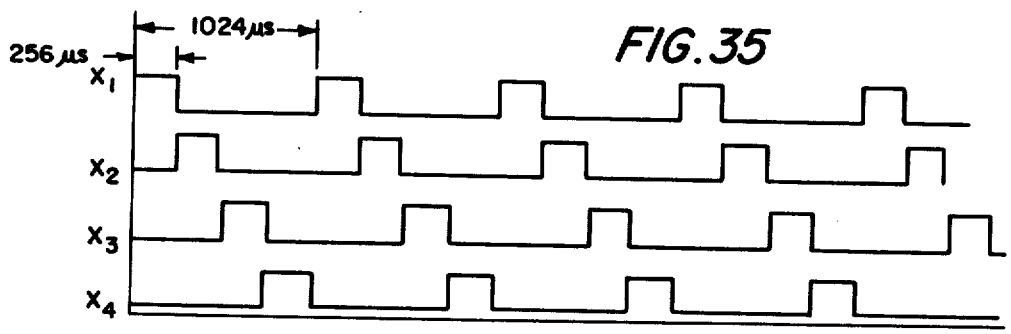

PROGRAMMABLE CONTROLLER

This invention relates to electrostatographic copying apparatus and more particularly to an improved means for controlling the operation of such apparatus.

The electrostatographic reproduction of an image by forming a latent electrostatic image, developing the latent image by contacting the same with a toner material and transferring the image to a support body for permanent record is known in the art. In carrying out this reproduction technique, various components of the apparatus are actuated in a predetermined sequence which at times is conditioned upon various apparatus operating parameters. In addition, with relatively high speed multicopy machines wherein several sheets of record material may be simultaneously in process in the machine, the progress of each sheet of record material through the apparatus is tracked in order to account for the copies and in order to anticipate paper jams and take the necessary (programmed) corrective action. The complexity of an apparatus of this type is further complicated in the case of color reproduction since the selection of one of a number of color modes of operation must be provided. Finally, present day billing systems for electrostatographic reproduction systems include means for accounting not merely for the number of copies reproduced but accounting for and billing for the number of copies reproduced in accordance with the number of copies produced from a single document.

Operation of reproduction apparatus having the above capabilities requires a relatively complex control arrangement. The control is required, among other things, to remember the one of many operating states that the machine is operating in at any one time, to correlate the operation of the various actuated components with respect to the position of a photoreceptor, to monitor the condition of various switches including operator control switches, material supply indicating switches and interlocks, to sense various operating parameters and changes therein and to condition machine events upon these parameters, and to control the sequence of machine events in a predetermined manner.

In a known arrangement, a digital, "hard-wired" control system is provided for effecting these operations. While this arrangement has provided satisfactory and useful service, it is at times desirable to provide modifications on a machine-to-machine basis, to vary control characteristics of a production run of machines and to provide unique operating characteristics for different machines. The modification of present day apparatus control systems to account for these variations is relatively difficult to accomplish without undesirably large expenditures in cost and time. It is desirable to provide a control arrangement for an electrostatographic reproduction apparatus which is adapted to be readily modified in order to vary control characteristics of the apparatus.

Accordingly, it is an object of the present invention to provide an improved control arrangement for an electrostatographic reproduction apparatus.

Another object of the invention is to provide a control arrangement for an electrostatographic reproduction apparatus of relatively low cost and size.

Another object of the invention is to provide a control arrangement for an electrostatographic apparatus which may be readily modified in order to vary the control functions.

Another object of the invention is to provide a sequential control arrangement for an electrostatographic apparatus wherein the sequence as well as the order of execution of events by the control arrangement can be readily modified.

Another object of the invention is to provide a microprogrammed controller for an electrostatographic reproduction apparatus.

Another object of the invention is to provide a microprogrammed, digital controller of improved logical organization for controlling an electrostatographic reproduction apparatus.

A further object of the invention is to provide a microprogrammed controller having storage means and a control organization which is arranged for optimizing the capacity of storage necessary for use with the controller.

Another object of the invention is to provide a microprogrammed controller having means for simultaneously addressing storage and input/output buffer memory locations.

Another object of the invention is to provide a microprogrammed controller which is adapted for simultaneously reading and writing information which is stored in an input/output buffer memory of the controller.

In accordance with features of the present invention, a copier apparatus control means comprises a digital processor which is adapted for storing and executing a stored apparatus control program. The logical organization of the processor is relatively simplified by employing nondestructive memory program storage means and control of the apparatus is programmable by altering the program through substitution of the nondestructive memory means.

In accordance with other features of the invention, the digital processor includes a first nondestructive memory for storing an execution program and a second nondestructive memory for effecting sequence control of the processor in accordance with a program stored in this memory. A third nondestructive memory which stores a processor control program is provided for generating control signals for the processor. Control of the apparatus is programmable by altering the execution program, or the sequence control program or the processor control program or combinations of these programs through substitution of nondestructive memory means.

In accordance with another feature of the invention, the storage requirements of the memory means of the processor are substantially reduced by providing for the simultaneous addressing of memory storage elements in an input information buffer and an output data buffer for the controller.

The speed of operation of the controller is enhanced and asynchronous operation of the controller with respect to an input output interface is provided by simultaneously reading and writing in the input and output memory buffers of the interface.

These and other objects and features of the invention will become apparent with reference to the following specification and to the drawings wherein.

Figure 2:
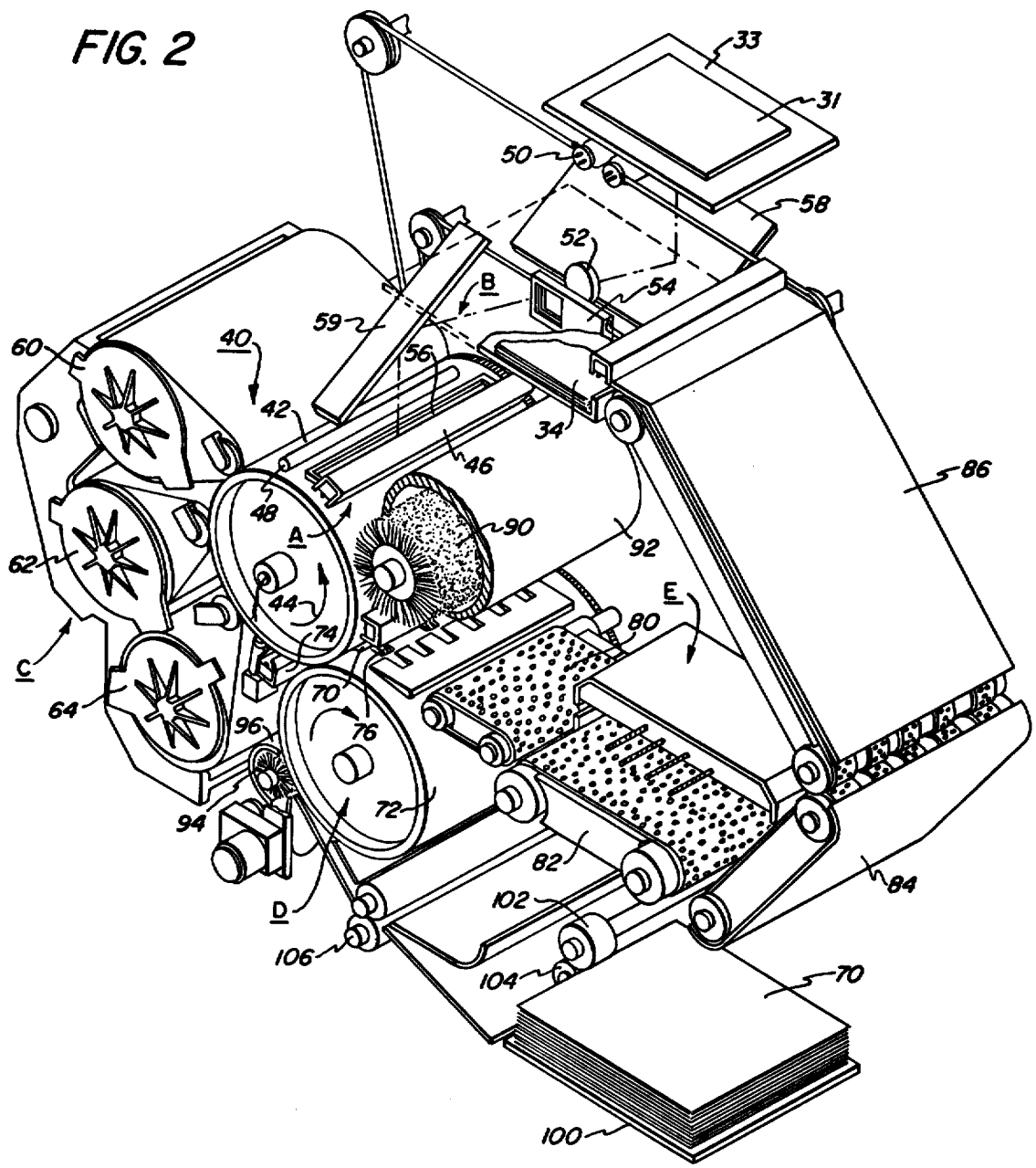
FIG. 2 is an enlarged perspective view of a component assembly of the apparatus of FIG. 1.
Figure 21:
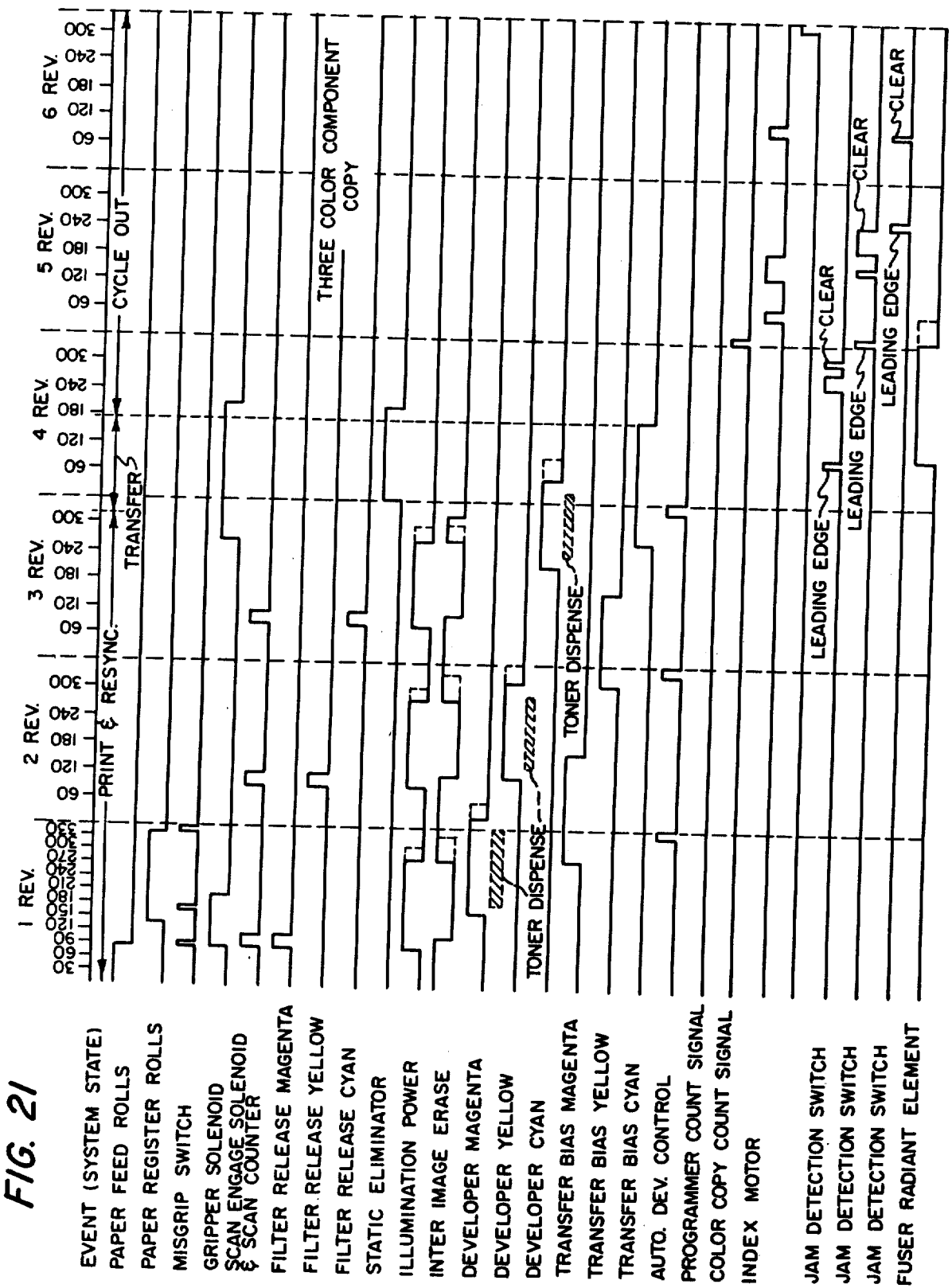
Figure 22:
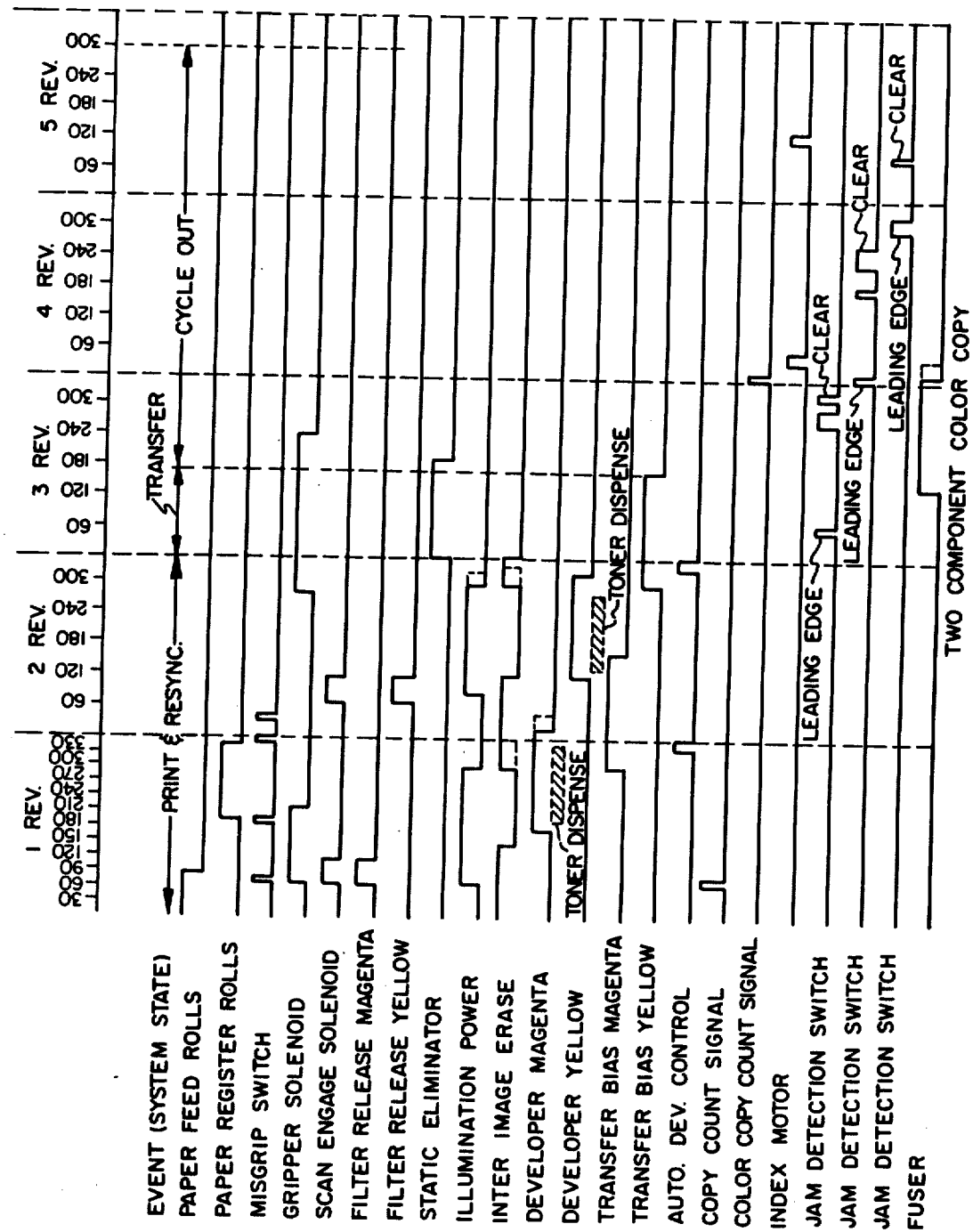
Figure 23:
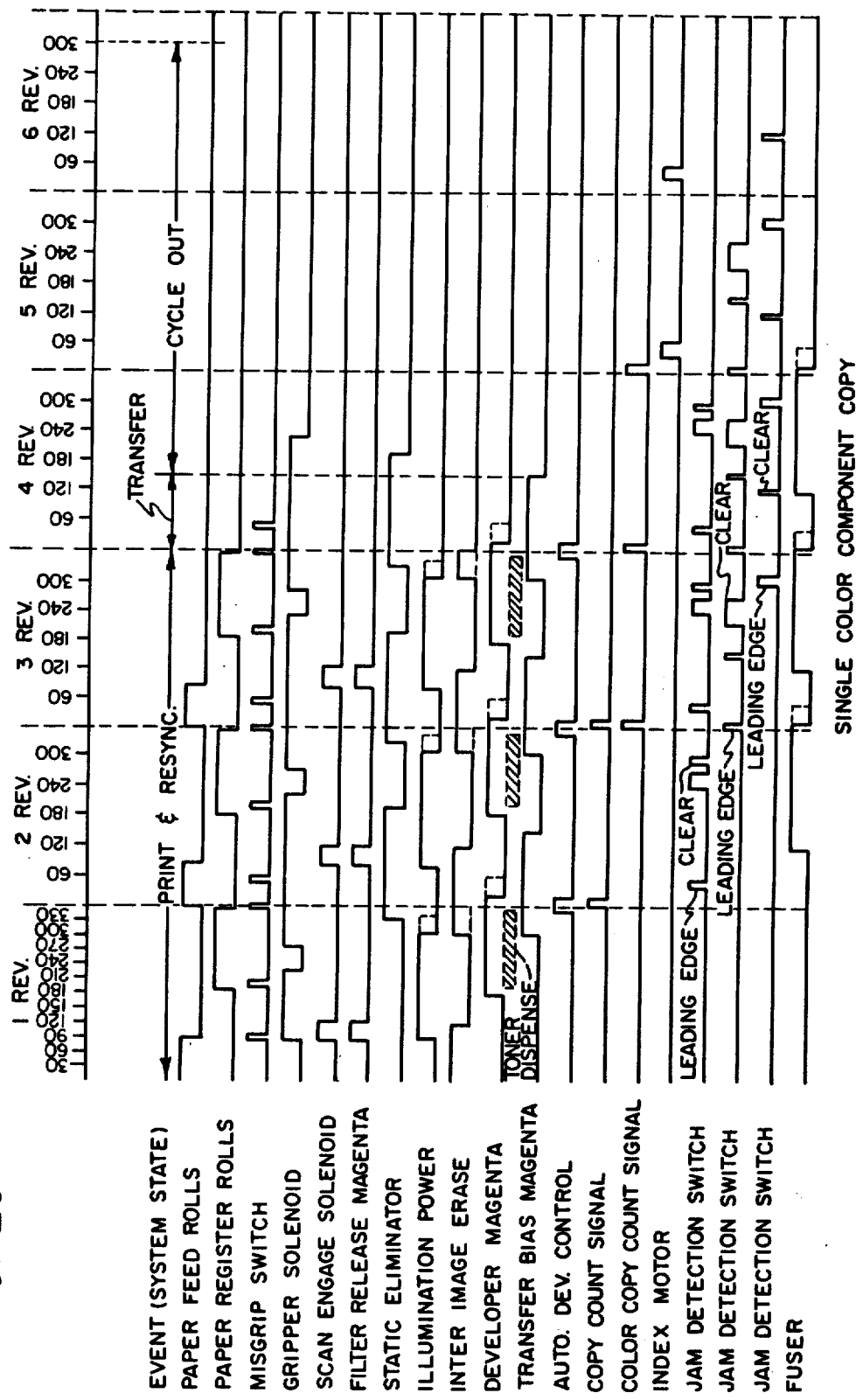

FIGS. 21, 22, and 23 are diagrams illustrating the timing of various events occurring during the operation of the apparatus of FIG. 2 when the apparatus operates in different modes.

Figure 24:
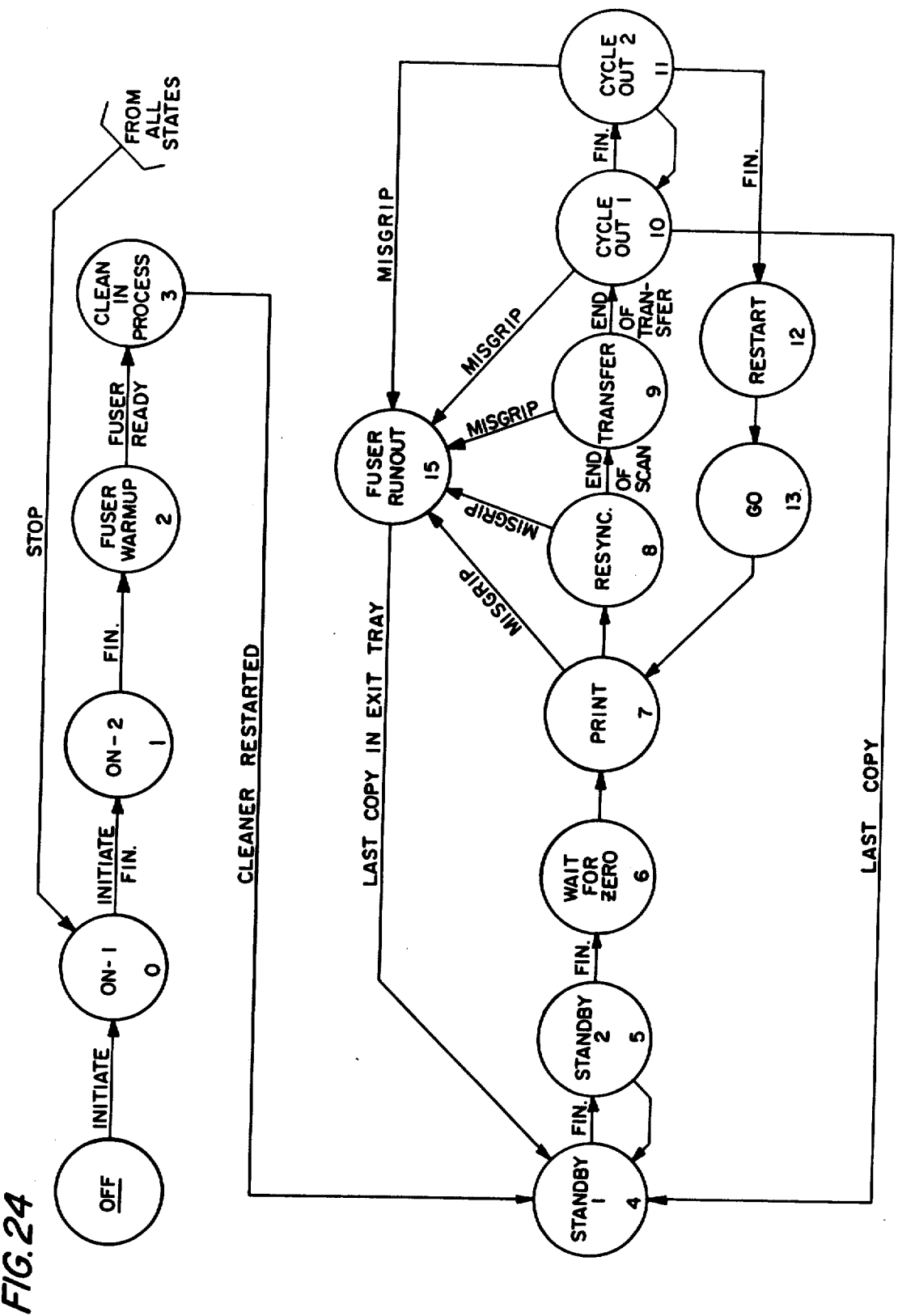
Figure 25:
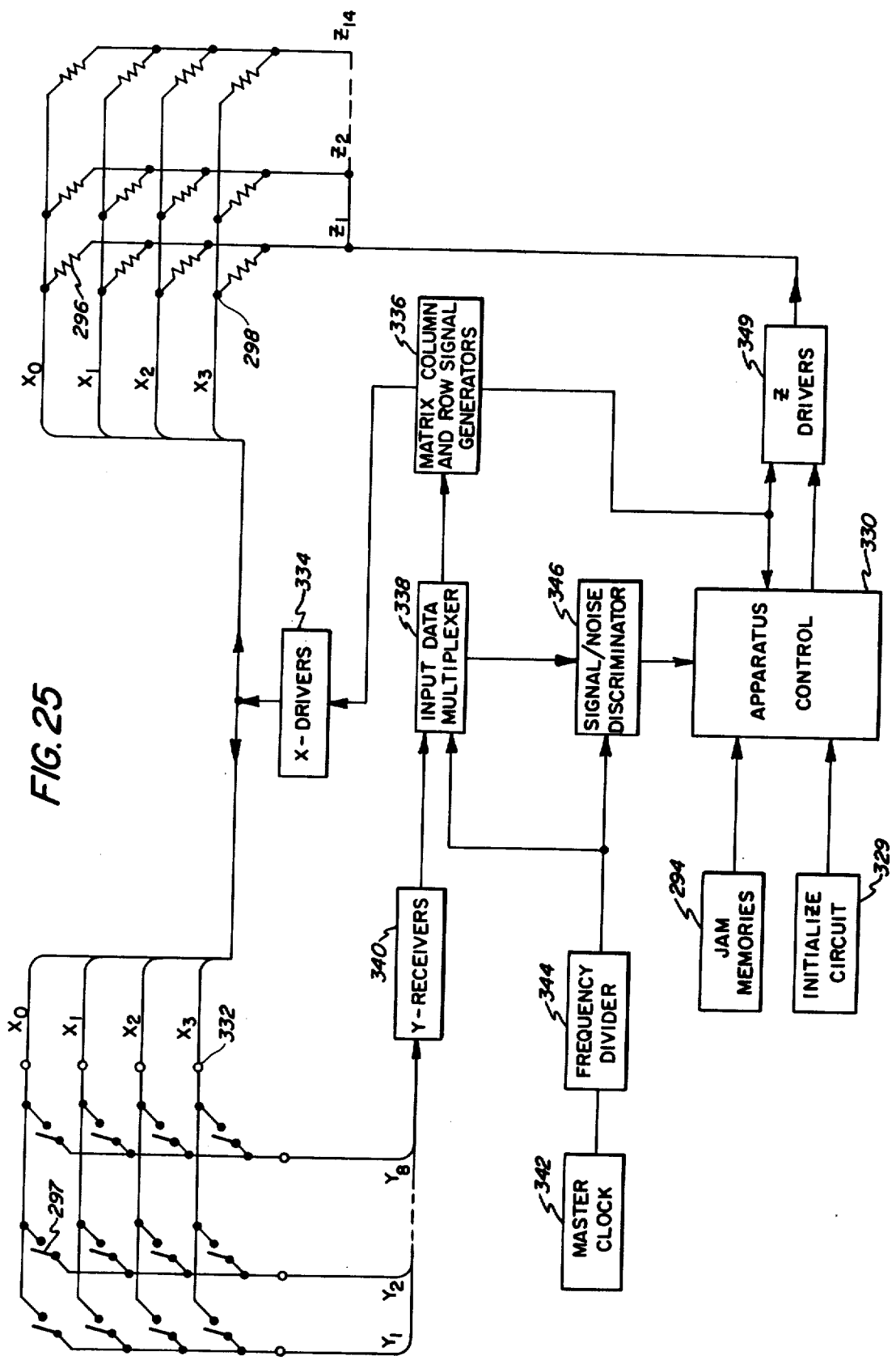
Figure 26:
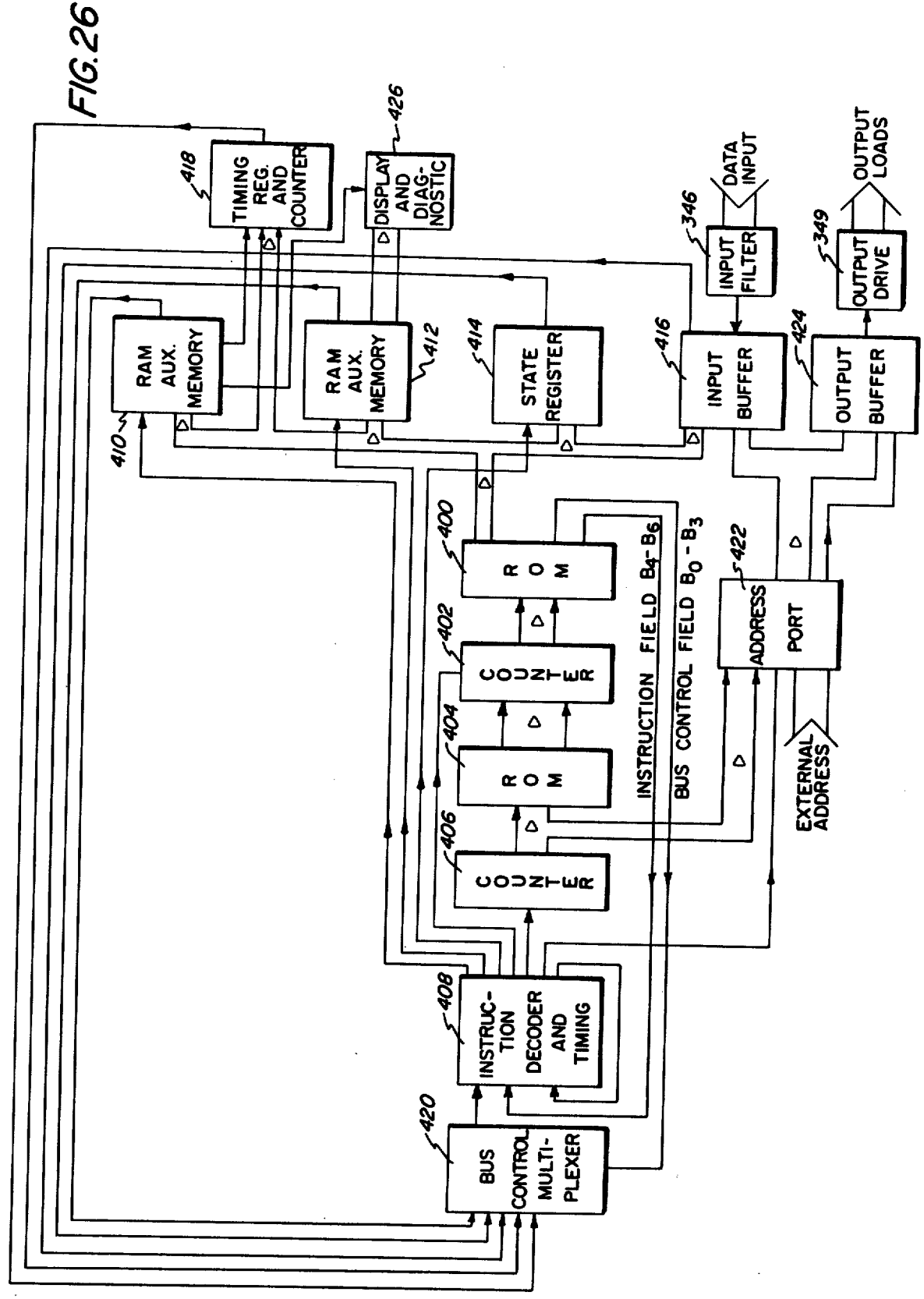
Figure 27:
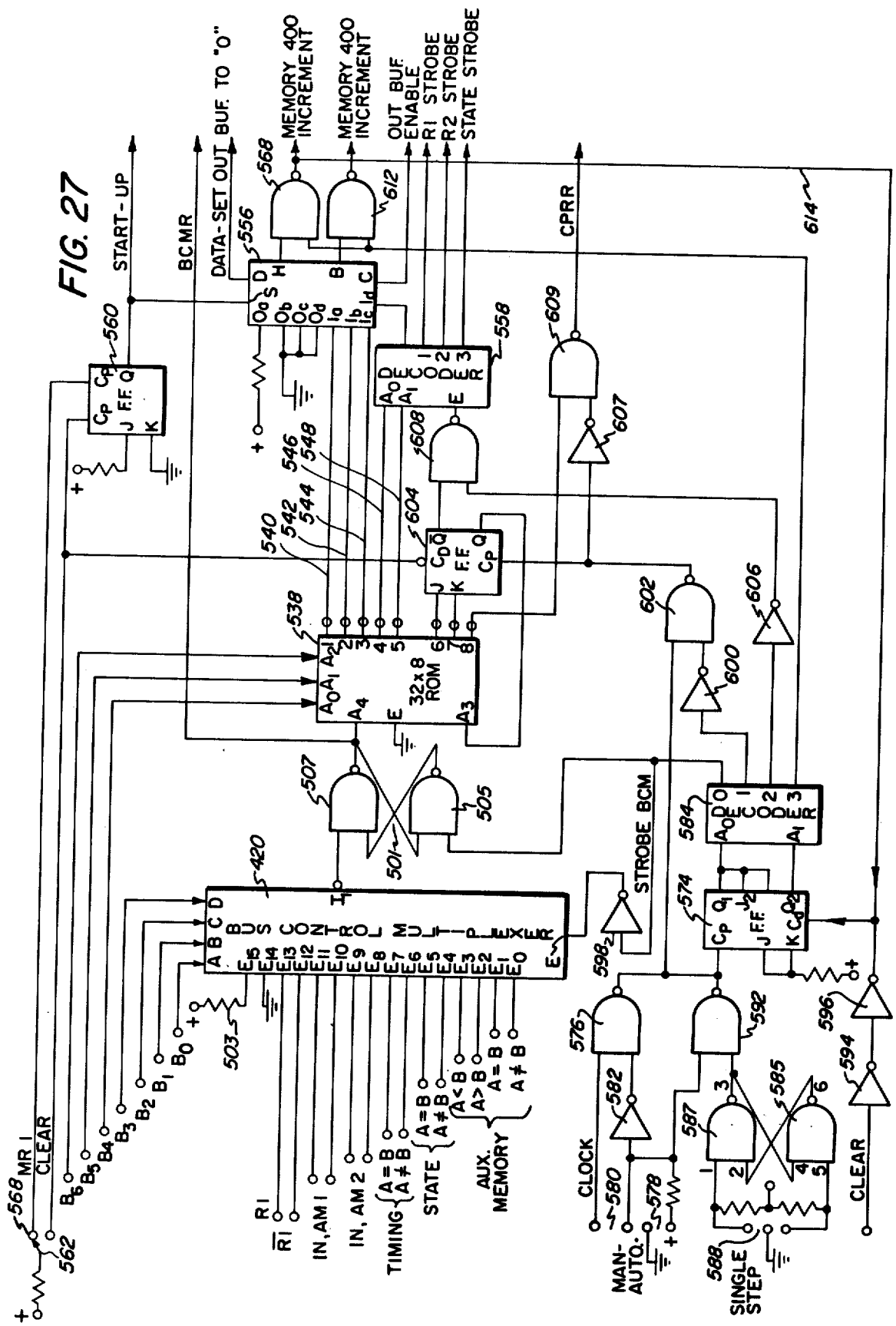
Figure 28:
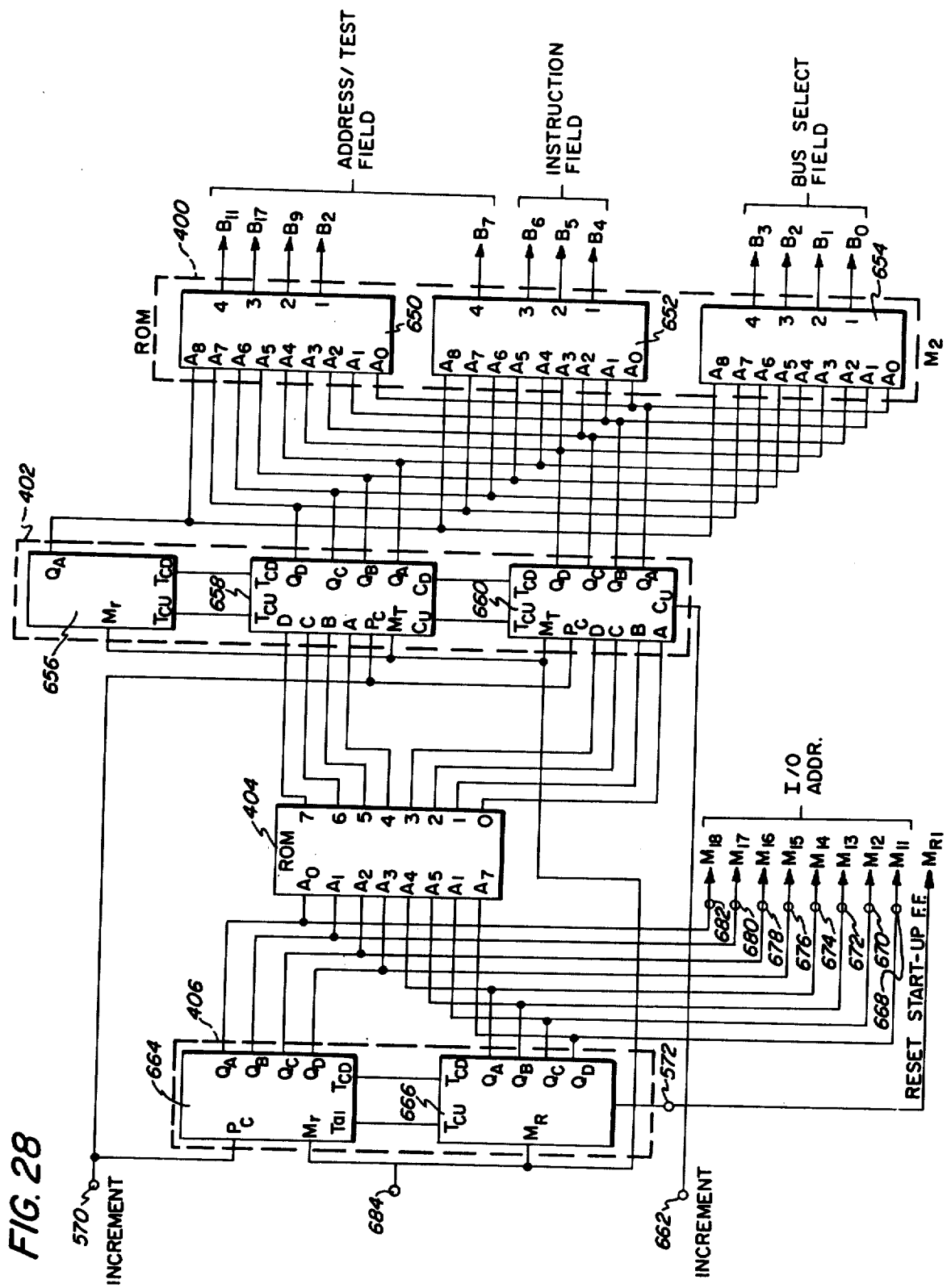
Figure 29:
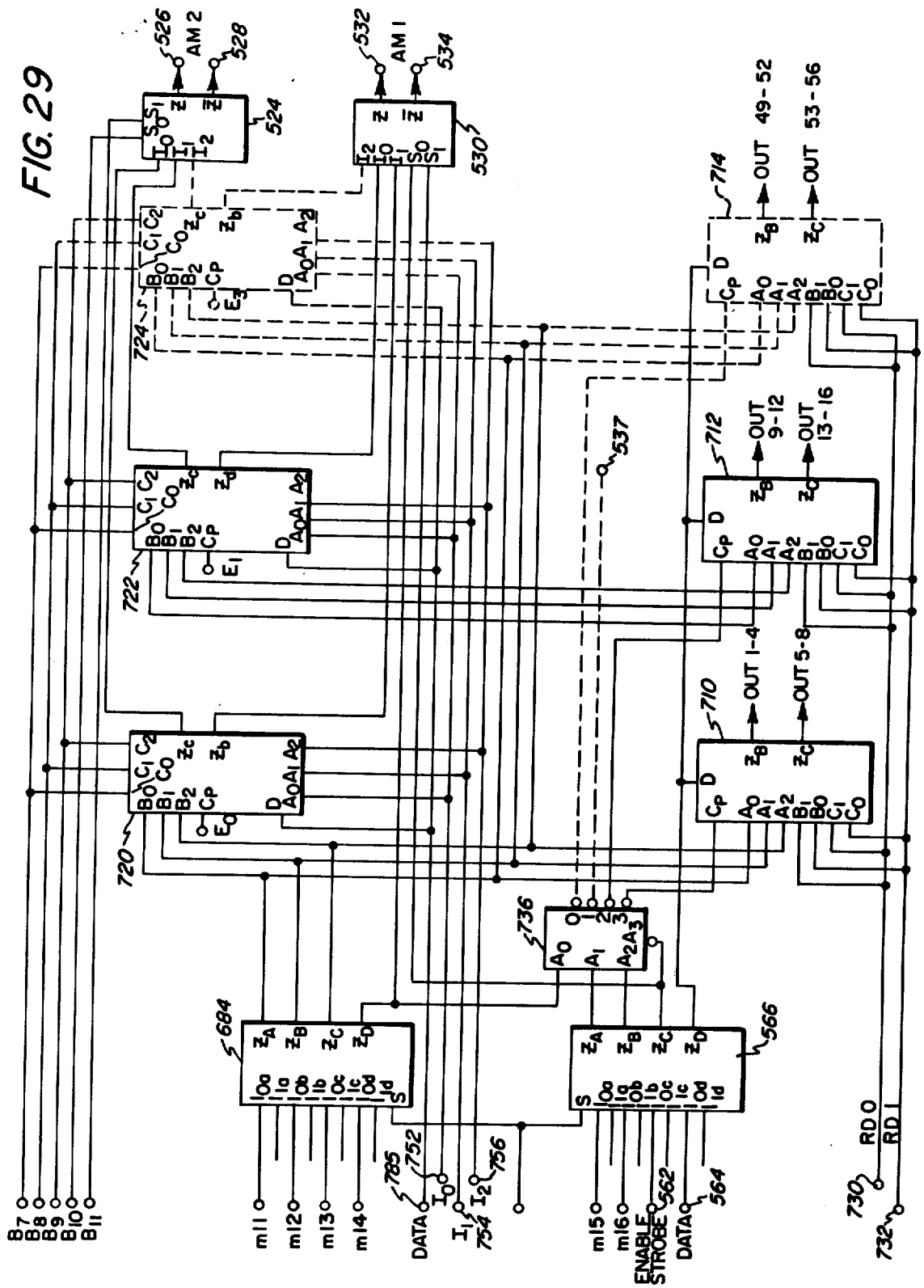
Figure 33:
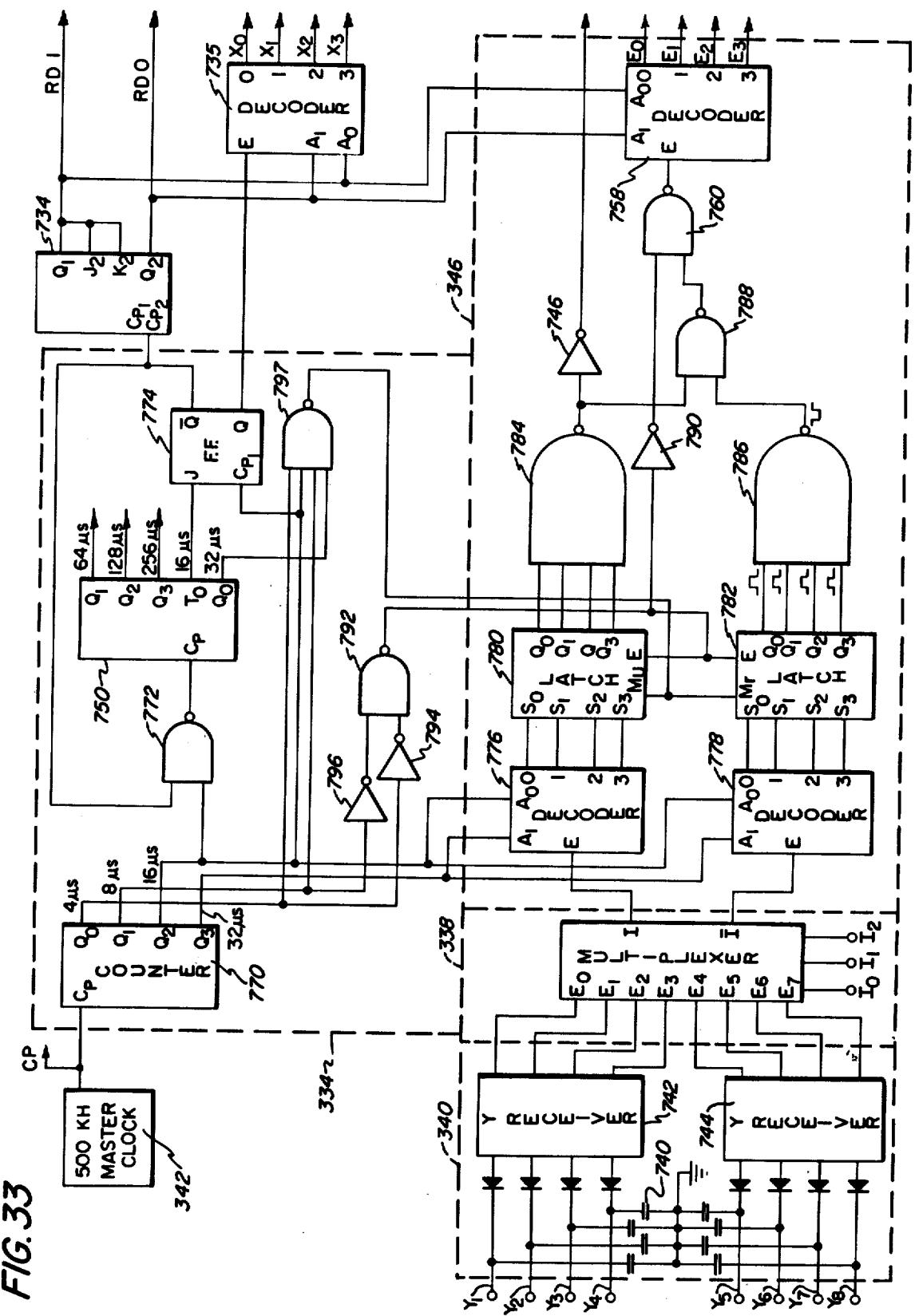

FIG. 24 is a flow diagram illustrating the sequence of states describing the operation of the apparatus of FIG. 2;

FIG. 25 is a schematic diagram illustrating an electrical control means for the apparatus of FIG. 2;

FIG. 26 is a schematic diagram in block form of a digital processor employed with the circuit arrangement of FIG. 25 and which is constructed in accordance with one embodiment of the invention;

FIG. 27 is a schematic diagram in block form of an instruction decoding and timing subsection of the processor of FIG. 26;

FIG. 28 is a schematic diagram in block form of memory storage means employed with the processor of FIG. 26;

FIG. 29 is a schematic diagram in block form of an addressport and input and output buffer memory elements employed with the processor of FIG. 26;

FIG. 30 is a schematic diagram in block form of an auxiliary memory arrangement employed with the processor of FIG. 26;

FIG. 31 is a schematic diagram in block form of apparatus state and timing means employed with the processor of FIG. 26;

FIG. 32 is a diagram of the various waveforms occurring during the execution of an instruction cycle;

FIG. 33 is a schematic diagram in block form of frequency dividing and input signal multiplexing and noise discriminating means employed with the circuit arrangement of FIG. 25; and, FIGS. 34 and 35 are diagrams of the waveforms provided by the circuit arrangements of FIG. 33.

A detailed description of the invention, as given in this specification, is organized in accordance with the following index which is presented for the convenience of the reader.

GENERAL DESCRIPTION OF REPRODUCTION APPARATUS
DETAILED DESCRIPTION OF THE APPARATUS
  IMAGING
  DEVELOPMENT
  AUTOMATIC DEVELOPMENT CONTROL
  TRANSFER ROLL
  FUSING
  SUPPORT MATERIAL HANDLING
  JAM MEMORY
  COPY ACCOUNTING
  VISUAL INDICATORS
  MACHINE CONDITION INDICATORS
  EVENT TIMING
  APPARATUS STATES
APPARATUS CONTROL
  GENERAL
  MATRIX ARRAY
  FREQUENCY DIVISION
  CONTROLLER
  INSTRUCTION WORD
  INSTRUCTION CODES
  INPUT OUTPUT INSTRUCTIONS
  MEMORY/REGISTER LOAD INSTRUCTIONS
  SKIP INSTRUCTIONS
  JUMP INSTRUCTIONS
DETAILED DESCRIPTION OF CONTROLLER
  BUS CONTROL MULTIPLEXER
  INSTRUCTION DECODER
  INSTRUCTION CYCLE
  ROM MEMORIES
  AUXILIARY MEMORIES
  MACHINE STATE AND TIMING
  INPUT-OUTPUT BUFFERS
DETAILED DESCRIPTION OF FREQUENCY DIVIDER AND NOISE DESCRIMINATOR
Programs
  EXECUTION PROGRAM
  SEQUENCE CONTROL PROGRAM
  PROCESSOR CONTROL PROGRAM
COMPONENTS
SUMMARY

GENERAL DESCRIPTION OF REPRODUCTION APPARATUS

Figure 1:
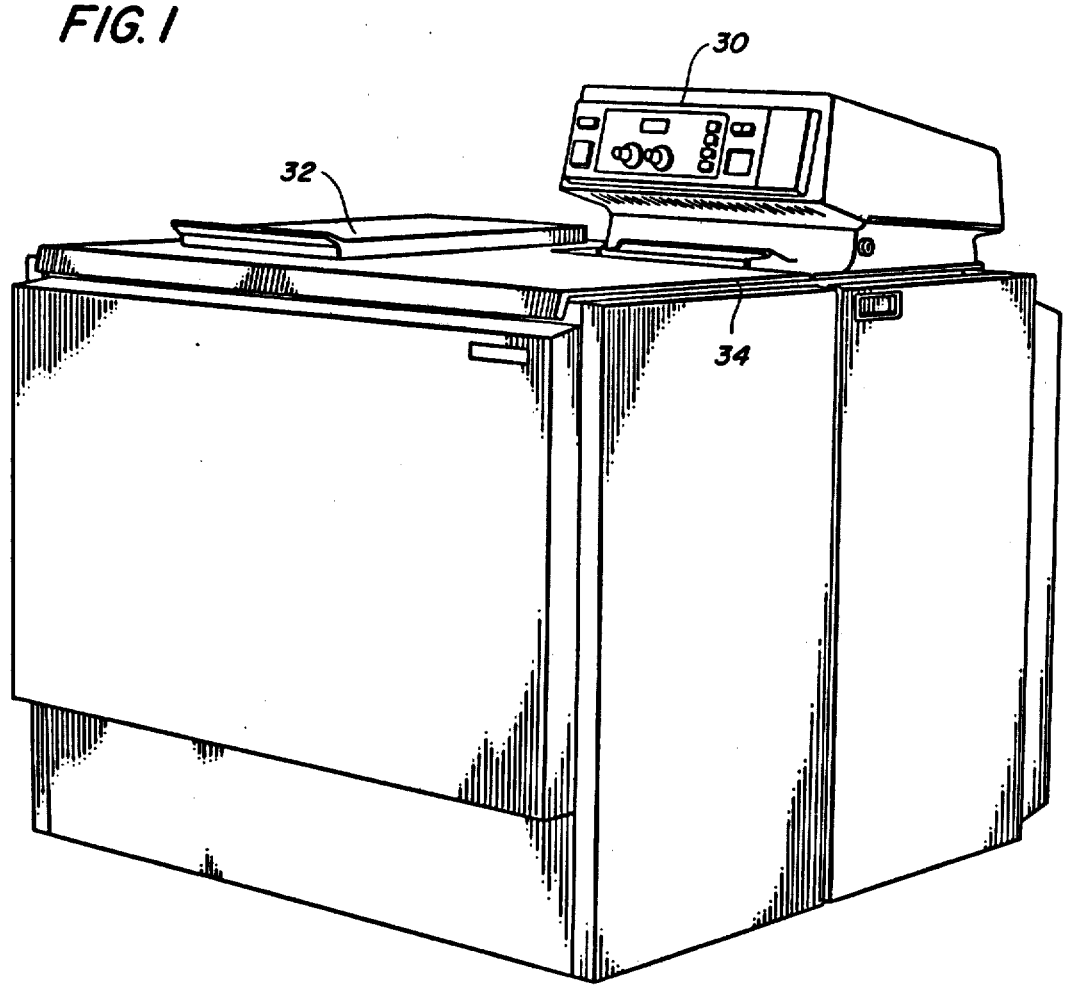
FIG. 1 is a perspective view of a copier apparatus controlled by the processor of this invention.

The general operation of an electrostatographic reproduction apparatus constructed in accordance with features of this invention will be described with reference to FIGS. 1 and 2. In FIG. 1, which is a view of the apparatus console, there is illustrated various operator actuated switching means for selecting mode of operation and copies to be reproduced as well as an indicating means for representing the status of the apparatus to the operator. These switching and indicating means are mounted on a panel and are represented generally by the reference numeral 30. A document is reproduced generally by raising a platen cover 32, positioning a document 31 on a glass platen 33 (FIG. 2), lowering the platen cover and initiating a reproduction cycle by actuating the switching means 30. A copy of the document is thereby automatically prepared by electrostatographic techniques and is delivered to a catch tray 34.

The various operating steps of the reproduction apparatus are shown in the schematic view of FIG. 2. Although the apparatus illustrated therein is adapted for producing multi-colored copies from an original document, it will be appreciated from the description herein that the present invention is not limited to color reproduction apparatus. Generally speaking, in an apparatus of the type illustrated, a light image of a document to be reproduced is projected onto a sensitized photoreceptor to form an electrostatic latent image thereon. This latent image is then developed by contacting the photoreceptor with toner particles which form a powder image of the latent image on the photoreceptor. The powdered image is subsequently transferred to a surface of a sheet of support material, such as paper, to which it is fixed and permanently adheres.

A photoreceptor for the apparatus is shown in FIG. 2 to comprise a rotatably mounted support drum 40 having a photoconductive surface 42 formed thereon. In providing for the reproduction of original documents in color, the photoconductor surface 42 is preferably formed of a material having a relatively panchromatic response to white light. The drum 40 rotates in the direction indicated by the arrow 44 and transports the photoconductor surface 42 sequentially through a series of processing stations.

A uniform electrostatic charge is formed across the drum by rotating the photoreceptor through a charging station which is represented generally in FIG. 2 as A. There is positioned at the charging station a corona generating device comprising a scorotron which is indicated as 46 and which extends in a direction which is normal to the direction of motion of the photoreceptor. The corona generating device 46 establishes a relatively high and substantially uniform electrostatic charge on the surface of the drum.

The uniformly charged photoreceptor is sequentially advanced to an imaging station, identified generally as B, at which location a latent electrostatic image of the document 31 is formed on the photoreceptor. The imaging station provides a means for scanning the document 31 which is positioned on the transparent platen 33. This imaging scanning means includes a transported lamp assembly 50 which illuminates the document, a transported lens assembly 52 which focuses the document at an aperture slit 56 and a transported color filter assembly 54. An image of the illuminated document is reflected by an object mirror 58 and transmitted through the lens assembly 52, through the filter assembly 54 and is again reflected by an image mirror 59 toward the aperture slit 56. The imaging assembly is transported in timed relation with respect to the photoreceptor surface wherein successive incremental areas of the document are imaged on the photoreceptor to produce a non-distorted flowing light image of the original on a photoreceptor. During exposure, the filter assembly 54 interposes slides of selected color into the optical light path. These color slides filter the light which is transmitted through the lens assembly 52 to record an electrostatic latent image on the photoreceptor which corresponds to a specific color of the flowing light image of the original.

After passing through the imaging station, the imaged photoreceptor is transported past a lamp 48. This lamp is provided for discharging an interimage spacing on the photoreceptor. As indicated in more detail hereinafter, the lamp 48 is energized for a predetermined interval of time in order to reduce the electrostatic charge in the inter-image area and thus the accumulation of toner and dust particles from air suspension with the console.

Upon formation of an electrostatic latent image on the photoreceptor, the drum 40 is rotated to a development station represented generally as C. The development station is shown to include three individual development assemblies generally indicated by the reference numerals 60, 62, and 64. These development assemblies provide a magnetic brush type of development. In a magnetic brush development system, a magnetizable developer mix having carrier particles and toner particles is continuously transported through a directional flux field in order to form a brush of developer material. The developer mix is continuously moving in order to replensih developer mix at the brush. Preferably, the brush in a magnetic brush system comprises a magnetic member with a mass of developer mix adhered thereto by magnetic attraction. The developer mix includes carrier granules having toner particles clinging thereto by virtue of triboelectric attraction. This chain-like arrangement of developer mix simulates the fibers of a brush. Development is achieved by bringing the brush of developer mix into contact with the photoconductive surface.

Each of the development assemblies, 60, 62 and 64 apply toner particles to the photoreceptor surface 42. The toner particles of each assembly are adapted to absorb light within a pre-selected spectral region of the electromagnetic spectrum corresponding to the wavelength of light transmitted by one of the filter units of the filter assembly 54. For example, in forming a latent image by passing the light image through a green filter, the transmitted green light rays will discharge the uniform charge on the photoreceptor to a voltage level which is ineffective for development. However, the red and blue portions of the spectrum are not transmitted by the green filter and these image areas retain a relatively high charge density suitable for development. These charged areas are then made visible by applying green absorbing (magenta) toner particles to the photoreceptor. In a similar manner, a blue separation is developed with blue absorbing (yellow) toner particles, while a red separation developed with red absorbing (cyan) toner particles.

After development, the now visible color component image on the photoreceptor of the original is rotated to a transfer station represented generally as D. At this solution, the developed color component image is transferred to a sheet of transport material 70, such as plain paper, by means comprising a roll assembly having an electrically conductive roll 72. The transfer roll 72 is electrically biased to one of a plurality of potentials having a magnitude and a polarity selected for electrostatically attracting the toner particles of the developed color component from the photoreceptor surface 42 to the sheet 70.

As a preliminary to this transfer from the photoreceptor to the transfer roll assembly, image enhancement of the developed image to be transferred is provided-for through the use of a pre-transfer corotron 74. The pre-transfer corotron is located along the developed image path between the transfer roll assembly and the developer housing. It generates a relatively small DC current which affects background suppression in the transferred image.

The transfer roll assembly includes a retractable paper gripping means 76 for releasably securing to the roll 72 a single sheet of paper for movement with the roll in a recirculating path. The surface of the transfer roll 72 is retractably positioned and adapted to rotate in contact and in synchronism with the photoreceptor at the same lineal velocity thereby enabling the support material 70 to receive, in superimposed registration, successive toner powder images of the original document. The aforementioned steps of charging the photoconductive surface, exposing the photoconductive surface to a particular color component of the flowing light image of the original, developing the electrostatic latent image recorded on the photoconductor surface with appropriate toner particles, and transferring the toner powder image to a sheet of final support material are repeated a number of times to form a multicolor copy of a color original.

After the final transfer operation, the support sheet 70 is stripped from the transfer roll 72 and is transported by an endless belt 80 to a fixing station E where a fuser, indicated generally as 82, coalesces the toner powder image to the support sheet 70. Thereafter, the sheet 70 is advanced by subsequent endless belts 84 and 86 to the catch tray 34.

Means are provided for cleaning the photoreceptor surface 42 after each transfer operation and for cleaning the surface of the transfer roll 72 subsequent to transport of the support sheet 70 to the fusing station. The photoreceptor cleaning means comprises a brush 90 which is maintained in contact with and rotates with the photoreceptor. It is positioned within a housing 92 to which a vacuum system is coupled for removing toner particles which are loosened from the surface of the photoreceptor by the brush 90. Similarly, a rotating brush 94 is provided for rotating in contact with the transfer roll 72. The brush 94 is positioned within a housing 96 for removing toner particles from the surface of the transfer roll 72. The housing 96 and brush 94 are retractably spaced apart from the transfer roll and are adapted to be advanced toward the roll 72 for the cleaning operation at an appropriate time during a reproduction cycle after transfer of the support sheet 70 to the subsequent station.

A supply of sheets of copy support material 70 is provided and is positioned in a supply tray 100. The sheets are individually transported to the image transfer station D by feed means including feed and retard rolls 102 and 104 respectively which feed the topmost sheet from the tray 100 to a registration roll assembly 106.

After registration of the copy sheet is established at roll assembly 106, the sheet is advanced to the transfer roll assembly where it is gripped by retractable fingers 76 and is thereby secured to the transfer roll 72 for rotation therewith. Upon transfer of the developed image, the sheet is then advanced to the fixing station E.

The operation of a copier of the general type thus described requires the application of electrical potentials to various controlled components and elements of the apparatus in proper sequence. Moreover, each of these controlled events can only occur when a predetermined set of conditions exits indicating that the apparatus is prepared for the controlled event. In order that the features of the present invention in sensing conditions and controlling events may be fully understood and appreciated, a more detailed description now will be given of the controlled components of the apparatus as well as a description of the various means for indicating the condition of the apparatus. In the drawings, similar components bear the same reference numerals throughout the various figures.

DETAILED DESCRIPTION OF THE APPARATUS

IMAGING

Figure 3:
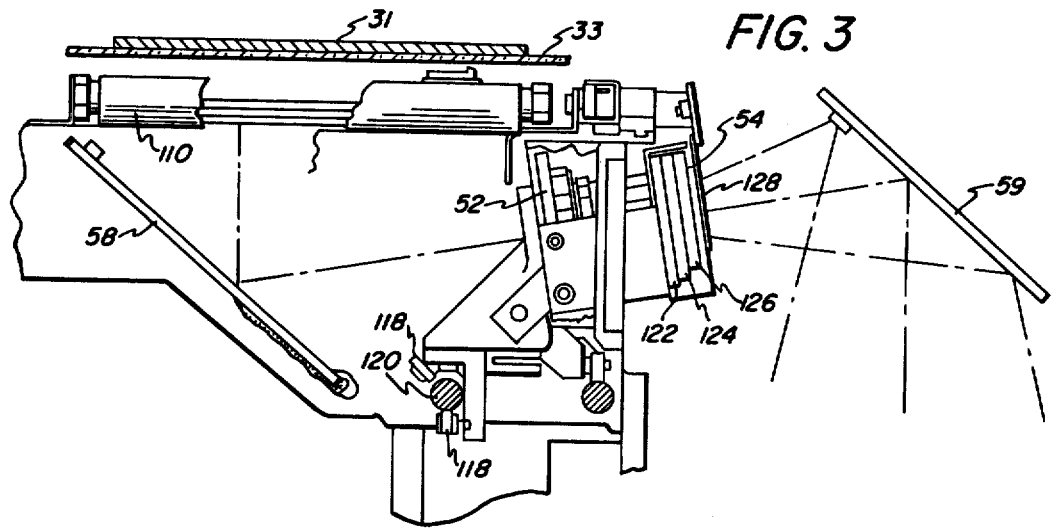
FIG. 3 is a view of the imaging assembly of the apparatus of FIG. 2.

As indicated hereinbefore during repeated imaging, the lamp assembly 50, the lens assembly 52 and the color filter assembly 54 are driven in timed relationship with respect to motion of the photoreceptor drum 40. These members are driven from an initial to a final scan position and are rapidly retracted at termination of the scan by a spring return means. The lamp assembly, as illustrated in more detail in FIG. 3, comprises a carriage 110 which is transported in a direction to traverse the stationary mounted platen 33 upon which the document 31 being reproduced is positioned. The lamp carriage supports a pair of lamps. A thermostatically controlled heating means such as sleeve heaters are provided for maintaining the lamps at a predetermined temperature under standby conditions, i.e., during intervals between scans. In the operating mode, the lamps are energized, the heating means is disabled, and a cooling blower is enabled in order to maintain the lamps at a predetermined temperature range. The lamp carriage including lamp heating and blower means is described in greater detail in U.S. Pat. No. 3,779,640 to W. L. Kidd, the disclosure of which is incorporated herein by reference. The lamp carriage 110 is supported by a suitable mechanical means and is driven by a cable pulley means 112 (FIG. 5) which derives motive power from a motor 114. The motor 114 also drives the photoreceptor drum 40. The mechanical coupling between the belt 112 and the motor 114 is described hereinafter in more detail. As the lamp carriage 110 traverses the platen 33, another cable pulley means 116 operates to simultaneously advance the bracket mounted lens assembly 52 on suitable rollers 118 surrounding a shaft 120 at a rate correlated with the speed of the lamp. The optical filter assembly 54 is mounted by suitable bracket means on the lens assembly 52 and is transportable therewith. The lens assembly and optical filter assembly as well as the light carriage scan the document to be reproduced in a direction which is perpendicular to the plane of the paper of FIG. 3. Upon reaching the final scan position the lamp carriage 110, the lens assembly 52 and the optical filter assembly 54 are retracted to the initial position by spring return means (not shown) again scanning the support platen during a subsequent imaging cycle of operation. A more detailed description regarding the imaging means and its cooperation with the movement of the photoconductor drum can be found in U.S. Pat. No. 3,062,109 to Mayo et al, the disclosure which is incorporated herein by reference.

Figure 4:
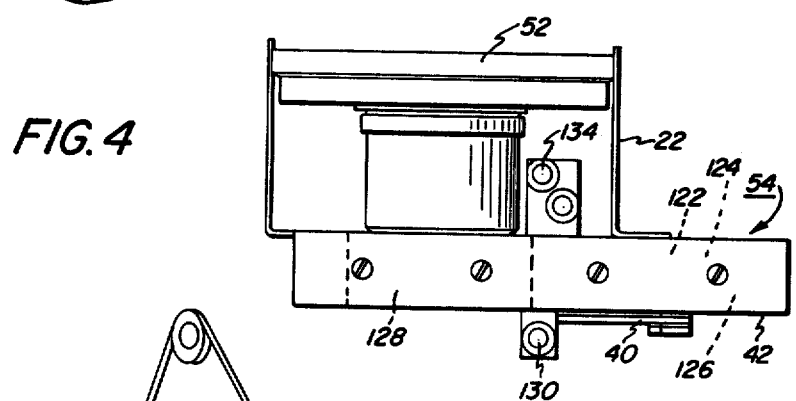
FIG. 4 is a view of a lens assembly and color filter selection arrangement employed with the apparatus of FIG. 2.

The filter assembly 54, as best seen in FIG. 4, includes a plurality of separate filter elements which are mounted in frame slides 122, 124 and 126 and which are adapted to be transported along tracks formed in edges of the housing within the assembly 54. Spring biasing means are provided for biasing the slides toward a window 128 formed in the assembly. The slides, however, are latched and are positioned, against the spring bias force, to the right of the window as viewed in FIG. 4. Solenoids 130, 132 and 134 are provided for latching the slides against the spring bias force. At the initiation of an imaging cycle, one of the filters is selectively released by energizing an associated solenoid and is advanced by the spring biaisng means into the window area 128. The filter assembly 54 is described in greater detail and is claimed in U.S. Pat. No. 3,775,006 to Hartman et al, the disclosure of which is incorporated herein by reference.

Figure 5:
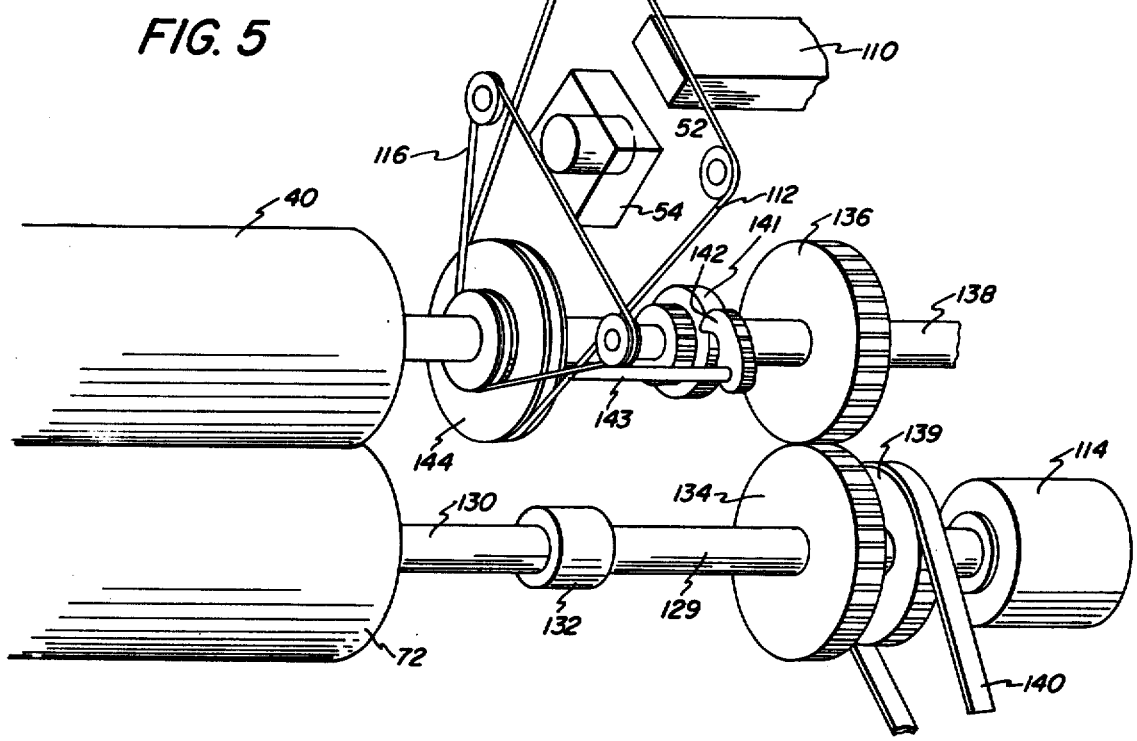
FIG. 5 is a perspective view of a drive means for driving various components in the apparatus of FIG. 2.

Synchronized motion of the imaging means, the photoreceptor, the transfer roll and other componenets of the apparatus is, as indicated in FIG. 5, derived from a main drive motor 114. A motor drive shaft 129 is mounted in line with, and, is coupled directly to a drive shaft 130 of the transfer roll 72 by a flexible coupling comprising a metal bellows 132. This flexible coupling permits retraction of the transfer roll 72 and lowering thereof for purposes of positioning record paper thereon, for cleaning and for shutdown. A gear 134 and a gear 136 which are mounted on the main motor drive shaft 129 and the photoconductor drum drive shaft 138 respectively, are positioned in engagement and couple motive power to the photoconductor drum 40 and to the transportable imaging means. Other components of the apparatus are driven in synchronism with the drum 40 through a pulley 139 which is mounted to the shaft 129 and through a belt 140.

The transportable imaging means including the lamp, lens, and filter assemblies are actuated through a sprocket 141 which is pinned to the photoreceptor shaft 138 and which engages a pawl 142. The sprocket which is electrically engaged rotates with the shaft 138 and engages the pawl at the initiation of a scan and releases the pawl at the termination of the scan. The pawl 142 is coupled through a shaft 143 to a pulley 144 which is rotatably mounted on the shaft 138. Rotation of the pawl drives the lens and lamp scan assemblies through the pulley 144 and the cable system including cables 112 and 116. The pulley 144 is driven against the resistance of a return spring (not illustrated) which causes return of the imaging assembly upon release of the pawl by the sprocket at the termination of a scan.

DEVELOPMENT

Figure 6:
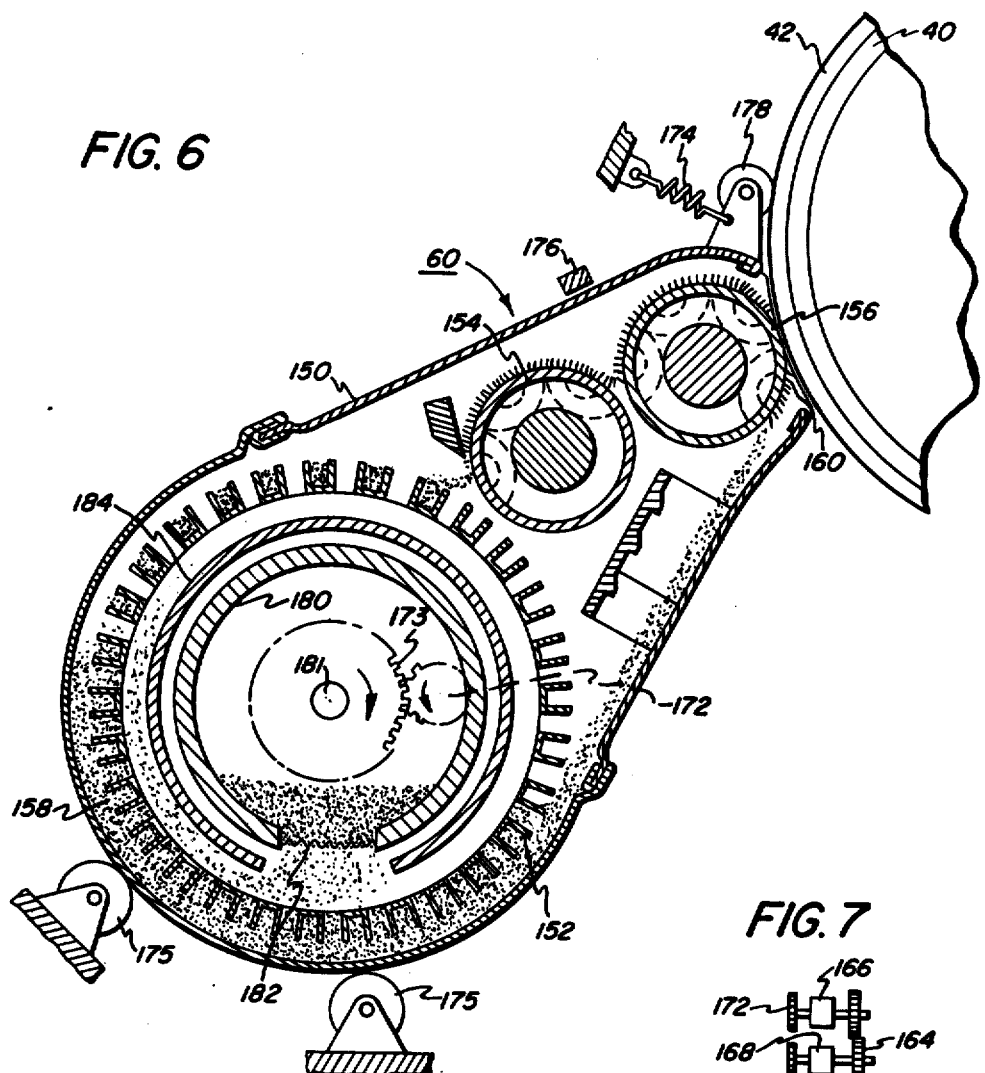
FIG. 6 is a side view in section of one of the developer housings of the apparatus of FIG. 2.

While the developers 60, 62 and 64 are adapted for delivering toner materials of different color composition to the photoreceptor surface 42 for developing a composite electrostatic latent image thereon, their mechanical arrangement and means for actuation are substantially alike. A description will therefore be given only with respect to the developer 60. A cross-sectional view of the developer 60 is illustrated in FIG. 6. The developer 60 includes a housing 150, a conveyor means or paddle wheel 152, a transport means or roll 154, and a developer means or roll 156. The paddle wheel 152 comprises a cylindrical member having buckets or scoops positioned about its periphery and is adapted to rotate so as to elevate a developer mix 158 from a lower region of the housing 150 to an upper region thereof. As the mix 158 is conveyed to the upper region and to the vicinity of the transport roll 154, magnetic fields produced by fixed magnets which are rotatable with this roll attract the developer mix to its surface. The transport roll 154 in turn conveys the developer mix to the developer roll 156 and, under the influence of magnetic fields produced by fixed magnets which are rotatable with this roll, into the development zone 160 which is located between the photoconductive surface and the developer roll. The charged areas of the photoconductive surface 42 electrostatically attract the toner particles from the carrier granules of developer mix which is being transported by the development roll. As the developer mix is rotated at development zone 160, respectively strong magentic fields of the developer roll magnets which extend in a direction generally tangential to the developer roll 156 continue to secure the unused developer mix and denuded carrier particles. Upon passing from the developing zone, the unused developer mix and denuded carrier particles enter a region relatively free from magnetic forces and fall from the developer roll 156 in a downward direction into the lower region of the developer housing.

Figure 7:
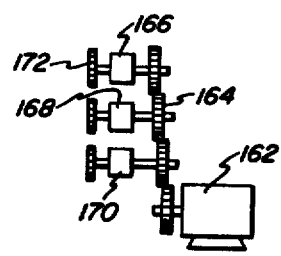
FIG. 7 is a view illustrating a drive means for developer components of the apparatus of FIG. 2.

In developing a component latent image of a composite color image, developer material will be supplied by any one of the developers 60, 62 or 64 of FIG. 2, depending on the color component of the latent image being developed. Each of these developers are adapted to be advanced into relatively close proximity with respect to the photoreceptor surface 42 during development and to be withdrawn therefrom subsequent to development. However, during a single developer interval, only one of the developers will be advanced to the development zone for developing a color component image. To this end, a process main drive motor 162 (FIG. 7) is provided. An output shaft of this motor is coupled to a gear train 164. This gear train includes a plurality of developer drive gears, each of which includes a drive shaft which is coupled to an electrically energized clutch. The clutches 166, 168 and 170 are selectively energized when one of the developers 60, 62 and 64 respectively are to be advanced to its development zone. When the clutch 166 is energized, for example, the drive gear of the train 164 is coupled to a drive gear 172 which engages a gear 173 of the paddle wheel 152. The gear 172 in addition also engages drive means for causing rotation of the transport roll 154 and the development roll 156. Upon rotation of the paddle wheel, the transport roll and the development roll, a reaction torque is exerted against the developer housing 50 due to the resistance to motion of developer mix 158 which fills the lower section of the developer housing 150. The reaction torque causes the housing 150 to rotate clockwise as viewed in FIG. 6 against the force of a bias spring 174 which normally maintains the housing 150 in a retracted position against a stop 176. The housing 150 rotates in a clockwise direction upon roller bearings 175 as a result of the reaction torque until a stop, shown as wheel 178, is positioned against the drum 40. The developer mix and rotatable components then rotate within the housing 150. After development of a color component is completed, the clutch 166 is deenergized, the reaction torque is terminated and the spring 174 causes retraction of the housing to the stop 176. The developers 62 and 4 are similarly selectively actuated by energization of their clutches 168 and 170, for developing color component images.

Figure 8:
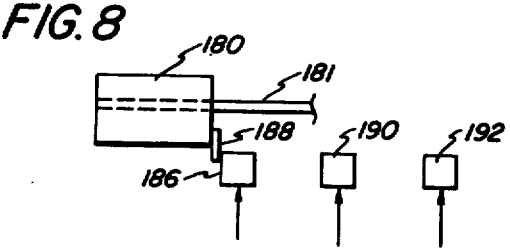
FIG. 8 is a diagram illustrating a toner dispenser actuating means.

As the toner material in the housing becomes depleted, the quality of the reproduced image is affected. Accordingly, an automatic toner dispensing assembly for each of the developers 60, 62 and 64 is provided for dispensing toner into each of the housings in order to maitain the toner concentration at a level sufficient for providing the appropriate image density and color balance for a reproduced image. The toner assembly, as illustrated in FIG. 6, includes a toner cartridge 180 which comprises a cylindrically shaped enclosed chamber disposed about a shaft 181 of the paddle wheel 152. This cylinder includes a flattened segment 182 with perforations formed therein to provide an aperture for dispensing the toner material contained in the cartridge 180 and the paddle wheel 182. The toner cartridge is oscillated about its longitudinal axis by an electrically energized oscillator motor 186 (FIG. 8) which is coupled to the cartridge 180 through a vibratory arm 188. The oscillation of the toner cartridge causes dispensing through the aperture 182 of particles which pass through a slot in the shroud to the lower portion or sump of the housing. A similar toner dispensing assembly is provided for each of the other developers 62 and 64. For purposes of simplifying the drawings, only their associated vibrator motors 190 and 192, respectively, are illustrated in FIG. 8 of the drawings. The development system described herein is disclosed in greater detail and is claimed in copending U.S. Pat. application Ser. No. 255,259, filed May 22, 1972 filed by James R. Davidson and entitled "DEVELOPMENT APPARATUS" (D/3849) which is assigned to the assignee of the present invention and the disclosure of which is incorporated herein by reference.

AUTOMATIC DEVELOPMENT CONTROL

Figure 9:
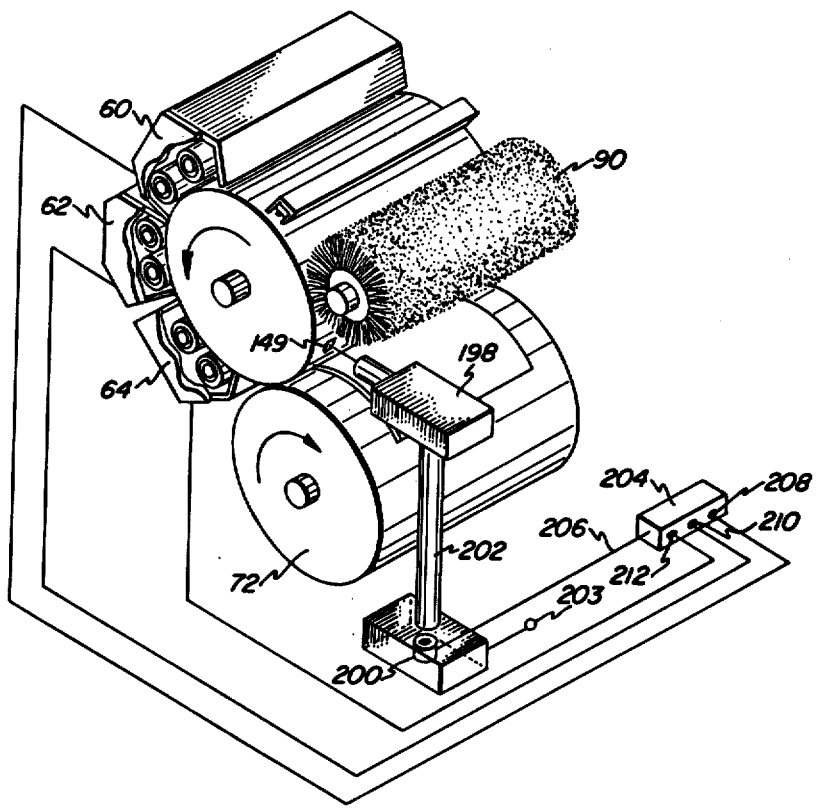
FIG. 9 is a view of a portion of the apparatus of FIG. 2 and illustrating an automatic development control arrangement.
Figure 10:
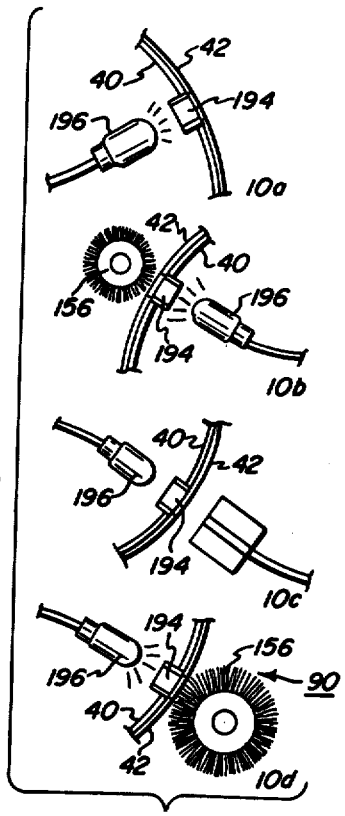
FIGS. 10a, 10b, 10c and 10d are diagrams illustrating the operation of a developer concentration detector means employed with the apparatus of FIG. 9.

As was described with respect to the development components, toner particles are automatically dispensed from the toner cartridge to the developer housing and sump as the concentration of toner particles in the developer mix is reduced to a predetermined level. This is accomplished by an automatic development control arrangement which detects the concentration of the developer mix of each of the developers 60, 62 and 64 and causes energization of the associated oscillator motor when there is an indication that the concentration of toner in the developer mix should be increased. Referring now to FIGS. 9 and 10, the automatic development control arrangement is shown to include a window 194 which is mounted to the drum 40 and is coplanar with the photoconductor surface 42. The window comprises an electrically conductive transparent material such as NESA glass which is biased to a DC voltage. This voltage simulates a latent electrostatic image recorded on the photoreceptor and thus attracts toner particles to the window. A segmented commutator (not shown) biases this transparent electrode to the DC voltage when it is being rotated through the development zone. FIG. 10b illustrates the window 194 as it is advanced through the development zone adjacent development roll 156 of the developer 60. The biased window attracts toner particles to the window from the developer roll and the density of these toner particles is proportional to the concentration of the toner particles in the developer mix.

A light source and a photosensor are provided for detecting the intensity of light which is projected through the window 194 and through the toner particles adhering thereto. The light source shown comprises a lamp 196 which is mounted within the interior of the drum and which is positioned for projecting light through the window and toward a photosensor. As illustrated in FIG. 9, the light flux emanating from the window 194 impinges upon a fiber optics bundle 198 at a station located intermediate the transfer roll 72 and the drum cleaning brush 90. The fiber optics bundle 198 is adapted for conveying light emanating from the window 194 to a photosensor 200 which is mounted in a housing 202. The housing also includes circuit means for energizing the photosensor and a thermostatically controlled oven for the photosensor. An input signal at terminal 203 provides for energization of the photosensor as the window 194 rotates past it. The photosensor provides an electrical output signal having an amplitude which is proportional to the intensity of the light transmitted through the window 194 and the density of the toner material adhering thereto. An electrical circuit means 204 compares the signal with a reference signal to generate a toner request signal. The apparatus controller provides driving signals at terminals 208, 210 and 212 for causing energization of the oscillator motors 186, 190 and 192, respectively. The characteristics of the output signal provided to each of these vibrator motors will depend on the indicated concentration of the associated developer. After the window 194 is transported through this detection station, the window is advanced past the cleaning brush 90, as indicated in FIG. 10d, at which location the toner material is removed from the window and the window is thus conditioned for a subsequent cycle. An apparatus of this type is disclosed in greater detail and is claimed in U.S. Pat. application No. 3,754,821 on Whited, the disclosure of which is incorporated herein by reference.

The logic circuit arrangement 204 of FIG. 9 is adapted to monitor a "request" for additional toner from any of the developer units over a pluarlity of developer cycles. A "request" comprises a signal generated by the photosensor 200 as the window 194 passes the detection station (FIG. 10c) and having a signal amplitude indicative that a replenishment quantity of toner material should be supplied to the developer mix. When the developer 60, for example, generates successive toner addition "requests" over a predetermined number ($N_1$) of consecutive cycles, then the concentration of the toner in the developer mix is deemed to be sufficiently depleted and a control, discussed hereinafter, initiates a machine shutdown until an operator replenishes the toner supply in the cartridge 180. The number ($N_1$) of developer cycles after which this can occur comprises, for example, 11 cycles. Alternatively, when the number of successive requests over consecutive cycles is less than ($N_1$), then replenishment of toner material in two different quantities is provided depending upon the number of consecutive "requests" generated. For example, in response to initial "requests" during three successive developer cycles, the control logic will cause three excitations of the oscillator motor, each of 1.25 second. When the number of successive "requests" continues for 4 to 10 consecutive cycles, excitations of the oscillator motor for 2.5 seconds during each cycle will occur.

Figure 11:
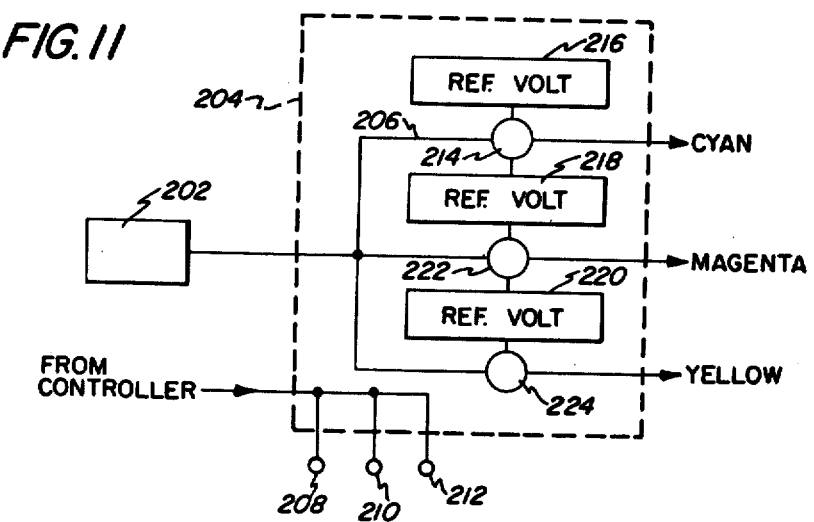
FIG. 11 is a schematic diagram in block form illustrating an arrangement for generating toner request signals.

Toner dispensing is initiated for each of the developers 60, 62 and 64 through an independent channel associated with each of these developers. As illustrated in FIG. 11, a photosensor signal is applied to a cyan comparator circuit arrangement 214 along with an input from a reference voltage source 216. When the input signal amplitude deviates from the reference signal amplitude by a predetermined magnitude, an error signal is generated which is representative of a developer toner "request." Since the development requirements of each developer mix differ, a different reference voltage is provided for each channel by a separate reference voltage source. The reference voltage sources 218 and 220 provide reference voltages for the magenta and yellow comparators, 222 and 224 respectively. Output signals from the comparators are provided as machine condition indicators, discussed hereinafter.

TRANSFER ROLL

The transfer assembly transfers the image developed on the photoreceptor drum to the support material. It repeats this process in order to transfer each of the composite latent images, which are developed successively on the photoreceptor drum, to a support material positioned on the transfer roll. The transfer roll 72 comprises an electrically conductive tubular body 225 (FIGS. 12 and 13) formed of aluminum and which has an electrically insulating, plastic, surface coating 227 which is formed of urethane, for example. A DC transfer bias voltage is applied to the aluminum roll through a carbon brush and a brass ring assembly which, for purposes of simplifying the drawings is not illustrated. The bias voltage which is applied to the transfer roll will differ in magnitude for the different developer mixes and these voltages are applied in this brush ring assembly in accordance with the color composition of the developed image being transferred.

Figure 12:
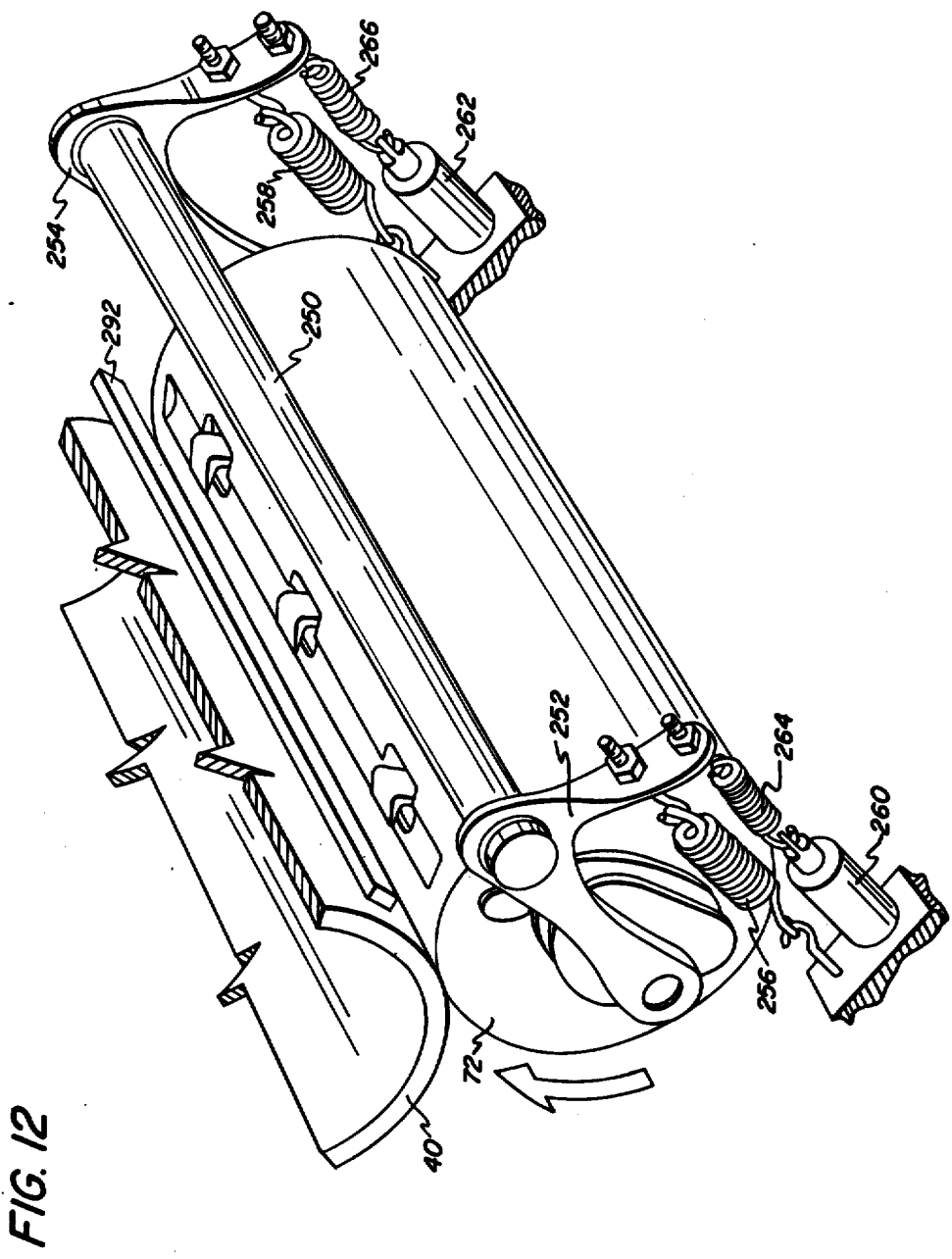
FIG. 12 is a perspective view of a transfer roll of the apparatus of FIG. 2.

In order to facilitate cleaning of the transfer roll by the cleaning brush 94 (FIG. 2), the transfer roll is adapted to be retracted from contact with the photoreceptor. As illustrated in FIG. 12, the transfer roll 72 is supported from a shaft by spring loaded yokes 252 and 254. The yoke assembly is articulated in order to permit the transfer roll position to adjust about its own axis and the photoreceptor center lines. A pair of springs 256 and 258 are provided for maintaining the transfer roll at a spaced apart position during standby and brush cleaning of the roll. During the transfer operation, however, the solenoids 260 and 262, which are coupled to their associated yokes through springs 264 and 266 respectively, cause clockwise rotation of the roll and advance it into light contact with the transfer drum.

Figure 13:
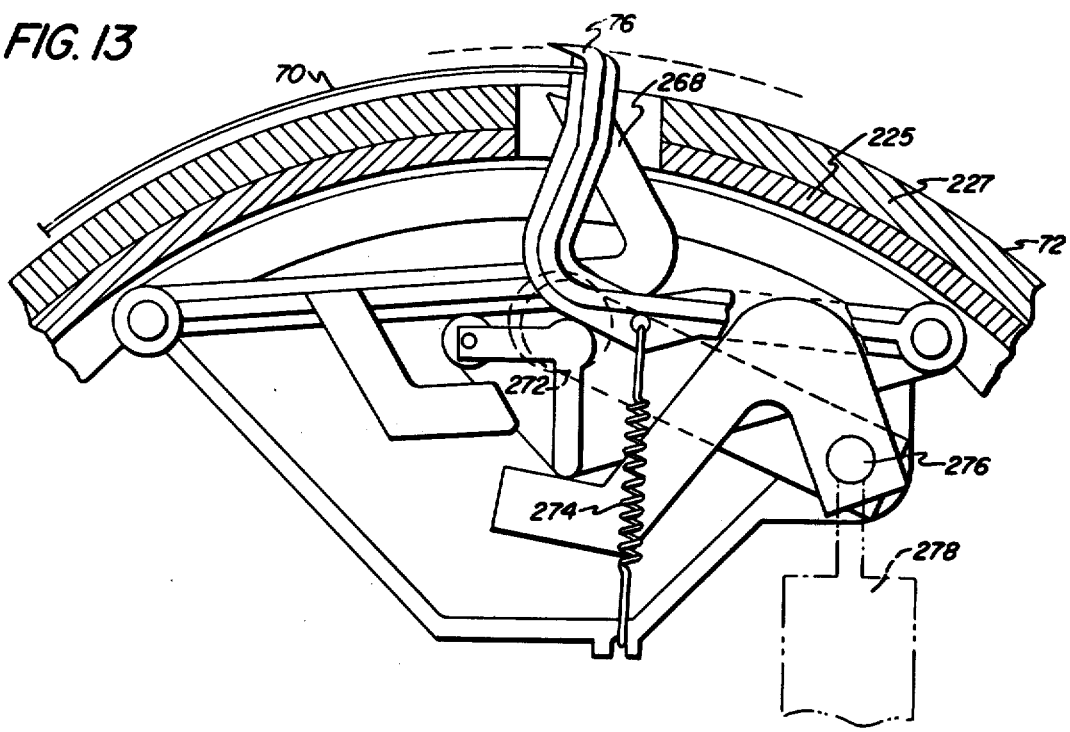
FIG. 13 is an enlarged side view in section of the transfer roll of FIG. 12 and illustrating paper gripping and stripping means.
Figure 14:
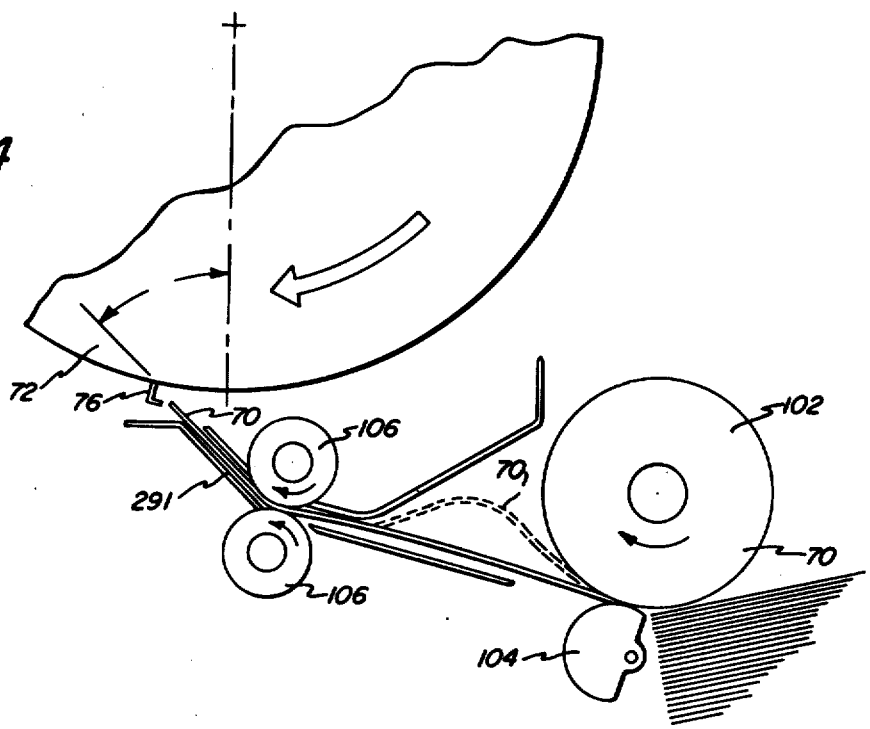
FIG. 14 is a schematic view illustrating a means for feeding copy paper to the transfer roll of FIG. 12.

The support material 70 is received by and secured to the transfer roll 72 by the gripper fingers 76 and is subsequently separated from the transfer roll by a stripper 268 as is illustrated in FIGS. 12, 13 and 14. The gripper fingers hold and provide registration of the paper on the roll. Sheet registration is performed by a surface 270 on the grippers which is contacted by the advancing leading edge of the sheet. A cam follower 272 engages the gripper and raises it upwardly from the surface of the transfer roll in order to permit the paper to engage this registration surface. After the paper 70 has engaged the registration surface its forward motion is halted and the gripper is withdrawn by spring 274 to hold the marginal edge of the paper against the surface of the transfer roll. Stripping of the paper is achieved by raising the gripper is an upwardly direction to free the leading marginal edge portion of the paper permitting the paper to slide over the stripper 268 which is moved in an upwardly direction by the cam follower 272 to separate the paper from the surface of the transfer roll. The mechanical linkage for actuating the paper gripper and the stripper is coupled through a shaft 276 to a solenoid 278 which is energized for actuating the paper gripper and stripper.

Figure 15:
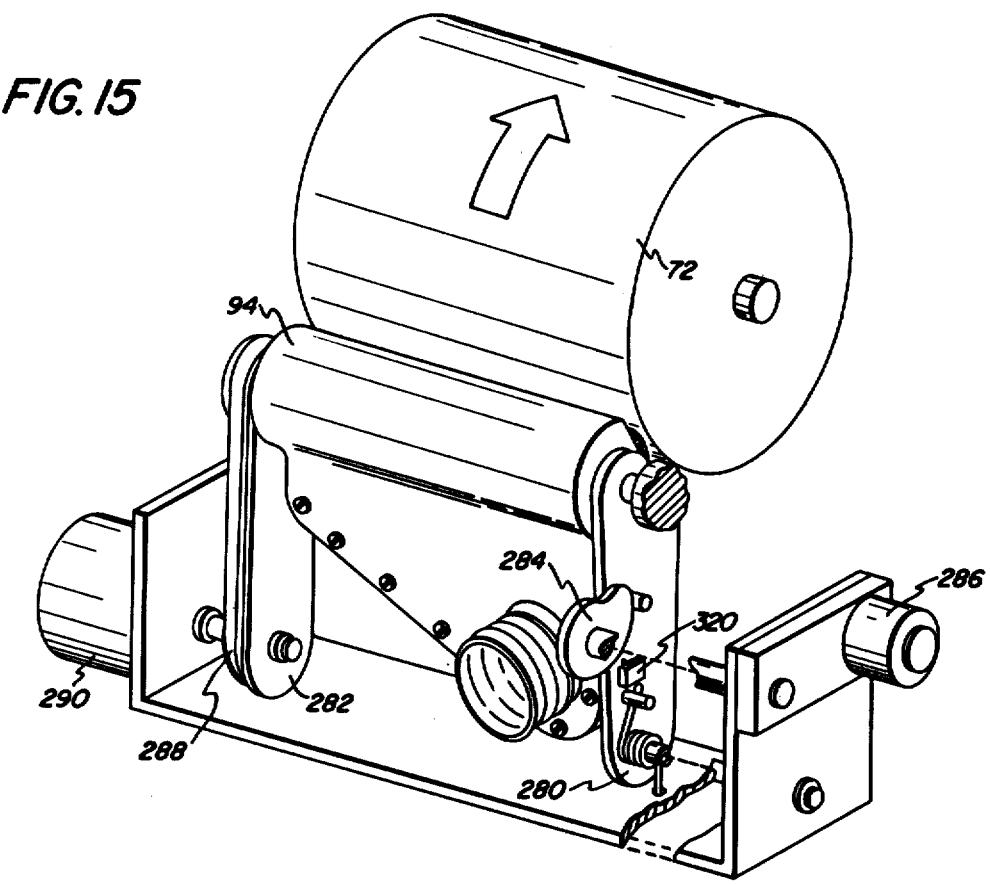
FIG. 15 is a perspective view illustrating a transfer roll cleaning means.

The brush cleaning means for cleaning the toner particles from the transfer roll 72 is illustrated in FIG. 15. This arrangement is adapted for cleaning the bias transfer roll and the gripper finger area in order to prevent toner particles from being deposited and adhering to the backside of copies. The cleaning arrangement includes the brush 94 which is supported on brackets 280 and 282. This bracket assembly is adapted to be rotated about pivots by a cam 284 which is driven by a shaft and motor 286. The brush 94 is rotated by a belt 288 which is driven from a motor 290. During the transfer roll cleaning mode of operation, the transfer roll 72 is retracted from contact with the photoreceptor drum and the cleaning brush 94 is then rotated into contact with the retracted roll 72 be energization of the cam motor 286 while the brush 94 is simultaneously driven by the motor 290.

After transfer of a developed image is completed, the support material 70 is stripped from the transfer roll and is fed onto the paper transport 80 (FIG. 2). As the paper is separated from the transfer roll, a post nip breakdown occurs. There is thus a negative charge due to both the toner and to this post nip breakdown remaining on the surface of the paper. Various adverse consequences can result from this charge and in order to avoid any such problems, a static eliminator comprising an AC corotron with a DC bias adjusted to level out the charge on the paper is provided. This static eliminating corotron 292 is illustrated in FIG. 12. It is positioned adjacent the nip exit and is energized for a limited interval of time during a predetermined interval of the reproduction cycle.

FUSING

The fusing means 82 of FIG. 2 includes a principal radiant energy heater and an auxiliary heater, not illustrated. Each of these heaters is adapted to operate at full or partial output wattage in accordance with the operating mode of the apparatus. When the apparatus is initially energized, the fuser is heated from a cold condition to a standby condition. During this warmup period, both the auxiliary heater and the radiant energy heater are activated. The radiant energy heater initially operates at full power until the preselected standby temperature is attained at which time the radiant energy source is deenergized. The fuser is maintained in the standby condition by the auxiliary heater. When a sheet of support material enters the fuser, as determined by the machine control logic discussed in more detail hereinafter, the radiant energy heater is energized at full power while the auxiliary heater is deenergized. When the sheet of support material is transported from the fuser the machine control logic energizes the auxiliary heater and deenergizes the radiant heater. Means are provided for detecting an excess temperature in the fuser and for automatically causing the radiant energy source to operate at a relatively lower power level when support material enters the fuser. Under these conditions, the auxiliary heater remains energized. As the sheet of support material leaves the fuser, the machine control logic deenergizes the radiant source while the auxiliary heater remains energized. The fuser and the control techniques are described in more detail in U.S. Pat. No. 3,781,516 to George Tsilibes et al, the disclosure of which is incorporated herein by reference.

SUPPORT MATERIAL HANDLING

Figure 16:
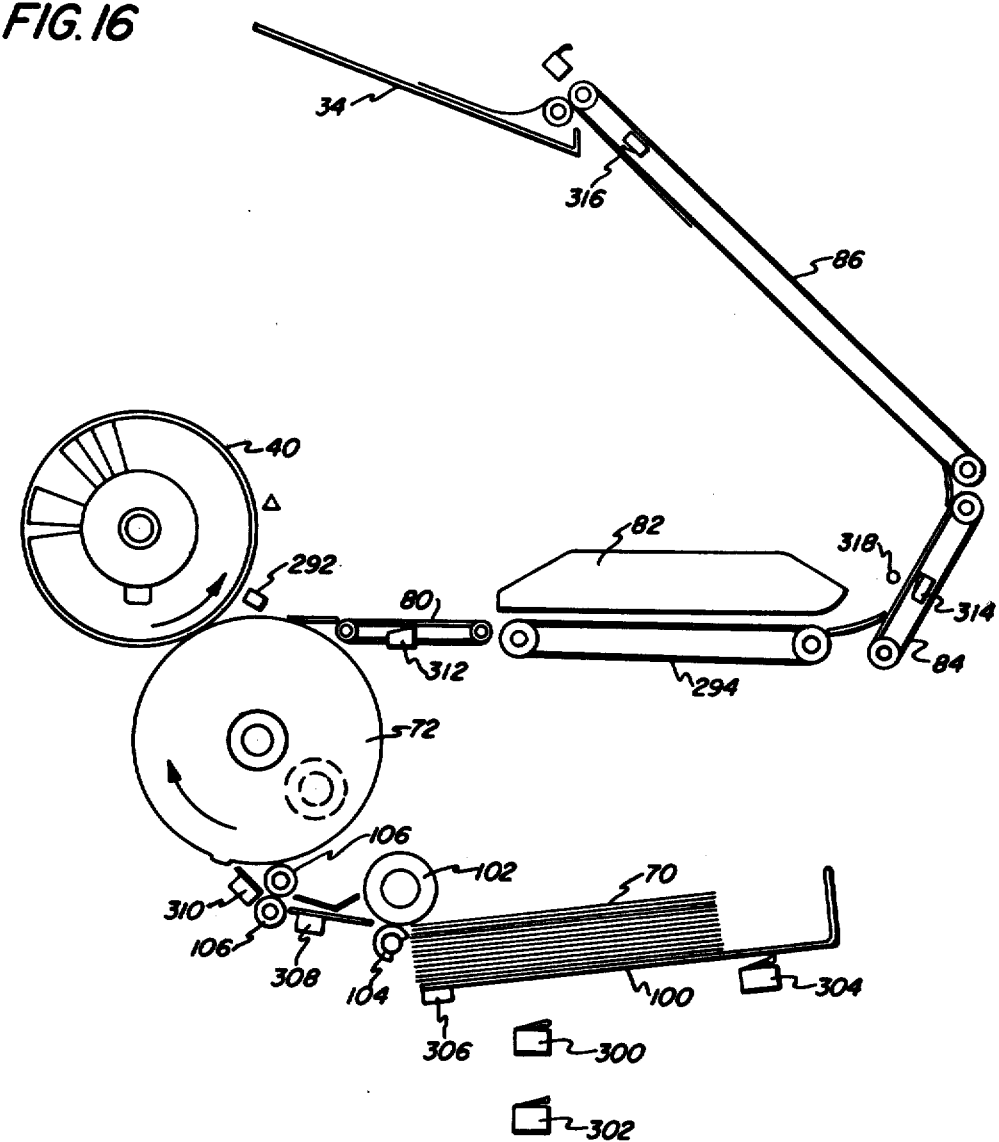
FIG. 16 is a schematic diagram illustrating the transport of record material through various stations of the apparatus of FIG. 2.

A sheet feeding arrangement for introducing and transporting a sheet of record material such as paper through the apparatus is illustrated in FIG. 16. A paper feed clutch, not shown, couples energy to a belt drive system from the belt 140 of FIG. 5 and causes rotation of various sheet support drive members. Actuation of this clutch causes the paper roll drive 102 to top feed a sheet of material 70 from the paper tray to the registration rolls 106. The mechanical drive to the registration rolls 106 is similarly coupled thereto through an electric clutch which is energized in synchronization with operation of other components of the apparatus. As shown in greater detail in FIG. 14, the copy paper is guided to the transfer roll grippers 76 by a sheet metal guide 291. The sheet registration rolls function to position and align a sheet immediately prior to delivery to the transfer roll. The paper reaching the nip of the registration roll is aligned by the buckling of the paper as illustrated in FIG. 14.

The sheet paper which is delivered to the transfer roll 72 is subsequently stripped from the roll and advanced by belt transport 294 of the fuser 82. Sheet material with an image fixed thereon is then transported by a belt 84 and a belt 86 to the catch tray 34. These belts are perforated and a slight vacuum is applied thereto for retaining the paper to the transport as it is being advanced. Actuation of the paper feed clutch causes the drive rolls associated with each of the belts 80, 294, 84 and 86 to advance the paper along its course. A sheet feeding apparatus of this type is disclosed in a copending U.S. Pat. application Ser. No. 398,024 (D/73429) filed Sept. 17, 1973 by Robert P. Rebres and entitled "Sheet Feeding Apparatus," the disclosure of which is incorporated herein by reference.

JAM MEMORY

The apparatus includes means for monitoring the transfer of the paper record material through the various stations in order to detect malfunctions resulting in a paper jam. A magnetic reed relay provides a jam memory 294 (FIG. 25). The relay is set upon feeding of a sheet of paper. It is reset when a signal is generated after the last copy in the machine succesfully reaches the exit tray. If for any reason the reset condition does not occur, such as when a paper jam or a power off condition occurs, the relay will remain set and serves to maintain the apparatus in a stop mode. In such an event, an alternative reset is provided by the bottom tray which includes an interlock. The opening and closing of the bottom tray will cause a reset of this memory. An opening and closing of the tray indicates to the apparatus that an operator has corrected the malfunction.

COPY ACCOUNTING

An automatic copy accounting system is provided for maintaining a count for billing purposes of the number of copies produced. The billing arrangement provides an output meter indication which represents not only the number of copies produced but it is also an indication of the number of multiple copies produced from a single document during a single reproduction run, A scan count output signal, a color copy output signal and a single color copy output signal are generated for purposes of this accounting.

VISUAL INDICATORS

During the operation of the apparatus, various conditions will or can exist which should be made known to a machine operator. To this end, a plurality of visual indicators are provided on the console for informing the operator that a particular condition exists. Output signals are provided for energizing the indicators. The following illuminated displays are provided: machine not ready; wait for copy; key operator light; color cyan; color magenta; color yellow; color cyan magenta and yellow; paper low; ready for copy; and service call. These indications are self explanatory and they are presented at an appropriate time during the operation of the apparatus.

Figure 17:
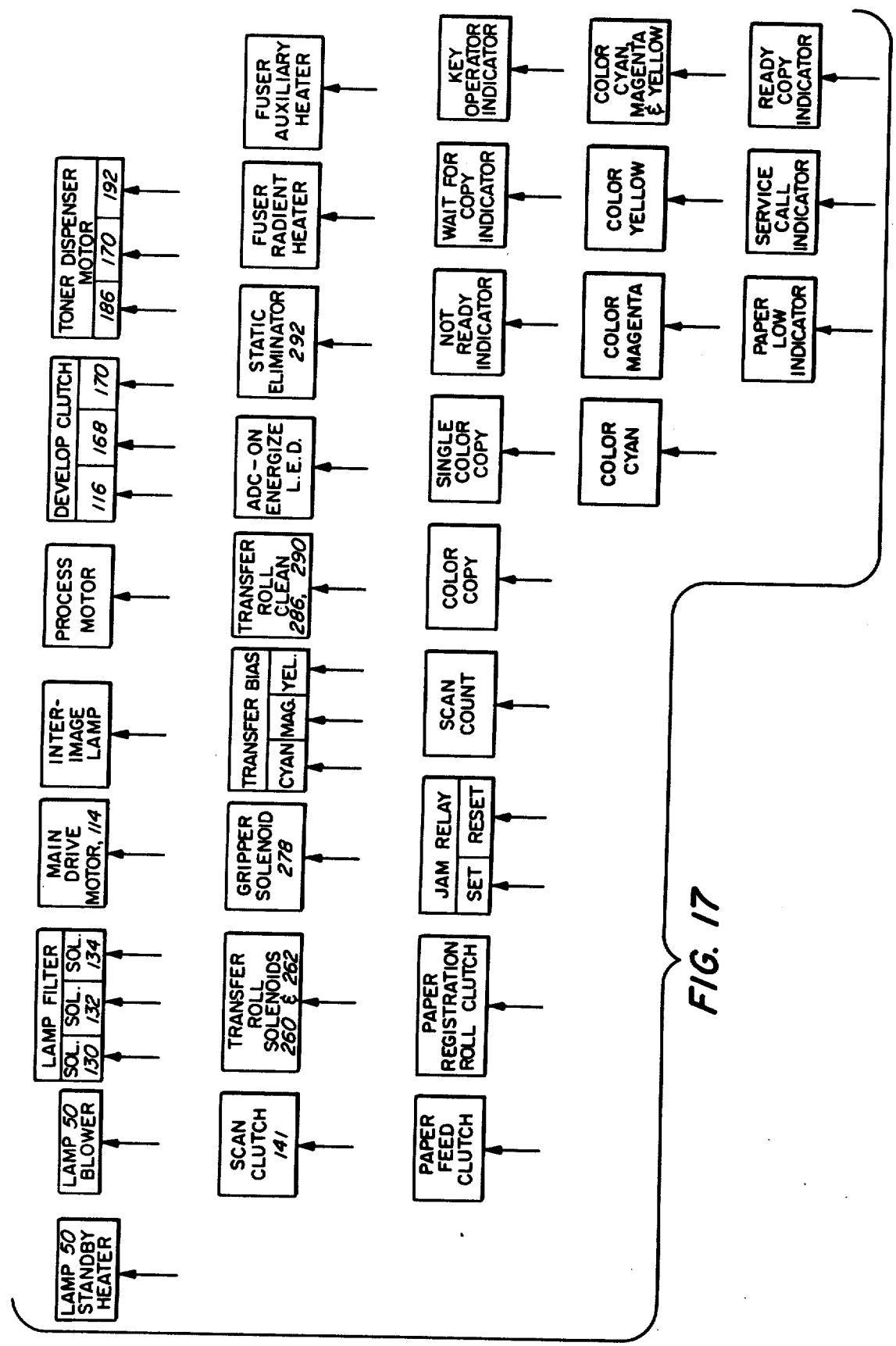
FIG. 17 is a diagram illustrating the components of the apparatus which are controlled by the processor of this invention.

The various controlled elements and components of the apparatus have thus far been described. These are represented in FIG. 25 as load impedance 296 coupled between X and Z drive lines of a matrix 298. The block diagram of FIG. 17 illustrates and summarizes the controlled elements considered thus far.

MACHINE CONDITION INDICATORS

In addition to the output control functions described thus far, the apparatus includes a plurality of means for providing input information in electrical signal form for determining the status or condition of the apparatus.

These machine condition indicators are repeatedly sampled by the apparatus control in making decisions respecting the initiation of machine events. In FIG. 25, these indicators are represented schematically as switch contacts 297 which are coupled at the intersection of X and Y lines of a matrix array 332.

Referring now to FIG. 16, it will be seen that the support material handling system includes a plurality of switch sensing means which are utilized to indicate various conditions. For purposes of simplifying the drawings, the various electrical potentials which are applied to or by these means are not illustrated. The paper tray 100 includes an interlock switch 300 which is operated by the tray 100 to indicate that the tray either is or is not properly positioned and locked in the machine. Under certain circumstances, a second paper tray is utilized and in this case, a bottom tray switch 302 would also be employed. Since different lengths of record copy paper can be employed, a long paper switch 304 in provided to indicate that legal size rather than letter size paper is positioned in the tray. As the supply of paper 70 in the tray 100 becomes depleted, a paper low switch 306 is actuated.

A malfunction in the feeding of the paper from the tray 100 to the registration roll 106 and in the transfer of the paper from the registration rolls to the transfer roll 72 is sensed by the controller which utilizes indications from paper sensing switches 308 and 310. The switch 308 and senses the presence of paper at the registration rolls while the misgrip switch 310 is closed as the paper passes over it and opens when the trailing edge of the paper leaves the surface of the switch. Failure of this closing and opening to occur at predetermined times during a machine operating cycle is an indication of, and, is interpreted by the machine to constitute a misgrip condition, i.e., the gripper fingers 76 (FIG. 13) fail to grip the copy paper. Switches 312, 314 and 316 are provided for the transports 80, 84 and 86 respectively and are interrogated by the machine control as described hereinafter, in order to sense a jam of support material in transit from the transfer roll to the catch tray 34. Such a malfunction, particularly at the outlet of the fuser 82 can result in a fire. A fire sensor 318 is therefore provided.

Various other safety interlocks are provided and include interlock switching means, not shown, indicating that the fuser which is retracting for servicing, is properly positioned; an interlock indicating that console doors of the apparatus are properly positioned and closed; an interlock switching means indicating that the toner receptacle enclosure access door is secured; and an interlocking switching means indicating that the platen cover is properly positioned over a document on the platen. The position of the transfer drum cleaning brush 94 is also indicated, as illustrated in FIG. 15, by a switch 320 which is actuated by the cam 284.

As indicated hereinbefore, various control buttons are positioned on the console for actuation by the operator. These include an initiate print pushbutton, a print stop pushbutton, a cyan color select pushbutton, a magenta color select pushbutton, a yellow color select pushbutton and a full color select pushbutton. These pushbuttons provide condition indicating signals which the machine control interprets in regulating the operation of the apparatus.

Various electrical signals are also provided during the operation of the apparatus and these signals are monitored and employed for control purposes. These signals include a fuser ready signal generated by the fuser temperature control. The occurrence of this signal indicates that the fuser has attained a standby temperature and is conditioned for receiving a copy sheet for fusing an image thereon. The previously described automatic development control signal of the photosensor also constitutes a signal containing information for determining the concentration of toner material in the developer mix.

EVENT TIMING

Figure 19:
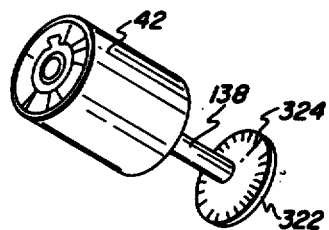
FIG. 19 is a perspective view of a timing means utilized with the apparatus of FIG. 2.
Figure 20:
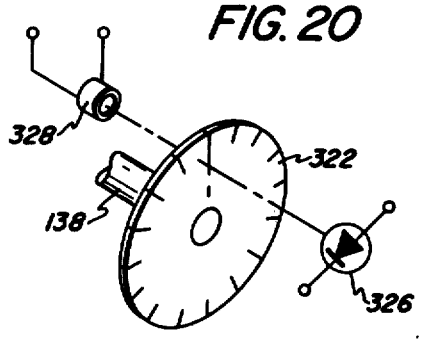
FIG. 20 is a schematic diagram illustrating a signal generating arrangement employed with the timing means of FIG. 19.

In addition, an event clock signal and a pitch signal are also generated and utilized as timing signals for synchronizing the occurrence of the various machine processes and events with the rotation of the photoreceptor. These signals are generated, as illustrated in FIGS. 19 and 20, through the use of a perforated disc 322 which is secured to the shaft 138 of the photoreceptor and which is aligned therewith. A plurality of slits are formed in the disc, each having a predetermined angular orientation with respect to a reference slit 324, the latter slit being oriented with a predetermined position on the photoreceptor drum. A light emitter diode 326 (FIG. 20) is provided and is positioned on one side of the disc 322 while a photosensor 328 is also provided and positioned on an opposite side of the disc. The light emitting diode is positioned for projecting light through the plurality of slits in the disc and the photosensor 328 is similarly positioned for impingement by the transmitted light. A series of electrical pulses are thus generated as the drum 42 rotates and the occurrence in time of these pulses is related to the angular position of the drum with respect to the reference slit 324. These pulses comprise the event clock signal. A similar light emitting diode and photosensor, not shown, are also provided and are positioned on opposite sides of the disc near the slit 324 for generating a single signal termed a pitch signal for each complete revolution of the drum. In the apparatus described, thirty-two events occur with respect to predetermined rotational positions of the photoreceptor. This number, can vary, in accordance with specific apparatus and its requirements. There are thus thirty-two slits formed in the disc 322 of FIGS. 19 and 20 and these slits are orientated for providing output signals to initiate each of these events. Each of these "residue" signals represents a logical time and these different times are represented sequentially and with respect to machine events as follows:

| LOGICAL TIME | ANGULAR POSITION ON DISC 322 | LOGICAL TIME | ANGULAR POSITION ON DISC 322 |
|---|---|---|---|
| T1  | 1°   | T17 | 127° |
| T2  | 2°   | R18 | 132° |
| T3  | 3°   | T19 | 150° |
| T4  | 21°  | T20 | 165° |
| T5  | 40°  | T21 | 169° |
| T6  | 50°  | T22 | 190° |
| T7  | 55°  | T23 | 199° |
| T8  | 61°  | T24 | 227° |
| T9  | 75°  | T25 | 276° |
| T10 | 81°  | T26 | 290° |
| T11 | 90°  | T27 | 302° |
| T12 | 98°  | T28 | 319° |
| T13 | 106° | T29 | 327° |
| T14 | 112° | T30 | 345° |
| T15 | 119° | T31 | 350° |
| T16 | 123° | T32 | 357° |

Figure 18:
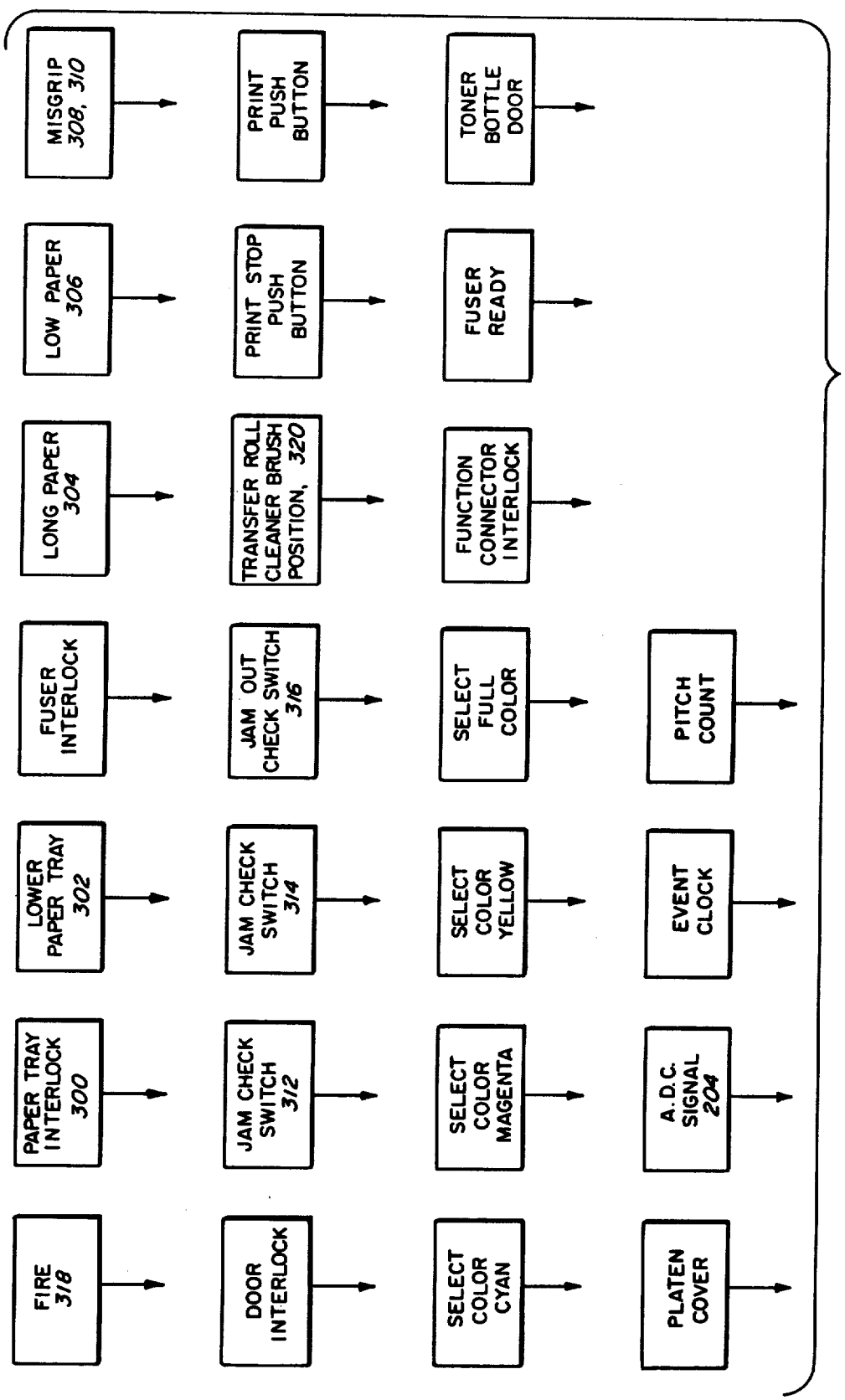
FIG. 18 is a diagram illustrating the various apparatus status indicating means of the apparatus of FIG. 2.

The various machine events occurring at these different logical times are illustrated in the apparatus timing diagrams of FIGS. 21, 22 and 23. FIG. 21 illustrates the timing of machine events in producing a single composite color copy from the three color components cyan, magenta and yellow. In this mode of operation, printing occurs in the time required for three cycles or revolutions of the photoreceptor drum while the "cycling-out" events of stripping, fusing and shut down are performed in the successive three cycles. FIG. 22 illustrates the timing of events for producing a single composite color copy from two of the color components. In this mode of operation, printing occurs in the time required for two cycles or revolutions of the photoreceptor drum while the "cycling-out" events are performed in three successive cycles. FIG. 23 illustrates the timing of events for producing three single copies in one of the colors cyan, magenta or yellow. In this mode of operation, printing occurs in the time required for three cycles or revolutions while the "cycling-out" events are performed in the three successive cycles. The use of the event clock signal and the pitch signal will be discussed in more detail hereinafter with respect to the apparatus control means. These various machine condition indications and input signals are summarized and are represented in block form in the diagram of FIG. 18.

APPARATUS STATES

The apparatus operation exhibits 15 distinct operating states. These 15 states have associated with them different operating conditions. As is indicated hereinafter, a state register is provided for maintaining a record of the machine state which the apparatus is in for purposes of control. The state register comprises a four bit shift register and each of the combination of outputs from the register represents one of the states. The state's number, its name, a description of the operating status of the apparatus when in the associated state, and a description of the output functions performed by the apparatus within that state are listed below.

| State | Name | Description of State | State Output Functions |
|---|---|---|---|
| 0 | ON 1 | Power on. System remains here while initialization is taking place. Machine stop conditions causes | Reset Toner Dispenser Generate STOP (with JAMMEM) Enable KEY OP LAMP (with JAMMEM) |

-continued

| State | Name | Description of State | State Output Functions |
|---|---|---|---|
| | | the logic to return to this state. | Enable NOT READY LAMP<br>Reset Color Sequencer<br>Reset Detail Timer<br>Reset Paper Feed Flip-Flop |
| 1 | ON 2 | Logic stops here for one input scan after initialization. | SAME FUNCTIONS AS IN 0 |
| 2 | FUSER WARMUP | System stops here while fuser is warming up. Remains here until a fuser ready condition is generated. | Enable MAIN DRIVE GROUP<br>Enable NOT READY LAMP<br>Enable FUSER AUX. HEATER<br>Enable KEY OP LAMP (with JAMMEM) |
| 3 | CLEAN IN PROCESS | System stops here if transfer roll cleaning is in process long enough to return brush to home position | Enable MAIN DRIVE GROUP<br>Enable NOT READY LAMP<br>Enable KEY OP LAMP (with JAMMEM)<br>Enable FUSER AUX. HEATER<br>Used for Transfer Roll Cleaning Index Motor |
| 4 | STDBY 1 | Normal position. Print button becomes operational. Will hold here if a condition blocking a print cycle is present. | Reset Color Sequencer<br>Unlock Color Mode Control<br>Enable KEY OP LAMP & NOT READY LAMP (with JAMMEM)<br>Enable READY TO COPY LAMP (without KEYOP)<br>Enable FUSER AUX. HEATER |
| 5 | STDBY 2 | States 4 & 5 function together as one logic state. | SAME FUNCTIONS AS IN 4 |
| 6 | WAIT FOR ZERO | Waiting state from the time print button is pressed until the time print cycle can begin. | MISGRP & PAPPOS switch sampling<br>Enable PROCESS DRIVE GROUP<br>Enable WAIT FOR COPY LAMP<br>Enable MAIN DRIVE GROUP<br>Enable FUSER AUX. HEATER |
| 7 | PRINT | All drives on. A scan is in progress or an additional scan will be made. | Enables MAIN DRIVE GROUP<br>Enables PROCESS DRIVE GROUP<br>Enables WAIT FOR COPY LAMP<br>Enable Color Sequencer<br>Enable TRANSFER ROLL<br>Engage SOLENOIDS (with CLEAN |
| 8 | RESYNC | All drives on. Begins at coincidence or print stop and lasts until last scan is complete. | Enable MAIN DRIVE GROUP<br>Enable PROCESS DRIVE GROUP<br>Enable WAIT FOR COPY LAMP<br>Enable TRANSFER ROLL ENGAGE SOLENOIDS<br>Enable FUSER AUX. HEATER |
| 9 | TRANS-FER | All drives on. Begins at completion of last scan and lasts until last transfer is complete. | Enable MAIN DRIVE GROUP<br>Enable PROCESS DRIVE GROUP<br>Enable WAIT FOR COPY LAMP<br>Enable TRANSFER ROLL ENGAGE SOLENOIDS<br>Enable FUSER AUX. HEATER |
| 10 | CYCLE OUT | All drives on. Begins at completion of last transfer and lasts until last copy exits machine or print button is pushed. | Enable MAIN DRIVE GROUP<br>Enable PROCESS DRIVE GROUP<br>Enable WAIT FOR COPY LAMP<br>Unlock Color Mode Control<br>Transfer Roll Cleaning Index Motor<br>LAST COPY |

-continued

| State | Name | Description of State | State Output Functions |
|---|---|---|---|
| | | | Enable READY TO COPY LAMP (with KEYOP) Enable FUSER AUX. HEATER |
| 11 | CYCLE OUT | States 10 & 11 function together as one logic state. | SAME FUNCTION AS IN 10 |
| 12 | RESTART | Allows the completion of the clean cycle in progress before a new print command is honored. | Enable MAIN DRIVE GROUP Enable PROCESS DRIVE GROUP Enable WAIT FOR COPY LAMP Reset Programmer Enable FUSER AUX. HEATER |
| 13 | GO | Provides synchronous initiation of a new print cycle from restart. | Enable MAIN DRIVE GROUP Enable PROCESS DRIVE GROUP Enable WAIT FOR COPY LAMP Enable FUSER |
| 14 | NOT USED | | |
| 15 | FUSER RUNOUT | Provides for runout of existing post transfer copies in the event of a pre-transfer jam. | Enable MAIN DRIVE GROUP Enable WAIT FOR COPY LAMP LAST COPY SIGNAL IN RUNOUT MODE Enable FUSER AUX. HEATER |

A control for the apparatus, described in detail hereinafter, will sense the state of the apparatus and cause the associated output functions to occur.

The transitions between the various states of the apparatus are illustrated in FIG. 24 by a flow chart which illustrates the various states of the apparatus. The states from off through state 3 represent the initializing action of the apparatus prior to advancing the machine into a standby condition for printing. The apparatus advances from the standby condition 4 to the print state 7 and multiple copies are formed by cycling through states 7, 8, 9, 10, 11, 12 and 13. When the last copy has been transferred, the apparatus cycles from state 10 to state 4 as indicated by the last copy line. Faults occurring during the operation of the apparatus such as misgrips cause a fuser run out condition illustrated by state 15. After the last copy has been cleared subsequent to a fuser run out condition, the machine is returned from the state 15 to a standby condition 4.

APPARATUS CONTROL

GENERAL

Operation in one of the plurality of modes of the apparatus is provided for by a control means which is adapted to receive operating mode selection information presented to it by an operator through input mode section switch means and to effect actuation of the various controlled elements referred to hereinbefore in timed relationship with respect to rotation of the photoreceptor. An apparatus control means is illustrated in FIG. 25 by the block 330. The apparatus control means 330 comprises a programmable control which is adapted for causing a sequence of operations to occur, dependent upon the state of various apparatus components, and in accordance with the selected mode of operation. In general, the control 330 is arranged as a logical processor which continuously operates upon an execution program stored in a first read-only memory (ROM). A second ROM is provided and stores a sequence control program. It is structured as an address table for the first ROM wherein each address of the second ROM also corresponds to an input/output address, i.e., an address of particular inputs to the control and of outputs from the control. Inputs to the control 330 comprise the information derived from the machine condition indicators, described hereinbefore and shown in FIG. 18, while outputs from the control are applied to the various controlled elements, also described hereinbefore and shown in FIG. 17. Each program word in the address table of the second ROM comprises the starting address for a block of words of a subroutine located in the first ROM. A word in the first ROM comprises the instruction/operation word for the control and is divided into an address data field, a BUS control field, and an instruction field. This word determines the conditions for enabling each output by examining required machine inputs and the previuos operating states. The instruction code addresses a third ROM storing a processor control program whose words execute the instruction.

Controller 330 advantageously provides for altering the programs in order to establish a different operating program and thereby permits changes in the machine operation to accommodate variations and changes in the apparatus. Such modifications often become desirable with different production models of the apparatus, with apparatus of the same class, and when providing special or particular features for an apparatus. The configuration of the control 330 provides for altering the operating program for replacing the first ROM with a ROM having a modified program or routines, by replacing the second ROM to provide a modified address table, or by replacing a third ROM to control the initial operation of the controller in order to accommodate different machine needs. The controller 330 will be described in greater detail hereinafter. In order to appreciate its operational characteristics and the accompanying advantages, the means for coupling input information to the controller and for coupling control information to controlled elements will first be described.

MATRIX ARRAY

The complexity of the apparatus and the number of components required as reduced by arranging the input indicators, described hereinbefore as the elements 297 (FIG. 25) of an X-Y matrix array, 332. This array is electrically scanned along both the X and Y axes. The input indicators 297 are illustrated as switch contacts which are coupled between X nd Y lines at the matrix intersections of the X and Y lines. An X driver circuit arrangement 334, comprising conventional power output driving means, scans, in response to a control input from a matrix column and row signal generator 336, and sequentially provides an enabling potential at the input lines $X_O$, $X_1$, $X_2$ and $X_3$ of the input matrix 332. In a particular example, each of the X lines is sequentially enabled for a period of time which is on the order of 256 microseconds. As one of the X lines is enabled, each of Y lines which are coupled to switches associated with the enabled X line, will provide an information input. These lines are successively scanned by an eight input multiplexer 338. Each Y axis is scanned for an interval of time, which for example, is on the order of 32 microseconds. At the completion of a 256 microsecond interval each of the Y lines has been scanned and a successive X axis is then enabled. The Y axis lines are coupled to the multiplexer 338 through Y axis line receivers 340. Thus, over an interval of time of about one millisecond each of 32 informational elements at the X-Y intersection is interrogated for approximately 32 microseconds by the multiplexer 338.

FREQUENCY DIVISION

A source of timing signals for the electronic portions of the apparatus is provided by a 500 kh clock pulse generator 342. This generator is employed in addition to the pitch-pulse and residue generator which, as indicated hereinbefore, generate timing signals representative of the rotary position of the photorceptor. The clock frequency is reduced by a frequency divider 344, which, for example, comprises a Binary counter and provides successively recurring output signals having a period of about 32 microseconds. This signal is applied to the multiplexer 338 and the multiplexer input signals are coupled from the multiplexer unit 338 via signal/noise discriminator 346 to the control 330.

The input signals to the control 330 contain input status information in the form of a 32 bit data train wherein each bit is approximately 32 microseconds wide. The input information in this signal is derived from switch contacts and the like which are susceptable to contact bounce. The signal is thus susceptible to significant noise which can create false indications. To reduce this adverse result, an information pulse is repeatedly sampled for relatively short intervals of time during its occurrance and the samples are compared. A uniformitity in the sampling results indicates error-free information while a nonuniformity indicates a possible error. For example, each information pulse is sampled every four microseconds during its 32 microsecond duration. When four samples are determined to have the same logical level i.e., a "1" or "0", then the input is determined to be a "1" or a "0", by a discriminator 346. When all four samples do not agree, then the input is determined to be possibly erroneous and is ignored by the apparatus control. The Y receivers 340, input multiplexer 338, frequency divider 344 and noise discriminator 346 are described in greater detail hereinafter with respect to FIG. 33.

An output matrix array 298 is also provided having a plurality of X-axes inputs and plurality of Z-axes inputs. Each of the various controlled elements illustrated in FIG. 17 and described hereinbefore comprise loads 296 which are coupled at the intersection of the X and Z lines to form the output matrix array. The X lines are enabled successively, as indicated hereinbefore, by the X drivers 334. The Z drivers 349 which comprise, for example, transistors adapted to ground an associated Z line in response to a control signal from the apparatus control 330, successively scan the Z lines and energize a selected load at the intersection of an X and Z line matrix.

CONTROLLER

A schematic diagram in block form of the controller 330 is shown in FIG. 26. Controller 330 comprises a microprocessor having an instruction memory arrangement which includes a first ROM memory 400, an associated memory counter, 402, a second ROM memory 404 and its associated memory counter 406. In this controller arrangement the memory 400 operates as a subroutine table wherein each subroutine includes one or more words in designated memory locations. The memory 404 comprises an address table and operates to indicate the starting address of a subroutine in the memory 400. The controller operates under the supervision of an instruction decode and timing means, 408. Any action indicated by the instruction decode and timing means 408 is determined by an instruction code field B4-B6 of the instruction word addressed in the memory 400 as well as by the result of various compare test instructions which are performed on the inputs, the machine state, or the machine dynamic position as indicated by the machine timing pulses.

INSTRUCTION WORD

An instruction word of the ROM memory comprises 12 bits, B11 . . . B0, wherein B11 is the most significant bit (MSB). The word is divided into three fields as follows:

a. Address-Test Field-5 bits including B7-B11 wherein B11=MSB. This field is used for addressing the input to the apparatus, for addressing a random access auxiliary memory discussed hereinafter, for testing of the machine state, and for a timing sequence and a display of a diagnostic testing of the apparatus.

b. Instruction Field-3bits, B4-B6 wherein B6=MSB. This field determines the nature of the operation to be performed by the controller in conjunction with an output of a bus control multiplexer 420. (FIG. 26)

c. Bus Control Field-4 bits, B0-B3, wherein B3=MSB. This field selects the outputs of the input memory buffers, the auxiliary random access memory, the machine state, and the timing sequence test results. This select output is applied as input to the instruction decode block 408. Informational inputs from read-and-write auxiliary memory 410, from read-and-write auxiliary memory 412, an apparatus state register 414, an input indicator or buffer 416, and a timing register comparator 418 are selectively coupled to the instruction decode and timing block 408 through a bus control multiplexer 420.

Outputs of the instruction decode and timing block 408 are coupled to the the ROM memory counters 402 and 406 for incrementing the memories 400 and 404 respectively, to the state register 414 for strobing this register, to the auxiliary memories 410 and 412, and to the address port 422. In addition, an input to the address port 422 is provided from the counter 406 for simultaneously addressing input and output buffers 416 and 424 respectively when the memory 400 is addressed. This provides for addressing the first word of a particular subroutine in the memory 400 as well as the input buffer indicators and the output controlled elements of interest with respect to a particular machine program. A display and diagnostic means 426 is provided and coupled to the auxiliary memories 410 and 412. The display and diagnostic means provides for display of machine characteristics and for indicating possible causes of machine malfunctions, should a malfunction occur.

In operation, the ROM memory 404 is incremented at the completion of an instruction thereby establishing a new address for a next subsequent instruction or subroutine. At the same time, the memory 406 also addresses the input and output buffers 416 and 424 which store input and output information relative to the routine to be executed. As indicated, the bus control field B0-B3 is applied to the bus control multiplexer 420 for selecting a particular input and for coupling the selected input to the instruction decode block 408. The instruction field B4-B6 which is also coupled to the block 408 addresses one of two words in an instruction decoding ROM. The output of the bus control multiplexer 420 enables one of these two addressed words and the enabled word of the instruction decoding ROM provides for incrementing the memories 400 and 404; provides a strobe of the output buffer auxiliary or machine state memories; provides a data bit for the output memory; and conditions an instruction skip flip-flop, described hereinafter. The program starts at the first input-output buffer address which corresponds with the first address in the memory 404 and continues through all of the input output functions and internal subroutines that may be required to the end and then returns to the starting address and repeats. An instruction cycle requires on the order of about 8 microseconds. A typical program employs subroutines which require a total of about 500 instructions. An entire program can, for example, be executed and the controller automatically readied for reexecution of the program in about 4 milleseconds.

INSTRUCTION CODES

All instructions are represented by a three bit fiel which, as indicated hreinbefore, comprise the bits B6, B5, and B4 of an instruction word in the memory 400. As will be described in detail hereinafter, an output of the bus control multiplexer 420 is employed as a fourth bit in the instruction code. The complete instruction code addresses a ROM of the instruction decode and timing block 408 and operates to produce two different results depending upon the state of the bus control multiplexer output. This will also be described in more detail hereinafter. The three bit instruction code provides for 8 independent instructions. These instructions are:

INPUT OUTPUT INSTRUCTIONS

| Mnemonic | Code |
|---|---|
| LDl | 000 |

This instruction directs the apparatus to write a logic "1" into an output memory element of the buffer memory 424 which is addressed by the counter 406 when a logic "1" output exists from the bus control multiplexer 420. Although this instruction is conditioned upon the output of the bus control multiplexer 420, an unconditional write "1" output can be provided through the selection of a fixed "1" input at one of the input terminals of the multiplexer 420. This is accomplished by addressing the fixed terminal input with the bus control multiplexer field of the instruction word.

LD0=001

This instruction directs the apparatus to write a logic "0" into the output memory element buffer location which is addressed by the counter 406 when a "1" is provided by the bus control multiplexer output. This instruction is made unconditional as with the LD1 instruction.

MEMORY/REGISTER LOAD INSTRUCTIONS

LDA=010

This instruction directs the apparatus to load the RAM auxiliary 410 with the output of the bus control multiplexer at a location in the memory 410 which is specified by the address field B7-B11 of the instruction word of the memory 400. An unconditional logic "1" and "0" can be loaded into the memory 410 through the selection of a fixed input to a bus control multiplexer terminal by the bus control multiplexer selection field B0-B3 of the instruction word in the memory 400. One input to the bus control multiplexer 420 comprises information in the input output buffers 416 and 424 respectively. The information from these buffers can be sorted in the auxiliary memory 410 by selection of their input to the bus control multiplexer 420 through the bus control multiplexer field B0-B3 of the instruction word in the memory 400.

LDB=011

This instruction directs the apparatus, when a logic "1" output exists from the bus control multiplexer 420, to load the auxiliary memory 412, at an address selected by the address field B7-B11 with the contents, plus 1, of a 4 bit counter in the memory 412. Alternatively, when the output of the bus control multiplexer 420 is a logic "0", then the apparatus is directed to load a 4 bit counter of the auxiliary memory 412 with a word from the auxiliary memory which is addressed by the address field B7-B10 of the instruction word memory 400.

LDS=100

This instruction directs the apparatus when a logic "1" output from the bus control multiplexer exists to load the machine state register 414 with the address field B7-B10 of the instruction word in the memory 400. The loading of the state register 414 is made unconditional by addressing a multiplexer terminal having a fixed input logic "1" through the BCM address field B0-B3 of the instruction word in the memory 400. This load may be conditional upon the contents of the input output buffer memories by addressing their input terminals at the bus control multiplexer 420.

SKIP INSTRUCTIONS

JSF=101

This instruction directs the apparatus, when the output of the bus control multiplexer is a logic "1", to set an instruction skip logical unit thereby causing successive instructions to be ignored. The instruction skip logical unit is set unconditionally when the address field addresses an input terminal of the bus control multiplexer 420 having a fixed input logic "1". The setting of the logic unit can also be conditioned by addressing other terminals of the bus control multiplexer 420. This instruction also directs the resetting of the logic skip unit when the output of the bus control multiplexer 420 is a logic "0". Again, this resetting is made unconditional by addressing a bus control multiplexer input terminal having a fixed input or it can be rendered conditional by addressing other terminals of the BCM.

JUMP INSTRUCTIONS

JNR=110

This instruction directs the apparatus to jump to the next address in the ROM memory 404 and the associated subroutine in the memory 400 when the bus control multiplexer 420 provide a logic "1" output. Otherwise, the next instruction in the memory 400 is executed. This jump may be unconditional or conditioned by addressing terminals in the BCM 420.

JIR=III

This instruction directs the apparatus to reset the instruction skip logic unit and unconditionally jump to the next address in the memory 400. These steps are unaffected by the output of the bus control multiplexer 420.

A typical subroutine, listed in mnemonic form, and which is adapted for control of the grip solenoid is as follows:

| ROUTINE | ADDRESS FIELD | INSTRUCTION FIELD | BUS CONTROL FIELD |
|---|---|---|---|
| 1. GRIP | FCYC | JSF | 12 |
| 2. | T10 | LD1 | 07 |
| 3. | T24 | LD0 | 07 |
| 4. |  | JRF | 15 |
| 5. | CCYC | JSF | 12 |
| 6. | T25 | LD1 | 07 |
| 7. |  | JRF | 15 |
| 8. | FC | JSF | 12 |
| 9. | T24 | LD0 | 07 |
| 10. |  | JIR |  |

This sequence comprises a routine for controlling the grip solenoid and occurs as program steps 223 through to 232 of the sample program for a color copier listed in detail hereinafter. The mnemonic code is converted by an assembler program (in an Univac 1106 computer for example) to the program in binary form for use in the present processor. In the above indicated routine, the address field and the instruction field are in mnemonic form while the bus control field indicates the terminal of the bus control multiplexer which is being addressed. In this subroutine, the second and third instructions will be executed only if the location specified by the address field of the instruction contains a "1". Otherwise the instruction skip logic unit will be set and the following two instructions will be skipped. When the address indicated by the address field instruction does contain a "1", then the memory element of the output buffer associated with grip will exhibit a "1" stored at a timing sequence equal at 10 and a "0" will be stored at a timing sequence equal to 24. Thus the instruction field of instructions 2 and 3 are LD1 and LD0 respectively. The solenoid connected to this output memory unit will be energized at the time T10 and will be deenergized at time T24. The fourth instruction is an unconditioned reset of the instruction skip logic unit and allows the next instruction to be executed. The 6th and 9th instructions will be executed only if the location specified by the address field for the 5th and 8th instruction contains a "1". The solenoid will be energized at time T25 if address CCYC contains a "1" and will be deenergized at the time T24 if address FD contains a "1". The 10th instruction is an unconditional reset of the instruction skip logic unit and also provides a link to the next routine.

DETAILED DESCRIPTION OF THE CONTROLLER

The controller is illustrated in detail in FIGS. 27 through 31. Reference numerals employed hereinbefore for designating components are utilized in these figures to represent the same components.

BUS CONTROL MULTIPLEXER

The bus control multiplexer 420, as illustrated in FIG. 27, comprises a digital, 16-bit addressable, multiplexer. It is employed for selectively coupling one of the 16 binary information inputs at terminals $E_0$-$E_{15}$ to an output terminal $I_1$ in accordance with binary terminal selection data applied to input terminals A-D. Information at an input terminal thus selected is coupled to the output terminal $I_1$ by a relatively short duration strobe pulse which is applied to an input terminal E. The output of the terminal $I_1$ of the multiplexer is coupled to an R-S flip-flop circuit arrangement 501 which stores the information. An output of the flip-flop 501 is coupled to an instruction ROM 538 and, as indicated hereinbefore, comprises a fourth bit in the instruction code. The bus control field $B_0$-$B_3$ from an instruction word in the memory 400 is applied to the multiplexer address input terminals A-D for selecting one of the input terminals for coupling to the output terminal $I_1$ of the multiplexer.

The information which is applied to the input terminals $E_0$-$E_{15}$ of the multiplexer 420 comprises both fixed information and event information. The fixed information comprises ground potential representing a logic "0" which is applied to a terminal $E_{14}$ and a positive potential representing a logic "1" which is applied to terminal $E_{15}$ and which is derived from a positive potential source through an impedance 503. These inputs when selected, provide for an unconditional output from the multiplexer 420. Informational inputs to the multiplexer include the output of a comparator 504 (FIG. 30) which compares the output of the auxiliary memory 412 with other data sources and provides a result indicative of the comparison. The outputs at terminals 506, 508 and 510 of the comparator 504 represent respectively that the binary value of the input to terminals $A_0$-$A_3$ is greater than the binary value of the inputs to terminals $B_0$-$B_3$, that the input to the A terminals is less than the input to the B terminals, or that the input to the A terminals is equal in value to that applied to the B terminals respectively. An inverting amplifier 512 is provided, as illustrated in FIG. 30, and is coupled to the terminal 510 for providing a complement of the logical function at terminal 510, i.e., that A is unequal to B. The terminals 506, 508, 510 and the amplifier 512 are coupled respectively to input terminals $E_2, E_3, E_1$ and $E_0$ of the multiplexer 420.

Machine state and timing information is coupled to terminals $E_4$ through $E_7$ of the multiplexer 420. The inputs to terminals $E_4$ and $E_5$ comprise the output of a machine state comparator 514 (FIG. 31) which compares the contents of a previous entry into the machine state register 414 with the address test field of the instruction being executed and provides an output, A-B at a terminal 515 upon comparison. The complement of the output at terminal 515 is provided by an inverting amplifier 516. The output at the terminal 515 and the amplifier 516 are coupled to input terminals $E_5$ and $E_4$ respectively of the multiplexer 420. Similarly, timing information respecting the rotary position of the photoreceptor is provided through a comparator 518 (FIG. 31) which compares the residue count of counters 519 and 520 with the address-test field. The output of the comparator is provided at an output terminal 521 while its complement is provided by an inverting amplifier 522. The terminal 521 and the output of the amplifier 522 are coupled respectively to input terminals $E_7$ and $E_6$ of the multiplexer 420.

Input data to terminals $E_9$ and $E_8$ of the multiplexer is derived from a buffer memory element, and its complement, of the input buffer 416 as addressed by the field $B_{11}$-$B_7$. This information is provided through a multiplexer 524 (FIG. 29). The output terminals 526 and 528 of this multiplexer are coupled to input terminals $E_9$ and $E_8$ respectively of the multiplexer 420. Similarly, input data to the terminals $E_{11}$ and $E_{10}$ of the multiplexer 420 is derived from a memory element, and its complement, of the input buffer 416 as addressed by the memory counter 406. This data is provided through a multiplexer 530 (FIG. 29). Output terminals 532 and 534 of this multiplexer are coupled to input terminals $E_{11}$ and $E_{10}$ respectively of the multiplexer 420.

The remaining inputs to the multiplexer 420 are coupled to terminals $E_{13}$ and $E_{12}$ and comprise the output, and its complement, respectively of the auxiliary memory 410 as addressed by the address field $B_{11}$-$B_7$. As illustrated in FIG. 30, the auxiliary memory 410 includes an output terminal W which is coupled to input terminal $E_{13}$ of the multiplexer 420. The complement of the output terminal W is provided by an inverting amplifier 536, the output of which is coupled to terminal $E_{12}$ of the multiplexer 420.

INSTRUCTION DECODER

A 32 x 8 instruction decoding ROM 538 is provided for decoding the instruction field of the word in the memory 400. The instruction address is then modified in accordance with the output state of the bus control multiplexer 420. The instruction field $B_4$-$B_6$ is applied from the ROM 400 to input terminals $A_0$-$A_2$ respectively and, in conjunction with the output of the bus control multiplexer 420 which is stored in the flip-flop 501 and which is supplied to input terminal $A_4$, addresses a memory location in the ROM 538. The addressed location provides an output word containing control information at output terminals 540–554. The output data from the terminals 540, 542, 544 and 546 comprises respectively an enable for incrementing the counter 404, an enable for incrementing the counter 400, a data out bit comprising a logic "1" or a logic "0" depending on the memory location of the ROM 538 addressed, and an output buffer enable. The first three information outputs are coupled to input terminals 1A, 1B and 1C respectively of a quad, two-bit multiplexer 556. The output buffer enable is applied to terminal 1D of the multiplexer 556 from a decoder 558. Data input to the decoder 558 is provided at terminals $A_0$ and $A_1$ from output terminals 546 and 548 of the instruction ROM 538. The decoder 558 decodes the binary input to the terminals $A_0$ and $A_1$ and provides a digital output at terminals 0, 1, 2 and 3. When a logic "0" is applied to the terminal $A_0$ and to terminal $A_1$, then an output buffer enable is detected and provided at output terminal 0. This in turn is coupled to terminal 1D of the multiplexer 556.

The multiplexer 556 is employed in conjunction with a dual J-K flip-flop 560 for inhibitng data transmission during a start-up routine for the control. The start-up routine is enabled by a master clear switch 562 which resets the start-up flip-flop. In the reset state Q, the flip-flop 560 enables a set of inputs that are hard-wired. Input $O_A$ is hard-wired to a logic 1 level. Inputs $O_b$, $O_c$, $O_d$ are wired to logic O level. The multiplexer outputs then comprise an incrementing pulse for counter 406, an enable for the output buffer and a data set to logic "O" for the output buffer. The terminals C and D of the multiplexer 556 are coupled to input terminals 562 and 564 respectively of a two-bit quad multiplexer 566 (FIG. 29) of the input-output buffer. The A terminal output of the multiplexer 556 is applied to a NAND gate 568 which is pulsed by a clock pulse thereby generating an incrementing signal for the counter 406. This incrementing signal is applied from the gate 568 to an input terminal 570 (FIG. 28) of the counter 406. Since this counter addresses the output buffer memory, a continuous stepping of the counter 406 addresses each of the output memory locations and sets the contents of each memory location to "O". After one complete scan of all outputs, a reset pulse MR 1 is generated at an output terminal 572 of the counter 406 and is applied to the terminal 568 of the start-up flip-flop 560 thereby setting this flip-flop from the start-up state to an operating state. When the flip-flop 560 is thus set, the multiplexer inputs are derived from the ROM 538 and DECODER 558 and the multiplexer 556 is enabled for providing outputs at terminals A, B, C, and D in response to the output from the instruction ROM 538.

INSTRUCTION CYCLE

An instruction is executed in a four-phase sequence. The sequence is generated by a two-bit, dual, J-K flip-flop 574 (FIG. 27) which is stepped by a clock-pulse supplied to the input terminal CP of this dual flip-flop counter. The clock pulse is derived from the clock-pulse generator 342 (FIG. 33) and is applied to the counter through a NAND gate 576. This NAND gate is enabled manually, or automatically by clock pulses through a switch 578. When the switch removes ground potential from an input terminal 580, then an inverting amplifier 582 provides an enabling potential to the NAND gate. The stepping of the counter 574, in response to input clock pulses, generates pulse sequences at its output terminals which are decoded by a dual, one of four decoder 584 to provide the four-phase output at its output terminals 0, 1, 2, and 3. These instruction cycle pulses are utilized for causing the controller to sequence through predetermined steps in executing an instruction, and are illustrated in FIG. 32.

In addition to the automatic stepping of the counter and generation of the instruction cycle pulses, means are provided for operating in a manual mode whereby the controller is stepped manually or with the use of an external clock for debugging and test purposes. In FIG. 27, an R-S flip-flop 586 is provided which is manually stepped by actuation of a grounded switch 588. An output from this flip-flop is coupled to a NAND gate 592 for application to the input terminal $C_p$ of the counter 574. Thus, by successive manual actuation of the switch 588, the counter 574 is stepped and the instruction cycle is manually executed. The master clear signal provided by switch 562 is also coupled to a pair of inverting amplifiers 594 and 596 for resetting the instruction cycle counter 574.

There is illustrated in FIG. 32 the various signal waveforms and relative timing of signals employed in executing an instruction cycle. A waveform 583 at output terminal O of the decoder 584 is applied through an inverting amplifier 598 to the terminal E of the multiplexer 420. A segment 585 of this waveform is inverted by the amplifier and the multiplexer 420 is thus held in a disabled condition for the duration of this waveform segment. This permits data which is presently addressed by the memory 400 which is applied to the input terminals $E_0$-$E_{15}$ to stabilize at the multiplexer input. Any logical compare operations that are performed with the address field $B_7$-$B_{11}$ are executed and completed at this time. The pulse segment 585, as inverted, is also applied to and resets the flip-flop 501. At the end of this phase, i.e., at time $t_1$ (FIG. 32) the strobe pulse enables multiplexer 420 and in conjuction with the address applied to the input terminals A-D conditions and latches multiplexer to one of the input terminals.

The output of terminal 1 of the decoder 584 is coupled through an inverting amplifier 600 to a NAND gate 602. A clock pulse from the NAND gate 576 is also coupled to the NAND gate 602 for triggering a skip flip-flop 604. This flip-flop comprises a dual J-K flip-flop which is reset by an output pulse 601 (FIG. 32) of the gate 602, depending upon the instruction code of the instruction being executed as determined by the contents of the instruction ROM 538 which is addressed by the field $B_4$-$B_6$. Two-bits of the output of the ROM 538 are coupled to the skip flip-flop 604 and the programming of these bits determines the next state of the flip-flop. The set state of the skip flip-flop 604 disables all operations except an increment to the next memory location in the memory 400 or program step. A disable output lead is coupled from output terminal Q of the flip-flop 604 to input terminal $A_3$ of the ROM 538. The master clear signal, derived from switch 562, is also applied to the flip-flop 604 for resetting it. Stepping of an auxiliary memory output counter 690 (FIG. 30) is also enabled during the second phase of the instruction cycle. The second phase clock pulse which is provided by NAND gate 602 is coupled through an inverting amplifier 607 to a NAND gate 609. Stepping of the counter is conditioned on the instruction word content of ROM 538. An output from the ROM terminal 554 is applied to the gate 609. The stepping signal from the NAND gate 609 is applied to the counter 690.

An instruction output signal from terminal 2 of the decoder 584 is applied through an inverting amplifier 606 to a NAND gate 608 along with a reset output from the skip flip-flop 604. This signal enables a strobe line for the output buffer memory elements (FIG. 29), the auxiliary memory 410, and the state and timing registers (FIG. 31). The enable condition is provided by the clock pulse and the reset state of the instructions skip flip-flop. The selection of a particular output strobe line from the decoder 558 that is enabled during this cycle is determined by the other two bits of the ROM memory 538 which are applied to input terminals $A_0$ and $A_1$ of the decoder 558.

The final phase of an instruction cycle is provided by a signal at an output terminal 3 of the decoder 584 which is coupled through an inverting amplifier 610 to the NAND gate 568 and to a NAND gate 612 for enabling an increment or clock pulse line to the counters of memories 400 and 404. The state of the NAND gates 568 and 612 is determined, as indicated hereinbefore, by two bits of the instruction ROM output during normal operation. During start-up only an increment for the memory 404 is provided. This fourth phase of the instruction cycle is abbreviated since it is also employed to reset the two bit counter 574. Reset is accomplished by coupling back the signal from the output of the NAND gate 568 to the terminal $C_d$ of the counter 574. At the initiation of this fourth cycle, a word in the ROM 404 is loaded into the counter 402 only if an increment of the ROM 404 has been enabled. The counter 574 is reset at this time. As the counter 574 is reset, the fourth phase of the instruction cycle is abruptly terminated as indicated by the relatively short duration negative going output pulse 613 (FIG. 32) at terminal 3 of the decoder 584. At this time also, an increment to the ROM 404 and an increment to the ROM 400 takes place depending on the information content of the output word of the instruction ROM 538.

ROM MEMORIES

The ROM 400 (FIG. 28) comprises a first 512 by 4-bit memory array 650, a second 512 by 4-bit ROM array 652, and a third 512 by 4-bit ROM array 654 arranged to provide a ROM assembly for storing 512 12-bit words. The bus select field is provided by the array 654, the instruction field by the array 652 and the address test field by the array 650 and by 1-bit in the array 652. The address counter 402 for the ROM 400 is formed by three 4-bit up-down counters 656, 658 and 660. The outputs of these counters address the memory location in the ROM 400 of an instruction being executed. These counters are adapted to select any one of the 512 memory locations in the ROM 400. They are intercoupled to provide a single counter adapted to provide the binary output count of 512. This composite counter is incremented or stepped by an input pulse at terminal 662 which is derived from the NAND gate 612, discussed hereinbefore. In addition, the counter units 658 and 660 are enabled for the transfer of information to this counter from the ROM 404 by a signal at the terminal 570. This signal is applied to terminals $P_e$ of the counter units.

The ROM 404 comprises a memory adapted to store 256 8-bit words. It is addressed by the counter 406 which is formed of two 4-bit up-down counters 664 and 666.

In addition, the output of these counters at terminals 668 through 678 are coupled to 2-bit quad multiplexers 684 and 566 (FIG. 29) of the input/output port and the terminals 668 through 674 are coupled to the 2-bit quad multiplexer 686 (FIG. 30) of the auxiliary memory. The circuit arrangement of FIG. 28 serves as a memory link, as a program and address counter, and as a storage for the operating program. The counter 406 comprises an 8-bit binary counter which directly addresses the input-/output memory as indicated and the ROM 404. The output of the ROM 404 is coupled to eight inputs of the counter 402 which comprises a 12-bit synchronous binary counter. The output of this counter is wired to the address inputs of the ROM 400. The ROM 404 thus stores the eight least significant bits of the address of an instruction word in the ROM 400. The ROM 400 stores the operating program.

This memory has two operating modes. In a first mode, a word in the memory 404 is loaded into the counter 402 and the memory 404 is incremented. In this situation, the presently addressed word and the memory 404 is utilized to generate an address for the ROM 400 and the memory 404 is incremented to the next address. At the same time, the input/output address is also incremented. Therefore, each ROM 404 word can be programmed to point to a block of words and the ROM 400 which stores the operating information for each output in the machine.

In the other mode of operation, the memory unit is employed to count the ROM 400 to the next address or the next program location. The ROM 400 word then determines the next instruction to be executed. Since there is a separate counter 402 for the ROM 400, the ROM 400 address is automatically stored.

A conversion from an 8-bit ROM 404 word to a 10 or 12-bit ROM 400 address takes place in the counter 402. It is achieved by making the transitions in the ROM 400 address from 255-256, 511-512, 767-768, etc. in the latter mode of operation as described. In general, the ROM 404 word should have only that number of bits which form a number whose magnitude is greater than or equal to the maximum number of the operations required by any input/output function. The width of the ROM 400 word is determined by the requirements of the address-test field and the instruction set. A master clear signal from the switch 562 (FIG. 27) is also applied to terminal 684 for resetting the counter 402 and the counter 406.

The processor is programmable in that execution, sequence control, and processor control programs which are stored in the ROM memories 400, 404 and 538 respectively are alterable by substituting ROM memory units adapted to store a modified or different program. These memory units are replaced by arranging them as pluggable units for electrical coupling with a connector which, for example, is wired to a printed circuit board.

AUXILIARY MEMORIES

The auxiliary memory 410 is shown in FIG. 30 to comprise a one bit per word read and write memory (RAM) 675 which is formed in a 256 × 1 array and, an eight bit addressable latch 677. The capacity of the memory 410 is limited by the address field of the ROM 400. This memory is provided for storing various program flags and machine test conditions. Address selection in the memory 410 is provided by the quad, 2-bit multiplexer 686 and by the quad, 2-bit multiplexer 688. Inputs to these multiplexers comprise the address test field, 4-bits of which are applied to the multiplexer 686 and 1-bit of which is applied to the multiplexer 688 and by inputs from terminals 668 through 676 of the counter 406 (FIG. 28). Additional inputs to the multiplexer 688 include strobe pulses applied to input terminals 1b and 1d for respectively strobing the auxiliary memories 410 and 412. In addition, a data input from the bus control multiplexer output as derived from the flip-flop 510 is also applied to the input terminal $1_c$ of the multiplexer 688.

During the start-up mode of operation the start-up flip-flop 560 (FIG. 27) as described, provides an input enable to terminal 689 of the multiplexer 686 and 688. This signal enables inputs addressed by m11-m15 of the counter 406 and those inputs having a ground logic or "0" input. In this mode of operation, each word in the memory 410 is strobed and is set to "0". At the end of this start-up mode of operation, the address control for this memory is switched by the start-up flip-flop signal at terminal 689 to the inputs addressed by the field B7-B11 of the memory 400, to the strobe inputs and to the data inputs. During this operating mode, the memory strobe is derived from the decoder of FIG. 27 and the data input comprises the output of the bus control multiplexer which is derived through the R-S flip-flop 501 (FIG. 27). Timing data, for example, is derived from the timing disc and is coupled via the I/O Port 422, the multiplexer 420, the multiplexer 688 and the latch 677 to an output terminal 701 or to an output terminal 703. The address field B7-B11 will select one of these terminals for coupling to a timing counter (FIG. 31). Selection is based on whether the input timing pulses constitute pitch pulse or residue pulse information. The output of the memory 675 and its complement, as indicated hereinbefore is coupled to the input of the bus control multiplexer 420.

The auxiliary memory 412 comprises a 16 × 4 read-write memory (RAM) having memory locations which are addressed through the multiplexers 686 and 688. During the start-up mode of operation, the memory 412 is zeroed as was described with respect to the memory 410. The output of the memory 412 is coupled to a 4-bit up-down counter 690. The 4-bit counter 690 can be loaded from any location in the memory 412 and can be incremented and its contents can load the memory 412 with the result. Memory 412 is enabled by a strobe input from the decoder while the counter 690 is incremented by its complement which is applied thereto through an inverting amplifier 691. The outputs of the counter are coupled back to data inputs of the memory 412 and to the data inputs of a decoder-driver latch 693 for providing a display. The display indicates the copy count, a diagnostic indication of a malfunction, etc. In addition, an output of the counter 690 is compared with the address field B7-B11 which is applied to the comparator 504 along with the output of the counter 690, through a multiplexer 692, Alternatively, the contents of the counter 690 can also be compared with four other data sources which are applied to input terminals $O_a$-$O_d$ of the multiplexer 692. The most significant bit B11 of the address test field selects either the field $B_{10}$-$B_7$ or the four other inputs for application to the B input terminals of the comparator 504. Modal billing data and copy count selection switch data inputs are applied to dual 4-bit multiplexers 694 and 696. Output selection for these multiplexers is provided by the address test field bits $B_{10}$ and $B_{11}$. This arrangement of the memory 412 provides for a degree of feedback control, allows a more complex apparatus billing arrangement and copy count schemes and provides for a diagnostic display of machine malfunctions.

MACHINE STATE AND TIMING

The machine state register 414 as illustrated in FIG. 31 comprises a 4-bit parallel load shift register. It is analogous to a continuously addressed word of the 4-bit word of the read-write memory 412. Data input to the register comprises the address-test field, B7–B11 of the ROM 400. This data expresses which of the different machine operating states the machine is presently in. The output of the register is continuously compared with the address-test field of a present instruction word by the comparator 514. As indicated hereinbefore, the output of the comparator 514 and its complement are coupled as inputs to the bus control multiplexer 420. During the start-up mode, the register 414 is cleared to "0". During the program control mode, a strobe input signal at terminal 700 which is derived from output terminal 3 of the decoder 558 (FIG. 27) is utilized for enabling the register.

The timing counter 418 which is formed by the 4-bit up-down counters 519 and 520 remembers, in binary form, the positions of various moving hardware in the apparatus, of the xerographic image and of the copy paper in the machine with respect to a reference location. In operation, the output of this timing counter is continuously compared with the address-data field, B11–B7 by the comparator 518. The output of this comparator and its complement are coupled as inputs to the bus control multiplexer 420. This comparison between the programmed data and the dynamic counter information determines the on and off sequencing of apparatus hardware in the reproduction process.

The timing counter is stepped and is reset by input pulses applied to terminals 702 and 704 from terminals 701 and 703 respectively of the auxiliary counter 410. The counter is stepped by residue pulses derived from the timing disk of FIGS. 19 and 20 and is reset by a pitch pulse derived from the same source. Alternatively, the counter may be pulsed by signals from any repetitive fixed frequency source such as that derived from a 60 Hz A-C line or from a gear tooth which interrupts a magnetic path in the apparatus. In either case, it is necessary to establish a relationship between the frequency of the count of the pulse pitch train and the machine process speed. This correspondence is employed for translating from the timing required for each machine output that is sequenced on and off to a number that is generated in the timing counter.

The maximum number which is generated in the timing counter in the case of machine hardware derived pulses depends upon the time difference between successive pulses. This time differential may be large. In this case, the process is insensitive to pulse intervals and precise timing is achieved largely by good alignment by the hardware in the apparatus. The total number of pulses required is then given by the number of distinct on/off timing points for the machine hardware. The maximum number of pulses generated from a fixed frequency source depends on the input pulse train, which determines the time interval between successive pulses. For an asynchronous pulse train, this time should be relatively small when compared with the smallest time/distance interval in the machine process. Thus, a machine whose process is sensitive to the occurrence of successive time periods separated by precise small time intervals would require a high frequency input pulse train.

The timing counter is reset after each machine cycle. A cycle, comprises any significant time interval in the copying process such as the time required to move a piece of paper completely past a given point, or the time elapsed from the start of the copying operation to the production of a finished copy out of the machine.

INPUT-OUTPUT PORT AND BUFFERS

The input-output subsection of the controller, as illustrated in FIG. 29, provides a buffer memory between the machine electromechanical loads and inputs (FIGS. 17 and 18) and the control section. One bit of memory is provided for each input and each output. The output buffer memory elements comprise seven eight bit multiport registers. Three of these registers 710, 712 and 714 are illustrated in FIG. 29 while, for purpose of simplifying the drawings, the third, fourth, fifth, sixth and seventh registers are not shown. The register 710 provides one bit of memory for each of the outputs 1–8; the register 712 provides 8 bits of memory for the outputs 9–16; and, the register 714 provides 8 bits of memory for the outputs 49–56. The outputs of these registers are coupled to the Z line output drivers 349 (FIG. 25), which in conjunction with the X axis drivers 334, energizes matrix array 296 (FIG. 25).

The output buffer memory is advantageously operated, either simultaneously or alternatively in read and write modes. In the read mode, means are provided for reading out the contents of the output buffers and for driving the load elements of the copier apparatus through the Z drivers 349. In the write mode, the controller causes a logic "1" or "0" to be written into an addressed location. When operating in the read mode, two binary scanning signals RDI and RDO are applied to the input buffer registers via input terminals 730 and 732 (FIG. 29). These binary signals, which are illustrated in FIG. 34 are derived from a dual J-K flip-flop circuit 734 (FIG. 33). During a scanning cycle, these signals sequentially couple four bits of memory to output terminal $Z_a$ and four bits of memory to output terminal $Z_b$ of each register.

With the matrix arrangement 298 in FIG. 25, four rows are energized by continuous, non-overlapping, 25% duty cycle square wave, driving voltage source waveforms $X_0$, $X_1$, $X_2$ and $X_3$ as illustrated in FIG. 35. These waveforms are coupled from the decoder 735 (FIG. 33) of the matrix column and row generators 336 (FIG. 29) to the X drivers 334. The matrix columns provide a selective means of current return or for returning one end of a load to ground. Each output buffer memory bit is scanned sequentially and synchronously with the driving voltage waveforms. The other end of the load is connected through a diode for preventing current flow to one of the driving voltage lines. The Z or column drivers 349 (FIG. 25) are then energized only when an output bit is at a logic "1" level. Since the output bits are scanned synchronously with driving voltage waveform, to turn on a given load, a column driver is energized only during the time that the driving voltage waveforms is high or a "1". Each column driver is thus connected to four loads and each row driver is connected to 14 loads for a fully populated matrix. The arrangement is asynchronous in nature in that the controller determines the state of each output at its rate, but this state is determined in the load matrix by the driving voltage pulse and multiplex rate.

When operating in a write mode, the status of each of the output buffer memory locations or bits is established by addressing the particular output memory element, strobing it and writing a "1" or "0" into the addressed memory location. An output buffer memory location is addressed by the bits m11-m16 which are coupled from the counter 406 (FIG. 28) to the two bit, quad multiplexers 684 and 566. The bits $m$ 14 -$m$ 16 address one of the registers 710, 712 and 714 through a one of eight decoder 736. Outputs of this decoder are coupled to an input enable terminal of the registers. A particular memory location in a register is addressed by the bits $m$ 11 and $m$ 13 through the multiplexer 684. Data in the form of a logic "1" of "0" for entry into these registers is applied to input terminals D through the multiplexer 566. A strobe input pulse is applied through the multiplexer 566 to the decoder 736. When the strobe pulse occurs, the selected output of the decoder is energized and data is written into the registers. Both the data and strobe pulses are derived from the instruction decoder subsection (FIG. 27). Terminal 737 is coupled to and enables the other output registers, not shown.

The input buffer memory which comprises the 8 bit multiport registers 720, 722 and 724 as well as the third, fourth, fifth, and sixth registers which are not shown for the purpose of simplifying the drawings operates simultaneously or alternatively in a write mode and in a read mode. In the write mode, each input is scanned and is sampled, as described hereinbefore, for filtering against noise. The filtered information is then stored in the buffer memory storage locations which are being scanned simultaneously with the scan of the input matrix columns. As indicated, the machine inputs are arranged in a 4 × 8 matrix 332 (FIG. 25) to which the X axis driving voltage $X_0$, $X_1$, $X_2$ and $X_3$ are applied. Eight Y columns provide the inputs to the controller. Each machine input is thus connected to a row-column junction of this matrix. Each is coupled through a capacitor-diode input network 740 (FIG. 33) to one of two Y line receivers 742 and 744 of the receiver unit 344 (FIG. 25). These receivers provide level changing and filtering. The outputs of these receivers are coupled to a multiplexer 338 and are sequentially coupled to a noise/discriminator which is discussed in detail hereinafter. Noise free data in sequential form is coupled from an amplifier 746 to an input terminal 748 of the input buffer memory.

Address selection of those input buffer memory locations into which input data is entered in buffer registers 720, 722, and 724 is provided by binary output signals $I_0$, $I_1$, and $I_2$. These signals are coupled from a counter 750 (FIG. 33), described hereinafter to input terminals 752, 754 and 756 of the input buffer (FIG. 29). These signals are also applied to the input multiplexer 338 and thus provide for simultaneous scanning of the machine inputs and input buffer memory iocations. Strobing of these registers is provided by strobe signals $E_0$-$E_3$ which are derived from a decoder 758 (FIG. 33). These signal outputs are generated by the binary input signals RDI and RD0 and are conditioned upon an input signal from NAND gate 760 which is indicative of noise-free data input signals.

When operating in a read mode, the state of each input buffer is read by the controller. Reading of these states occurs only when the operating program requires an interrogation of the input. Addressing of the memory locations during read out is provided by the address-test field B7–B11 or by $m$ 11- $m$ 15 of the counter 406. When address selection is provided by the field B7–B11, then a particular memory location in each of the registers 720–724 is provided by bits B7–B9 which are applied to the C address input terminals of each of the registers. Selection of a particular one of the registers is provided by bits B10–B11 which are coupled to the multiplexer 524. These bits select one of a plurality of inputs which comprises outputs from the C output terminals of the registers. Output information from the multiplexer 524 is, as indicated, applied to the bus control multiplexer 420. This output comprises a pulse, the duration of which is determined by the presence of the field B7–B11 at inputs to the buffer, in turn determined by the instruction cycle.

Similarly, selection of a particular memory location in one of the registers 720–724 is provided by the bits $m$ 11-$m$ 13 which are coupled to B input terminals while selection of a particular register is provided by bits $m$ 14-$m$ 15, which are coupled to the multiplexer 530. The latter bits select one of a plurality of inputs which comprise outputs from the B output terminals of the registers.

Both input and output buffers are advantageously capable of simultaneous read/write operation. This improves the operating speed of the controller, allows the controller to operate asynchronously with the inputs and outputs and allows the outputs to be energized independently of control operation. Thus, the outputs may be driven in a DC manner or in the described time multiplex mode. Similarly, the inputs may be scanned, sampled and stored independently of control requirements.

DETAILED DESCRIPTION OF FREQUENCY DIVIDER AND NOISE DISCRIMINATOR

There is illustrated in FIG. 33 a more detailed arrangement of the frequency dividing means 344 and noise discriminator means 346 which were shown generally in FIG. 25. The clock pulse generator 342 comprises a conventional pulse generator which is adapted to generate a square waveform having a 2 us period as is illustrated in FIG. 32. The frequency divider 344 includes a 4 bit binary counter 770 which is stepped by pulses coupled from the master clock 342. Output signals at terminals $Q_0$, $Q_1$, $Q_2$, and $Q_3$ have time durations of 4, 8, 16, and 32 us, respectively. A 16 us output from the terminal $Q_2$ is applied to a Nand gate 772 along with a feedback signal from a dual J-K flip-flop 774. The output of the Nand gate is coupled to, and, steps a 4 bit binary counter 750. This stepping input comprises a 16 us pulse which recurs every 256 us. The recurring 16 us input pulses applied to the counter 750 provide at its terminals $Q_0$, $Q_1$, $Q_2$, and $Q_3$ square wave output signals having periods of 32, 64, 128, and 256 us durations, respectively. A 16 us terminal count output pulse recurring every 256 us is also provided at output terminal $T_c$. Signals $I_0$, $I_1$, and $I_2$ at output terminals $Q_1$, $Q_2$, and $Q_3$ of the counter 750 are applied to input terminals of the input buffer memory (FIG. 29) and to terminals of the input multiplexer 338. These signals simultaneously provide for multiplexer scanning of input data and address input registers for entry of this data into the input buffer memory. The 16 us terminal count output pulse from the counter 750 along with the 16 us pulse from the counter 770 are applied to a dual J-K flip-flop 774 for generating a 16 us plate which recurs each 256 us. This pulse is coupled from an output terminal of the flip-flop 774 to a second dual J-K flip-flop 734 which generates address signals RD 1 and RD 0. The address signals are applied to terminals 730 and 732 respectively of the output buffer memory for addressing memory locations in registers 710, 712, 714. As indicated hereinbefore, the signals RD 1 and RD 0 are also applied to decoders 735 and 758 for generating X drive signals $X_0$ — $X_3$ and for generating input buffer enabling signals $E_0$ — $E_3$ which enable data input to the input buffers.

The noise discriminator 346 of FIG. 25 is shown in FIG. 33 to include decoders 776 and 778, the outputs of which are coupled to an associated pair of 4 bit latches 780 and 782, respectively. Inputs to the latches is derived from the input matrix via a capacitor-diode network 740, the receivers 742 and 744, the multiplexer 338, and the decoders 776 and 778. The input signals from Y lines of the matrix are scanned sequentially by the multiplexer 338 at a 32 us rate. This multiplexed data is coupled to output terminals I and I. As indicated, the multiplexer scanning rate is provided by the signals $I_0$, $I_1$, and $I_2$. A logic "1" output is coupled from the terminal I to the decoder 776 and the complement is coupled from terminal I to the decoder 778. Each of the output terminals of the decoders is sequentially addressed at an 8 us rate by input binary signals at the decoder input terminals $A_0$ and $A_1$. These signals are derived from terminals $Q_1$ and $Q_2$ of counter 770. The decoder outputs are then coupled to input terminals of latches 780 and 782 and information is stored in memory locations associated with the input terminals of the latches. Since input information which is coupled to the decoders from the multiplexer terminals I and I is sequentially switched each 8 us, four samplings of each data input occurs during a 32 us scanning interval.

Each four input samples of input data are stored by the latches and in accordance with the noise discriminating characteristics of the arrangement, the latch outputs are applied to Nand gates 784 and 786 for coincidence detection. Simultaneous application of a logic "1" on each of the input lines to the Nand gate 784 and the simultaneous application of logic "0" at the input lines of the Nand gate 786 represents a valid logic "1" data input. The output of the Nand gate 784 is coupled to a data input terminal 785 of the input buffer (FIG. 29) through an inverting amplifier 746. At the same time, the outputs of the Nand gate 784 and 786 are applied to a Nand gate 788 which indicates the presence of a logic "1" or "0". Its output along with a 2 us input pulse from an inverting amplifier 790 is coupled to a Nand gate 760 for enabling the decoder 758. As indicated hereinbefore, the enabled decoder 758 provides output signals $E_0 - E_3$ for enabling the input buffer registers. A similar operation occurs when each of the inputs to the Nand gate 784 are logic "0" and each of the inputs to the Nand gate 786 are logic "1" since this indicates the occurrence of valid input information comprising a logic "0". When other than these conditions exist, then the Nand gate 788 inhibits the decoder 758 from generating the enabling pulses for the input register.

Support logic for the noise discriminator 346 includes means for resetting the latches 780 and 782. These latches are set by 2 us pulses occurring each 8 us which are derived from Nand gate 792. Inputs to this Nand gate are coupled from the 4 us terminal of the counter 770 via an inverting amplifier 794 and from the 8 us terminal of the counter 770 via an inverting amplifier 796. Enabling of the latches is provided by a 4 us pulse which occurs once every 32 us. This pulse is derived from the Nand gate 797 to which is applied 4, 8, 16, and 32 us inputs.

While various programs will be provided to satisfy the operating requirement of the particular copier apparatus, the following execution program which is stored in the ROM 400, sequence control program which is stored in the ROM 404 and processor control program which is stored in the ROM 538 are exemplary and are applicable for operation of a Xerox Corporation color copier model 6500. These programs are not deemed to limit the scope of the present invention.

| NO. | ADLM2 | AUXAD | M2 A,B,C ROMS IUST | BUS MX | LABEL | INST | BC | Sub Routine |
|---|---|---|---|---|---|---|---|---|
| 1 | 0 | 1110 | 1 | 001 | 1111 |  | LD0 | 15 |  |
| 2 | 1 | 1011 | 0 | 000 | 1101 | WARM-UP | LD1 | 13 |  |
| 3 | 2 | 0100 | 1 | 000 | 1101 | INTRLK | LD1 | 13 | Key Operator LAMP |
| 4 | 3 | 0010 | 0 | 110 | LOPAP | S04 | JNR | 4 |  |
| 5 | 4 | 0100 | 1 | 000 | 1001 | LOPAP | LD1 | 9 |  |
| 6 | 5 | 1110 | 1 | 111 | 1111 |  | JIR | 15 | LOW PAPER LAMP |
| 7 | 6 | 1110 | 1 | 001 | 1111 |  | LD0 | 15 |  |
| 8 | 7 | 1101 | 1 | 000 | 1101 | PROLEV | LD1 | 13 |  |
| 9 | 8 | 1110 | 1 | 111 | 1111 |  | JIR | 15 |  |
| 10 | 9 | 1110 | 1 | 001 | 1111 |  | LD0 | 15 |  |
| 11 | 10 | 1011 | 1 | 110 | 1100 | COLEN | JNR | 12 |  |
| 12 | 11 | 0100 | 1 | 110 | 1001 | LOPAP | JNR | 9 |  |
| 13 | 12 | 1110 | 1 | 000 | 1111 |  | LD1 | 15 |  |
| 14 | 13 | 1110 | 1 | 111 | 1111 |  | JIR | 15 |  |
| 15 | 14 | 0011 | 1 | 101 | 0100 | S07 | JSF | 4 |  |
| 16 | 15 | 0100 | 0 | 011 | 1011 | S08 | LDS | 11 |  |
| 17 | 16 | 1110 | 1 | 100 | 1111 |  | JRF | 15 |  |
| 18 | 17 | 1110 | 1 | 001 | 1111 |  | LD0 | 15 |  |
| 19 | 18 | 0100 | 1 | 000 | 1101 | INTRLK | LD1 | 13 |  |
| 20 | 19 | 0010 | 0 | 110 | 0100 | S04 | JNR | 4 |  |
| 21 | 20 | 0100 | 1 | 000 | 1001 | LOPAP | LD1 | 9 |  |
| 22 | 21 | 1110 | 1 | 111 | 1111 |  | JIR | 15 |  |
| 23 | 22 | 1000 | 0 | 101 | 1100 | B2 | JSF | 12 | COLOR SELECTION |
| 24 | 23 | 1011 | 0 | 101 | 1100 | WARM-UP | JSF | 12 |  |
| 25 | 24 | 0100 | 1 | 101 | 1001 | LOPAP | JSF | 9 |  |
| 26 | 25 | 0001 | 1 | 101 | 1101 | COL2BA | JSF | 13 |  |
| 27 | 26 | 0010 | 0 | 101 | 1101 | COL3BA | JSF | 13 |  |
| 28 | 27 | 0000 | 1 | 101 | 1101 | FCOLBA | JSF | 13 |  |
| 29 | 28 | 0001 | 0 | 010 | 1111 | COL1BA | LDA | 15 |  |
| 30 | 29 | 1110 | 1 | 000 | 1111 |  | LD1 | 15 |  |
| 31 | 30 | 1110 | 1 | 110 | 1111 |  | JNR | 15 |  |
| 32 | 31 | 1011 | 1 | 100 | 1101 | COLEN | JRF | 13 |  |
| 33 | 32 | 0001 | 0 | 001 | 1100 | COL1BA | LD0 | 12 |  |
| 34 | 33 | 0101 | 0 | 110 | 1000 | COL1BT | JNR | 8 |  |
| 35 | 34 | 1000 | 0 | 101 | 1100 | B2 | JSF | 12 |  |

-continued

| NO. | ADLM2 | AUXAD | M2 A,B,C ROMS IUST | BUS MX | LABEL | INST | BC | Sub Routine |
|---|---|---|---|---|---|---|---|---|
| 36 | 35 | 0001 | 1 010 | 1110 | COL2BA | LDA | 14 | |
| 37 | 36 | 0010 | 0 010 | 1110 | COL3BA | LDA | 14 | |
| 38 | 37 | 0000 | 1 010 | 1110 | FCOLBA | LDA | 14 | |
| 39 | 38 | 0001 | 0 010 | 1111 | COL1BA | LDA | 15 | |
| 40 | 39 | 1110 | 1 000 | 1111 | | LDI | 15 | |
| 41 | 40 | 1110 | 1 110 | 1111 | | JNR | 15 | |
| 42 | 41 | 1011 | 1 100 | 1101 | COLEN | JRF | 13 | |
| 43 | 42 | 0010 | 1 110 | 1101 | TWO COL | JNR | 13 | |
| 44 | 43 | 0001 | 0 010 | 1111 | COL1BA | LDA | 15 | |
| 45 | 44 | 1110 | 1 000 | 1111 | | LDI | 15 | |
| 46 | 45 | 0000 | 1 010 | 1110 | FCOLBA | LDA | 14 | |
| 47 | 46 | 0010 | 1 010 | 1111 | TWO COL | LDA | 15 | |
| 48 | 47 | 0001 | 1 110 | 1101 | COL2BA | JNR | 13 | |
| 49 | 48 | 0010 | 0 110 | 1101 | COL3BA | JNR | 13 | |
| 50 | 49 | 0010 | 1 010 | 1110 | TWO COL | LDA | 14 | |
| 51 | 50 | 1110 | 1 110 | 1111 | | JNR | 15 | |
| 52 | 51 | 1000 | 0 100 | 1101 | B2 | JRF | 13 | |
| 53 | 52 | 0101 | 0 110 | 0100 | S10 | JNR | 4 | |
| 54 | 53 | 0011 | 1 110 | 1100 | LSTCPY | JNR | 12 | |
| 55 | 54 | 0100 | 1 110 | 1001 | LOPAP | JNR | 9 | |
| 56 | 55 | 0001 | 1 010 | 1110 | COL2BA | LDA | 14 | |
| 57 | 56 | 0010 | 0 010 | 1110 | COL3BA | LDA | 14 | |
| 58 | 57 | 0000 | 1 010 | 1110 | FCOLBA | LDA | 14 | |
| 59 | 58 | 0001 | 0 010 | 1111 | COL1BA | LDA | 15 | |
| 60 | 59 | 1110 | 1 000 | 1111 | | LDI | 15 | |
| 61 | 60 | 1110 | 1 111 | 1111 | | JIR | 15 | |
| 62 | 61 | 0000 | 0 101 | 0100 | S00 | JSP | 4 | |
| 63 | 62 | 0000 | 1 011 | 1010 | S01 | LDS | 10 | |
| 64 | 63 | 1110 | 1 100 | 1111 | | JBF | 15 | |
| 65 | 64 | 0010 | 0 101 | 0100 | S04 | JSP | 4 | |
| 66 | 65 | 0011 | 0 011 | 1010 | S06 | LDS | 10 | |
| 67 | 66 | 1110 | 1 100 | 1111 | | JPF | 15 | |
| 68 | 67 | 0101 | 0 101 | 0100 | S10 | JSF | 4 | |
| 69 | 68 | 0110 | 0 011 | 1010 | S12 | LLS | 10 | |
| 70 | 69 | 1110 | 1 100 | 1010 | | JPP | 10 | |
| 71 | 70 | 1011 | 1 110 | 1100 | COLEN | JNR | 12 | |
| 72 | 71 | 0001 | 1 001 | 1100 | COL2BA | LDO | 12 | |
| 73 | 72 | 0101 | 1 110 | 1000 | COL2BT | JNR | 8 | |
| 74 | 73 | 1000 | 0 101 | 1100 | L2 | JSP | 12 | |
| 75 | 74 | 0001 | 0 010 | 1110 | COL1BA | LLA | 14 | |
| 76 | 75 | 0010 | 0 010 | 1110 | COL3BA | LLA | 14 | |
| 77 | 76 | 0000 | 1 010 | 1110 | FCOLBA | LDA | 14 | |
| 78 | 77 | 0001 | 1 010 | 1111 | COL2BA | LDA | 15 | |
| 79 | 78 | 1110 | 1 000 | 1111 | | LDI | 15 | |
| 80 | 79 | 1110 | 1 110 | 1111 | | JNF | 15 | |
| 81 | 80 | 0010 | 1 100 | 1100 | TWO COL | JNF | 12 | |
| 82 | 81 | 0001 | 1 010 | 1111 | COL2BA | LDA | 15 | |
| 83 | 82 | 1110 | 1 000 | 1111 | | LDI | 15 | |
| 84 | 83 | 0000 | 1 010 | 1110 | FCOLBA | LDA | 14 | |
| 85 | 84 | 0010 | 1 010 | 1111 | TWO COL | LDA | 15 | |
| 86 | 85 | 0001 | 0 110 | 1101 | COL1BA | JNR | 16 | |
| 87 | 86 | 0010 | 0 110 | 1101 | COL3BA | JNF | 18 | |
| 88 | 87 | 0010 | 1 010 | 1110 | TWO COL | LDA | 14 | |
| 89 | 88 | 1110 | 1 111 | 1111 | | JIR | 15 | |
| 90 | 89 | 1011 | 1 110 | 1100 | COLEN | JNR | 12 | |
| 91 | 90 | 0010 | 0 010 | 1110 | COL3BA | LDA | 14 | |
| 92 | 91 | 0110 | 0 110 | 1000 | COL3BT | JNR | 8 | |
| 93 | 92 | 1000 | 0 101 | 1100 | B2 | JSF | 12 | |
| 94 | 93 | 0001 | 0 010 | 1110 | COL1BA | LDA | 14 | |
| 95 | 94 | 0001 | 1 010 | 1110 | COL2BA | LDA | 14 | |
| 96 | 95 | 0000 | 1 010 | 1110 | FCOLBA | LDA | 14 | |
| 97 | 96 | 0010 | 0 010 | 1111 | COL3BA | LDA | 15 | |
| 98 | 97 | 1110 | 1 000 | 1111 | | LDI | 15 | |
| 99 | 98 | 1110 | 1 110 | 1111 | | JNR | 15 | |
| 100 | 99 | 0010 | 1 100 | 1100 | TWO COL | JRF | 12 | |
| 101 | 100 | 0010 | 0 010 | 1111 | COL3BA | LDA | 15 | |
| 102 | 101 | 1110 | 1 000 | 1111 | | LDI | 15 | |
| 103 | 102 | 0000 | 1 010 | 1110 | FCOLBA | LDA | 14 | |
| 104 | 103 | 0010 | 1 010 | 1111 | TWO COL | LDA | 15 | |
| 105 | 104 | 0001 | 0 110 | 1101 | COL1BA | JNR | 13 | |
| 106 | 105 | 0001 | 1 110 | 1101 | COL2BA | JNR | 13 | |
| 107 | 106 | 0010 | 1 010 | 1110 | TWO COL | LDA | 14 | |
| 108 | 107 | 1110 | 1 111 | 1111 | | JIR | 15 | |
| 109 | 108 | 1000 | 0 101 | 1101 | E2 | JSF | 13 | |
| 110 | 109 | 1011 | 0 101 | 1100 | WARM-UP | JSF | 12 | |
| 111 | 110 | 0100 | 1 101 | 1001 | LOPAP | JSF | 9 | |
| 112 | 111 | 0001 | 0 101 | 1101 | COL1BA | JSF | 13 | |
| 113 | 112 | 0001 | 1 101 | 1101 | COL2BA | JSF | 13 | |
| 114 | 113 | 0010 | 0 101 | 1101 | COL3BA | JSF | 13 | |
| 115 | 114 | 0000 | 1 010 | 1111 | FCOLBA | LDA | 15 | |
| 116 | 115 | 1110 | 1 000 | 1111 | | LDI | 15 | |

-continued

| NO. | ADLM2 | AUXAD | M2 A.B.C ROMS IUST | BUS MX | LABEL | INST | BC | Sub Routine |
|---|---|---|---|---|---|---|---|---|
| 117 | 116 | 1110 | 1 | 111 | 1111 | | JIR | 15 | |
| 118 | 117 | 1011 | 1 | 100 | 1101 | COLEN | JRF | 13 | |
| 119 | 118 | 0000 | 1 | 001 | 1100 | FCOLBA | LD0 | 12 | |
| 120 | 119 | 0110 | 1 | 110 | 1000 | FULCOL | JNR | 8 | |
| 121 | 120 | 0001 | 0 | 010 | 1110 | COL1BA | LDA | 14 | |
| 122 | 121 | 0001 | 1 | 010 | 1110 | COL2BA | LDA | 14 | |
| 123 | 122 | 0010 | 0 | 010 | 1110 | COL3BA | LDA | 14 | |
| 124 | 123 | 0000 | 1 | 010 | 1111 | FCOLBA | LDA | 15 | |
| 124 | 123 | 0000 | 1 | 010 | 1111 | FCOLBA | LDA | 15 | |
| 125 | 124 | 1110 | 1 | 000 | 1111 | | LDI | 15 | |
| 126 | 125 | 1110 | 1 | 110 | 1111 | | JNR | 15 | |
| 127 | 126 | 1000 | 0 | 100 | 1100 | B2 | JNF | 12 | |
| 128 | 127 | 0101 | 0 | 110 | 0100 | S10 | JNR | 4 | |
| 129 | 128 | 0011 | 1 | 110 | 1100 | LSTCTY | JNR | 12 | |
| 130 | 129 | 0100 | 1 | 110 | 1001 | LORAF | JNR | 9 | |
| 131 | 130 | 0000 | 1 | 010 | 1111 | FCOLBA | LDA | 15 | |
| 132 | 131 | 0001 | 0 | 010 | 1110 | COL1BA | LDA | 14 | |
| 133 | 132 | 0001 | 1 | 010 | 1110 | COL2BA | LDA | 14 | |
| 134 | 133 | 0010 | 0 | 010 | 1110 | COL3BA | LDA | 14 | |
| 135 | 134 | 1110 | 1 | 000 | 1111 | | LDI | 15 | |
| 136 | 135 | 1110 | 1 | 111 | 1111 | | JIR | 15 | |
| 137 | 136 | 1110 | 1 | 111 | 1111 | | JIR | 15 | COLOR SELECTION, END |
| 138 | 137 | 1110 | 1 | 001 | 1111 | | LD0 | 15 | |
| 139 | 138 | 0010 | 0 | 110 | 0100 | S04 | JNR | 4 | |
| 140 | 139 | 0100 | 1 | 000 | 1001 | LOPAP | LDI | 9 | |
| 141 | 140 | 1110 | 1 | 111 | 1111 | | JIR | 15 | |
| 142 | 141 | 1110 | 1 | 001 | 1111 | | LD0 | 15 | |
| 143 | 142 | 0000 | 0 | 101 | 1000 | FINL | JSF | 9 | |
| 144 | 143 | 0011 | 0 | 101 | 1000 | FUNC | JSF | 8 | |
| 145 | 144 | 0001 | 0 | 101 | 1000 | FUSLSO | JSF | 3 | |
| 146 | 145 | 1110 | 1 | 000 | 1111 | | LDI | 15 | |
| 147 | 146 | 1110 | 1 | 111 | 1111 | | JIR | 15 | |
| 148 | 147 | 1110 | 1 | 111 | 1111 | | JIR | 15 | |
| 149 | 148 | 1110 | 1 | 111 | 1111 | | JIR | 15 | |
| 150 | 149 | 1110 | 1 | 111 | 1111 | | JIR | 15 | |
| 151 | 150 | 0000 | 1 | 110 | 0100 | S01 | JNR | 4 | |
| 152 | 151 | 0001 | 0 | 011 | 1011 | S02 | LDS | 11 | |
| 153 | 152 | 1110 | 1 | 111 | 1111 | | JIR | 15 | |
| 154 | 153 | 1110 | 1 | 111 | 1111 | | JIR | 15 | |
| 155 | 154 | 1100 | 0 | 110 | 1100 | PRINTA | JNR | 12 | SCAN ENGINE |
| 156 | 155 | 0101 | 0 | 000 | 0111 | T10 | LDI | 7 | |
| 157 | 156 | 0111 | 1 | 001 | 0111 | T15 | LD0 | 7 | SOLENOID |
| 158 | 157 | 1110 | 1 | 111 | 1111 | | JIR | 15 | |
| 159 | 158 | 1010 | 0 | 110 | 1100 | FD | JNR | 12 | |
| 160 | 159 | 0000 | 1 | 110 | 1100 | FCOLBA | JNR | 12 | |
| 161 | 160 | 0000 | 1 | 000 | 0111 | T01 | LDI | 7 | |
| 162 | 161 | 0001 | 0 | 001 | 0111 | T02 | LD0 | 7 | |
| 163 | 162 | 1110 | 1 | 111 | 1111 | | JIR | 15 | |
| 164 | 163 | 0100 | 1 | 010 | 1010 | INTRLK | LDA | 10 | |
| 165 | 164 | 1010 | 0 | 110 | 1100 | FD | JNR | 12 | |
| 166 | 165 | 0000 | 1 | 110 | 1101 | FCOLBA | JNR | 13 | |
| 167 | 166 | 0010 | 1 | 110 | 1101 | TWO COL | JNR | 13 | |
| 168 | 167 | 0000 | 1 | 000 | 0111 | T01 | LDI | 7 | |
| 169 | 168 | 0001 | 0 | 001 | 0111 | T02 | LD0 | 7 | |
| 170 | 169 | 1110 | 1 | 111 | 1111 | | JIR | 15 | |
| 171 | 170 | 1110 | 1 | 111 | 1111 | | JIR | 15 | |
| 172 | 171 | 1110 | 1 | 111 | 1111 | | JIR | 15 | |
| 173 | 172 | 0011 | 1 | 110 | 0100 | S07 | JNR | 4 | |
| 174 | 173 | 0100 | 0 | 011 | 1011 | S08 | LDS | 11 | |
| 175 | 174 | 1110 | 1 | 111 | 1111 | | JIR | 15 | |
| 176 | 175 | 1110 | 1 | 111 | 1111 | | JIR | 15 | |
| 177 | 176 | 1110 | 1 | 111 | 1111 | | JIR | 15 | |
| 178 | 177 | 0100 | 0 | 010 | 1110 | STOP | LDA | 14 | |
| 179 | 178 | 1001 | 1 | 101 | 1100 | FC | JSF | 12 | |
| 180 | 179 | 0111 | 0 | 101 | 0110 | T14 | JSF | 6 | |
| 181 | 180 | 0100 | 0 | 010 | 1010 | STOP | LDA | 16 | |
| 182 | 181 | 1110 | 1 | 100 | 1111 | | JRF | 15 | |
| 183 | 182 | 1001 | 1 | 101 | 1100 | FC | JRF | 12 | |
| 184 | 183 | 1110 | 0 | 101 | 0110 | T28 | JSF | 6 | |
| 185 | 184 | 0100 | 0 | 010 | 1011 | STOP | LDA | 11 | |
| 186 | 185 | 1110 | 1 | 100 | 1111 | | JRF | 15 | |
| 187 | 186 | 0110 | 1 | 110 | 1100 | FCYC | JNF | 12 | |
| 188 | 187 | 0000 | 1 | 000 | 0111 | T01 | LDI | 7 | PAPER FEED CLUTCH |
| 189 | 188 | 0101 | 0 | 001 | 0111 | T11 | LD0 | 7 | COPY |
| 190 | 189 | 0000 | 1 | 101 | 0110 | T01 | JSF | 6 | COUNTER |
| 191 | 190 | 1000 | 1 | 010 | 1111 | PLOCOT | LDA | 15 | DISPLAY |
| 192 | 191 | 1110 | 1 | 100 | 1111 | | JRF | 15 | |
| 193 | 192 | 0001 | 0 | 101 | 0110 | T02 | JSF | 6 | |
| 194 | 193 | 1000 | 1 | 010 | 1110 | PROGOT | LDA | 14 | |
| 195 | 194 | 1110 | 1 | 111 | 1111 | | JIR | 15 | |
| 196 | 195 | 1010 | 0 | 101 | 1100 | FD | JSF | 12 | |
| 197 | 196 | 0000 | 1 | 101 | 0110 | T01 | JSF | 6 | |
| 198 | 197 | 0100 | 0 | 010 | 1010 | STOP | LDA | 10 | |
| 199 | 198 | 1110 | 1 | 100 | 1111 | | JRF | 15 | |
| 200 | 199 | 1010 | 0 | 101 | 1100 | FD | JSF | 12 | |
| 201 | 200 | 1100 | 1 | 101 | 0110 | T25 | JSF | 6 | |
| 202 | 201 | 0100 | 0 | 010 | 1011 | STOP | LDA | 11 | |
| 203 | 202 | 1110 | 1 | 100 | 1111 | | JRF | 15 | |
| 204 | 203 | 0110 | 1 | 110 | 1100 | FCYC | JNF | 12 | PAPER REGISTRATION |
| 205 | 204 | 1010 | 0 | 000 | 0111 | T20 | LDI | 7 | CLUTCH |

-continued

| NO | ADLM2 | AUXAD | M2 A,B,C ROMS IUST | BUS MX | LABEL | INST | BC | Sub Routine |
|---|---|---|---|---|---|---|---|---|
| 206 | 205 | 1111 | 0 | 001 | 0111 | T30 | LD0 | 7 | |
| 207 | 206 | 1110 | 1 | 111 | 1111 | | JIR | 15 | |
| 208 | 207 | 1010 | 0 | 101 | 1100 | FD | JSF | 12 | |
| 209 | 208 | 1101 | 0 | 101 | 0110 | T26 | JSF | 6 | |
| 210 | 209 | 0100 | 0 | 010 | 1010 | STOP | LDA | 10 | |
| 211 | 210 | 1110 | 1 | 100 | 1111 | | JRF | 15 | |
| 212 | 211 | 1010 | 1 | 101 | 1100 | FE | JSF | 12 | |
| 213 | 212 | 0110 | 0 | 101 | 0110 | T12 | JSF | 6 | |
| 214 | 213 | 0100 | 0 | 010 | 1011 | STOP | LDA | 11 | |
| 215 | 214 | 1110 | 1 | 100 | 1111 | | JRF | 15 | |
| 216 | 215 | 1110 | 1 | 001 | 1111 | | LD0 | 15 | |
| 217 | 216 | 1101 | 1 | 001 | 1000 | CLEAN | LD0 | 8 | |
| 218 | 217 | 1100 | 1 | 000 | 1101 | PRINTB | LDI | 13 | |
| 219 | 218 | 1110 | 1 | 111 | 1111 | | JIR | 15 | |
| 220 | 219 | 0001 | 0 | 101 | 0100 | S02 | JSF | 4 | |
| 221 | 220 | 0001 | 1 | 011 | 1011 | S03 | LDS | 11 | |
| 222 | 221 | 1110 | 1 | 111 | 1111 | | JIR | 15 | |
| 223 | 222 | 0110 | 1 | 101 | 1100 | FCYC | JSF | 12 | |
| 224 | 223 | 0101 | 0 | 000 | 0111 | T10 | LDI | 7 | |
| 225 | 224 | 1100 | 0 | 001 | 0111 | T24 | LD0 | 7 | GRIP SOLENOID |
| 226 | 225 | 1110 | 1 | 100 | 1111 | | JRF | 15 | |
| 227 | 226 | 0111 | 0 | 101 | 1100 | CCYC | JSF | 12 | |
| 228 | 227 | 1100 | 1 | 000 | 0111 | T25 | LDI | 7 | |
| 229 | 228 | 1110 | 1 | 100 | 1111 | | JRF | 15 | |
| 230 | 229 | 1001 | 1 | 101 | 1100 | FC | JSF | 12 | |
| 231 | 230 | 1100 | 0 | 001 | 0111 | T24 | LD0 | 7 | |
| 232 | 231 | 1110 | 1 | 111 | 1111 | | JIR | 15 | |
| 233 | 232 | 0000 | 0 | 010 | 1011 | ZCLOCK | LDA | 11 | |
| 234 | 233 | 0110 | 1 | 101 | 1100 | FCYC | JSF | 12 | |
| 235 | 234 | 0101 | 0 | 000 | 0111 | T10 | LDI | 7 | |
| 236 | 235 | 1100 | 0 | 001 | 0111 | T24 | LD0 | 7 | |
| 237 | 236 | 1110 | 1 | 100 | 1111 | | JRF | 15 | |
| 238 | 237 | 0111 | 0 | 101 | 1100 | CCYC | JSF | 12 | |
| 239 | 238 | 1100 | 1 | 000 | 0111 | T25 | LDI | 7 | |
| 240 | 239 | 1110 | 1 | 100 | 1111 | | JRF | 15 | |
| 241 | 240 | 1001 | 1 | 101 | 1100 | FC | JSF | 12 | |
| 242 | 241 | 1100 | 0 | 001 | 0111 | T24 | LD0 | 7 | |
| 243 | 242 | 1110 | 1 | 111 | 1111 | | JIR | 15 | |
| 244 | 243 | 1000 | 0 | 010 | 1011 | B2 | LDA | 11 | |
| 245 | 244 | 1110 | 1 | 111 | 1111 | | JIR | 15 | |
| 246 | 245 | 1100 | 0 | 110 | 1100 | PRINTA | JNF | 12 | |
| 247 | 246 | 0101 | 0 | 000 | 0111 | T10 | LDI | 7 | |
| 248 | 247 | 0111 | 1 | 001 | 0111 | T15 | LD0 | 7 | |
| 249 | 248 | 1110 | 1 | 111 | 1111 | | JIR | 15 | |
| 250 | 249 | 0110 | 0 | 110 | 1100 | 7A | JNR | 12 | CYAN FILTER |
| 251 | 250 | 0101 | 0 | 000 | 0111 | T10 | LDI | 7 | |
| 252 | 251 | 0111 | 1 | 001 | 0111 | T15 | LD0 | 7 | |
| 253 | 252 | 1110 | 1 | 111 | 1111 | | JIR | 15 | |
| 254 | 253 | 0100 | 0 | 101 | 1001 | LONC | JSF | 9 | CYAN DEVELOPER |
| 255 | 254 | 0011 | 1 | 001 | 0111 | T07 | LD0 | 7 | |
| 256 | 255 | 1110 | 1 | 100 | 1111 | | JRF | 15 | |
| 257 | 0 | 0110 | 0 | 001 | 0111 | T12 | LD0 | 7 | |
| 258 | 1 | 0110 | 0 | 110 | 1100 | 7A | JNF | 18 | |
| 259 | 2 | 1100 | 0 | 000 | 0111 | T24 | LDI | 7 | |
| 260 | 3 | 1110 | 1 | 111 | 1111 | | JIR | 15 | |
| 261 | 4 | 1010 | 1 | 001 | 0111 | T21 | LD0 | 7 | CYAN TRANSFER BIAS |
| 262 | 5 | 0110 | 0 | 110 | 1100 | 7A | JNR | 16 | |
| 263 | 6 | 1101 | 1 | 000 | 0111 | T27 | LDI | 7 | |
| 264 | 7 | 1110 | 1 | 111 | 1111 | | JIR | 15 | |
| 265 | 8 | 1110 | 1 | 111 | 1111 | | JIR | 15 | |
| 266 | 9 | 0101 | 0 | 110 | 1100 | 9A | JNR | 12 | MAGENTA FILTER |
| 267 | 10 | 0101 | 0 | 000 | 0111 | T10 | LDI | 7 | |
| 268 | 11 | 0111 | 1 | 001 | 0111 | T15 | LD0 | 7 | |
| 269 | 12 | 1110 | 1 | 111 | 1111 | | JIR | 15 | |
| 270 | 13 | 0100 | 0 | 101 | 1001 | LONG | JSF | 9 | MAGENTA DEVELOPER |
| 271 | 14 | 0010 | 0 | 001 | 0111 | T04 | LD0 | 7 | |
| 272 | 15 | 1110 | 1 | 100 | 1111 | | JRF | 15 | |
| 273 | 16 | 0100 | 0 | 001 | 0111 | T08 | LD0 | 7 | |
| 274 | 17 | 0101 | 0 | 110 | 1100 | 9A | JNR | 12 | |
| 275 | 18 | 1011 | 0 | 000 | 0111 | T22 | LDI | 7 | |
| 276 | 19 | 1110 | 1 | 111 | 1111 | | JIR | 15 | |
| 277 | 20 | 1010 | 1 | 001 | 0111 | T21 | LD0 | 7 | |
| 278 | 21 | 0101 | 0 | 110 | 1100 | 9A | JNF | 12 | MAGENTA TRANSFER BIAS |
| 279 | 22 | 1101 | 1 | 000 | 0111 | T27 | LDI | 7 | |
| 280 | 23 | 1110 | 1 | 111 | 1111 | | JIR | 15 | |
| 281 | 24 | 1110 | 1 | 111 | 1111 | | JIR | 15 | |
| 282 | 25 | 0101 | 1 | 110 | 1100 | 11A | JNR | 12 | YELLOW FILTER |
| 283 | 26 | 0101 | 0 | 000 | 0111 | T10 | LDI | 7 | |
| 284 | 27 | 0111 | 1 | 001 | 0111 | T15 | LD0 | 7 | |
| 285 | 28 | 1110 | 1 | 111 | 1111 | | JIR | 15 | |
| 286 | 29 | 0100 | 0 | 101 | 1001 | LONG | JSF | 9 | YELLOW DEVELOPER |
| 287 | 30 | 1110 | 0 | 001 | 0111 | T28 | LD0 | 7 | |
| 288 | 31 | 1110 | 1 | 100 | 1111 | | JRF | 15 | |
| 289 | 32 | 0001 | 1 | 001 | 0111 | T03 | LD0 | 7 | |
| 290 | 33 | 0101 | 1 | 110 | 1100 | 11A | JNR | 12 | |
| 291 | 34 | 1001 | 0 | 000 | 0111 | T18 | LDI | 7 | |
| 292 | 35 | 1110 | 1 | 111 | 1111 | | JIR | 15 | |
| 293 | 36 | 1010 | 1 | 001 | 0111 | T21 | LD0 | 7 | YELLOW TRANSFER BIAS |
| 294 | 37 | 0101 | 1 | 110 | 1100 | 11A | JNR | 12 | |
| 295 | 38 | 1101 | 1 | 000 | 0111 | T27 | LDI | 7 | |
| 296 | 39 | 1110 | 1 | 111 | 1111 | | JIR | 15 | |

-continued

| NO. | ADLM2 | AUXAD | M2 IUST | A,B,C ROMS BUS MX | LABEL | INST | BC | Sub Routine |
|---|---|---|---|---|---|---|---|---|
| 297 | 40 | 1110 | 1 | 111 | 1111 | | JIR | 15 | |
| 298 | 41 | 1110 | 1 | 111 | 1111 | | JIR | 15 | |
| 299 | 42 | 1110 | 1 | 111 | 1111 | | JIR | 15 | |
| 300 | 43 | 1110 | 1 | 111 | 1111 | | JIR | 15 | |
| 301 | 44 | 1101 | 0 | 001 | 1100 | NOLRV | LD0 | 12 | |
| 302 | 45 | 1101 | 0 | 000 | 1101 | NOLRV | LD1 | 13 | |
| 303 | 46 | 1110 | 1 | 111 | 1111 | | JIR | 15 | |
| 304 | 47 | 0100 | 0 | 101 | 1001 | LONG | JSF | 9 | |
| 305 | 48 | 1101 | 0 | 001 | 0111 | T26 | LD0 | 7 | |
| 306 | 49 | 1110 | 1 | 100 | 1111 | | JRF | 15 | |
| 307 | 50 | 1110 | 1 | 001 | 0111 | T29 | LD0 | 7 | |
| 308 | 51 | 1100 | 0 | 110 | 1100 | PRINTA | JNR | 12 | |
| 309 | 52 | 0101 | 0 | 000 | 0111 | T10 | LD1 | 7 | |
| 310 | 53 | 1110 | 1 | 111 | 1111 | | JIR | 15 | |
| 311 | 54 | 0111 | 0 | 101 | 1100 | CCYC | JSF | 12 | |
| 312 | 55 | 1110 | 1 | 000 | 0111 | T29 | LD1 | 7 | |
| 313 | 56 | 1110 | 1 | 100 | 1111 | | JRF | 15 | |
| 314 | 57 | 1001 | 1 | 110 | 1100 | FC | JNR | 12 | |
| 315 | 58 | 1011 | 1 | 001 | 0111 | T23 | LD0 | 7 | |
| 316 | 59 | 1110 | 1 | 111 | 1111 | | JIR | 15 | |
| 317 | 60 | 1101 | 1 | 001 | 1100 | PROLEV | LD0 | 12 | |
| 318 | 61 | 1101 | 1 | 000 | 1101 | PROLEV | LD1 | 13 | PROCESS DRIVE MOTOR |
| 319 | 62 | 1110 | 1 | 111 | 1111 | | JIR | 15 | |
| 320 | 63 | 1110 | 1 | 111 | 1111 | | JIR | 15 | |
| 321 | 64 | 1100 | 0 | 110 | 1100 | PRINTA | JNR | 12 | |
| 322 | 65 | 0111 | 0 | 001 | 0111 | T14 | LD0 | 7 | |
| 323 | 66 | 0100 | 0 | 101 | 1001 | LONG | JSF | 9 | |
| 324 | 67 | 1101 | 1 | 000 | 0111 | T27 | LD1 | 7 | |
| 325 | 68 | 1110 | 1 | 100 | 1111 | | JRF | 15 | |
| 326 | 69 | 1111 | 0 | 000 | 0111 | T30 | LD1 | 7 | |
| 327 | 70 | 1110 | 1 | 111 | 1111 | | JIR | 15 | |
| 328 | 71 | 1110 | 1 | 111 | 1111 | | JIR | 15 | |
| 329 | 72 | 1110 | 1 | 111 | 1111 | | JIR | 15 | |
| 330 | 73 | 0100 | 0 | 101 | 1001 | LONG | JSF | 9 | |
| 331 | 74 | 0000 | 1 | 001 | 0111 | T01 | LD0 | 7 | FUSER |
| 332 | 75 | 1110 | 1 | 100 | 1111 | | JRF | 15 | |
| 333 | 76 | 0011 | 0 | 001 | 0111 | T06 | LD0 | 7 | |
| 334 | 77 | 1001 | 1 | 110 | 1100 | FC | JNR | 12 | |
| 335 | 78 | 1000 | 1 | 000 | 0111 | T17 | LD1 | 7 | |
| 336 | 79 | 1110 | 1 | 111 | 1111 | | JIR | 15 | |
| 337 | 80 | 0011 | 1 | 010 | 1110 | LSTOPY | LDA | 14 | |
| 338 | 81 | 1001 | 1 | 110 | 1101 | FC | JNR | 13 | |
| 339 | 82 | 1010 | 0 | 110 | 1101 | FD | JNR | 13 | |
| 340 | 83 | 1010 | 1 | 110 | 1100 | FE | JNR | 12 | |
| 341 | 84 | 0011 | 1 | 010 | 1111 | LSTOPY | LDA | 15 | |
| 342 | 85 | 1110 | 1 | 111 | 1111 | | JIR | 15 | |
| 343 | 86 | 0001 | 1 | 101 | 0100 | S03 | JSF | 4 | |
| 344 | 87 | 1110 | 1 | 101 | 0110 | T29 | JSF | 6 | |
| 345 | 88 | 0010 | 0 | 011 | 1111 | S04 | LDS | 15 | |
| 346 | 89 | 1110 | 1 | 111 | 1111 | | JIR | 15 | |
| 347 | 90 | 0011 | 0 | 101 | 0100 | S06 | JSF | 4 | |
| 348 | 91 | 0000 | 0 | 101 | 1100 | ZCLOCK | JSF | 12 | |
| 349 | 92 | 0011 | 1 | 011 | 1111 | S07 | LDS | 15 | |
| 350 | 93 | 1110 | 1 | 111 | 1111 | | JIR | 15 | |
| 351 | 94 | 1111 | 1 | 110 | 0110 | T31 | JNR | 6 | PITCH COUNT INCREMENT |
| 352 | 95 | 0111 | 1 | 010 | 1111 | ZCLKA | LDA | 15 | |
| 353 | 96 | 1110 | 1 | 111 | 1111 | | JIR | 15 | |
| 354 | 97 | 0100 | 1 | 101 | 0100 | S09 | JSF | 4 | |
| 355 | 98 | 1010 | 1 | 101 | 0110 | T21 | JSF | 6 | |
| 356 | 99 | 0101 | 0 | 011 | 1111 | S10 | LDS | 15 | |
| 357 | 100 | 1110 | 1 | 111 | 1111 | | JIR | 15 | |
| 358 | 101 | 0101 | 0 | 101 | 0100 | S10 | JSF | 4 | |
| 359 | 102 | 0011 | 1 | 101 | 1100 | LSTOPY | JSF | 12 | |
| 360 | 103 | 1110 | 1 | 101 | 0110 | T29 | JSF | 6 | |
| 361 | 104 | 0010 | 0 | 011 | 1111 | S04 | LDS | 15 | |
| 362 | 105 | 1110 | 1 | 111 | 1111 | | JIR | 15 | |
| 363 | 106 | 0110 | 0 | 101 | 0100 | S12 | JSF | 4 | |
| 364 | 107 | 0000 | 0 | 101 | 1100 | ZCLOCK | JSF | 12 | |
| 365 | 108 | 0011 | 1 | 011 | 1111 | S07 | LDS | 15 | |
| 366 | 109 | 1110 | 1 | 111 | 1111 | | JIR | 15 | |
| 367 | 110 | 1001 | 0 | 110 | 1100 | JANIF | JNR | 12 | |
| 368 | 111 | 1110 | 1 | 101 | 1111 | | JSF | 15 | |
| 369 | 112 | 0100 | 1 | 100 | 1101 | INTRLK | JNF | 13 | |
| 370 | 113 | 0100 | 0 | 100 | 1101 | STOP | JNR | 13 | |
| 371 | 114 | 0000 | 0 | 011 | 1111 | S00 | LDS | 15 | |
| 372 | 115 | 1110 | 1 | 111 | 1111 | | JIR | 13 | |
| 373 | 116 | 1100 | 0 | 110 | 1100 | PRINTA | JNR | 12 | |
| 374 | 117 | 0000 | 0 | 110 | 1100 | ZCLOCK | JNR | 12 | COLOR MODE SEQUENCING |
| 375 | 118 | 0111 | 1 | 110 | 1100 | ZCLKA | JNR | 12 | |
| 376 | 119 | 1000 | 0 | 110 | 1101 | E2 | JNR | 13 | |
| 377 | 120 | 0000 | 1 | 110 | 1100 | FCOLBA | JNR | 12 | |
| 378 | 121 | 0111 | 1 | 010 | 1110 | ZCLKA | LDA | 14 | CYAN, MAGENTA YELLOW |
| 379 | 122 | 0101 | 1 | 101 | 1100 | 11A | JSF | 12 | |
| 380 | 123 | 0110 | 0 | 010 | 1111 | 7A | LDA | 15 | |
| 381 | 124 | 0111 | 0 | 010 | 1111 | CCYC | LDA | 15 | |
| 382 | 125 | 0101 | 1 | 010 | 1110 | 11A | LDA | 14 | |
| 383 | 126 | 1110 | 1 | 110 | 1111 | | JNF | 15 | |
| 384 | 127 | 0101 | 0 | 100 | 1101 | 9A | JNF | 13 | |
| 385 | 128 | 0101 | 1 | 010 | 1111 | 11A | LDA | 15 | |
| 386 | 129 | 0101 | 0 | 010 | 1110 | 9A | LDA | 14 | |
| 387 | 130 | 0110 | 1 | 010 | 1110 | FCYC | LDA | 14 | |

-continued

| NO | ADLM2 | AUXAD | IUST | M2 A,B,C ROMS BUS MX | LABEL | INST | BC | Sub Routine |
|---|---|---|---|---|---|---|---|---|
| 388 | 131 | 1110 | 1 | 110 | 1111 | | JNR | 15 | |
| 389 | 132 | 1110 | 1 | 100 | 1111 | | JRF | 15 | |
| 390 | 133 | 0110 | 0 | 010 | 1110 | 7A | LDA | 14 | |
| 391 | 134 | 0111 | 0 | 010 | 1110 | CCYC | LDA | 14 | |
| 392 | 135 | 0011 | 1 | 110 | 0100 | S07 | JNR | 4 | |
| 393 | 136 | 0101 | 0 | 010 | 1111 | 9A | LDA | 15 | |
| 394 | 137 | 0110 | 1 | 010 | 1111 | FCYC | LDA | 15 | |
| 395 | 138 | 1110 | 1 | 111 | 1111 | | JIR | 15 | |
| 396 | 139 | 0011 | 0 | 010 | 1110 | E2F | LDA | 14 | |
| 397 | 140 | 1000 | 0 | 101 | 1100 | E2 | JSF | 12 | |
| 398 | 141 | 0000 | 1 | 101 | 1100 | FCOLBA | JSF | 12 | |
| 399 | 142 | 0011 | 0 | 010 | 1111 | E2F | LDA | 15 | COLOR |
| 400 | 143 | 1110 | 1 | 100 | 1111 | | JRF | 15 | MODE |
| 401 | 144 | 1100 | 0 | 110 | 1100 | PRINTA | JNR | 12 | SEQUENCING |
| 402 | 145 | 0111 | 1 | 110 | 1100 | ZCLKA | JNR | 12 | |
| 403 | 146 | 0000 | 0 | 110 | 1100 | ZCLOCK | JNR | 12 | |
| 404 | 147 | 0011 | 0 | 101 | 1101 | E2F | JSF | 13 | RED, BLUE, BLACK |
| 405 | 148 | 0001 | 1 | 110 | 1100 | COL2BA | JNR | 12 | |
| 406 | 149 | 0010 | 0 | 110 | 1100 | COL3BA | JNR | 12 | |
| 407 | 150 | 1110 | 1 | 100 | 1111 | | JRF | 15 | |
| 408 | 151 | 0111 | 1 | 010 | 1110 | ZCLKA | LDA | 14 | |
| 409 | 152 | 0101 | 0 | 101 | 1100 | 9A | JSF | 12 | |
| 410 | 153 | 0101 | 1 | 010 | 1111 | 11A | LDA | 15 | |
| 411 | 154 | 0111 | 0 | 010 | 1111 | CCYC | LDA | 15 | |
| 412 | 155 | 0101 | 0 | 010 | 1110 | 9A | LDA | 14 | |
| 413 | 156 | 0110 | 1 | 010 | 1110 | FCYC | LDA | 14 | |
| 414 | 157 | 1110 | 1 | 110 | 1111 | | JNR | 15 | |
| 415 | 158 | 1110 | 1 | 100 | 1111 | | JRF | 15 | |
| 416 | 159 | 0101 | 1 | 010 | 1110 | 11A | LDA | 14 | |
| 417 | 160 | 0111 | 0 | 010 | 1110 | CCYC | LDA | 14 | |
| 418 | 161 | 0011 | 1 | 110 | 0100 | S07 | JNR | 4 | |
| 419 | 162 | 0101 | 0 | 010 | 1111 | 9A | LDA | 15 | |
| 420 | 163 | 0110 | 1 | 010 | 1111 | FCYC | LDA | 15 | |
| 421 | 164 | 1110 | 1 | 111 | 1111 | | JIR | 15 | |
| 422 | 165 | 1100 | 0 | 110 | 1100 | PRINTA | JNR | 12 | |
| 423 | 166 | 0111 | 1 | 110 | 1100 | ZCLKA | JNR | 12 | |
| 424 | 167 | 0000 | 0 | 110 | 1100 | ZCLOCK | JNR | 12 | |
| 425 | 168 | 0001 | 0 | 110 | 1100 | COL1BA | JNR | 12 | |
| 426 | 169 | 0010 | 0 | 110 | 1100 | COL3BA | JNR | 12 | |
| 427 | 170 | 0111 | 1 | 010 | 1110 | ZCLKA | LDA | 14 | |
| 428 | 171 | 0101 | 1 | 101 | 1100 | 11A | JSF | 12 | |
| 429 | 172 | 0110 | 0 | 010 | 1111 | 7A | LDA | 15 | |
| 430 | 173 | 0111 | 0 | 010 | 1111 | CCYC | LDA | 15 | |
| 431 | 174 | 0101 | 1 | 010 | 1110 | 11A | LDA | 14 | |
| 432 | 175 | 0110 | 1 | 010 | 1110 | FCYC | LDA | 14 | |
| 433 | 176 | 1110 | 1 | 110 | 1111 | | JNR | 15 | |
| 434 | 177 | 1110 | 1 | 100 | 1111 | | JRF | 15 | |
| 435 | 178 | 0110 | 0 | 010 | 1110 | 7A | LDA | 14 | |
| 436 | 179 | 0111 | 0 | 010 | 1110 | CCYC | LDA | 14 | |
| 437 | 180 | 0011 | 1 | 110 | 0100 | S07 | JNR | 4 | |
| 438 | 181 | 0101 | 1 | 010 | 1111 | 11A | LDA | 15 | |
| 439 | 182 | 0110 | 1 | 010 | 1111 | FCYC | LDA | 15 | |
| 440 | 183 | 1110 | 1 | 111 | 1111 | | JIR | 15 | |
| 441 | 184 | 1100 | 0 | 110 | 1100 | PRINTA | JNR | 12 | |
| 442 | 185 | 0000 | 0 | 110 | 1100 | ZCLOCK | JNR | 12 | |
| 443 | 186 | 0111 | 1 | 110 | 1100 | ZCLKA | JNR | 12 | |
| 444 | 187 | 0001 | 0 | 110 | 1100 | COL1BA | JNR | 12 | |
| 445 | 188 | 0001 | 1 | 110 | 1100 | COL2BA | JNF | 12 | |
| 446 | 189 | 0111 | 1 | 010 | 1110 | ZCLKA | LDA | 14 | |
| 447 | 190 | 0101 | 0 | 101 | 1100 | 9A | JSF | 12 | |
| 448 | 191 | 0110 | 0 | 010 | 1111 | 7A | LDA | 15 | |
| 449 | 192 | 0111 | 0 | 010 | 1111 | CCYC | LDA | 15 | |
| 450 | 193 | 0101 | 0 | 010 | 1110 | 9A | LDA | 14 | |
| 451 | 194 | 0110 | 1 | 010 | 1110 | FCYC | LDA | 14 | |
| 452 | 195 | 1110 | 1 | 110 | 1111 | | JNF | 15 | |
| 453 | 196 | 1110 | 1 | 100 | 1111 | | JRF | 15 | |
| 454 | 197 | 0110 | 0 | 010 | 1110 | 7A | LDA | 14 | |
| 455 | 198 | 0111 | 0 | 010 | 1110 | CCYC | LDA | 14 | |
| 456 | 199 | 0011 | 1 | 110 | 0100 | S07 | JNR | 4 | |
| 457 | 200 | 0101 | 0 | 010 | 1111 | 9A | LDA | 15 | |
| 458 | 201 | 0110 | 1 | 010 | 1111 | FCYC | LDA | 15 | |
| 459 | 202 | 1110 | 1 | 111 | 1111 | | JIR | 15 | |
| 460 | 203 | 0010 | 1 | 110 | 1101 | TWO COL | JNR | 13 | |
| 461 | 204 | 0001 | 1 | 110 | 1100 | COL2BA | JNR | 12 | |
| 462 | 205 | 0000 | 0 | 110 | 1100 | ZCLOCK | JNR | 12 | |
| 463 | 206 | 0011 | 1 | 101 | 0100 | S07 | JSF | 4 | |
| 464 | 207 | 0101 | 0 | 010 | 1111 | 9A | LDA | 15 | |
| 465 | 208 | 0110 | 1 | 010 | 1111 | FCYC | LDA | 15 | |
| 466 | 209 | 0111 | 0 | 010 | 1111 | CCYC | LDA | 15 | |
| 467 | 210 | 1110 | 1 | 110 | 1111 | | JNR | 15 | |
| 468 | 211 | 1110 | 1 | 100 | 1111 | | JRF | 15 | |
| 469 | 212 | 0101 | 0 | 010 | 1110 | 9A | LDA | 14 | |
| 470 | 213 | 0110 | 1 | 010 | 1110 | FCYC | LDA | 14 | |
| 471 | 214 | 0111 | 0 | 010 | 1110 | CCYC | LDA | 14 | |
| 472 | 215 | 1110 | 1 | 111 | 1111 | | JIR | 15 | |
| 473 | 216 | 0010 | 1 | 110 | 1101 | TWO COL | JNR | 13 | |
| 474 | 217 | 0010 | 0 | 110 | 1100 | COL3BA | JNR | 12 | |
| 475 | 218 | 0000 | 0 | 110 | 1100 | ZCLOCK | JNR | 12 | |
| 476 | 219 | 0011 | 1 | 101 | 0100 | S07 | JSF | 4 | |

-continued

| NO | ADLM2 | AUXAD | M2 IUST | A,B,C ROMS BUS MX | LABEL | INST | BC | Sub Routine |
|---|---|---|---|---|---|---|---|---|
| 477 | 220 | 0101 | 1 | 010 | 1111 | 11A | LDA | 15 |
| 478 | 221 | 0110 | 1 | 010 | 1111 | FCYC | LDA | 15 |
| 479 | 222 | 0111 | 0 | 010 | 1111 | CCYC | LDA | 15 |
| 480 | 223 | 1110 | 1 | 110 | 1111 | | JNR | 15 |
| 481 | 224 | 1110 | 1 | 100 | 1111 | | JNF | 15 |
| 482 | 225 | 0101 | 0 | 010 | 1110 | 9A | LDA | 14 |
| 483 | 226 | 0110 | 1 | 010 | 1110 | FCYC | LDA | 14 |
| 484 | 227 | 0111 | 0 | 010 | 1110 | CCYC | LDA | 14 |
| 485 | 228 | 1110 | 1 | 111 | 1111 | | JIR | 15 |
| 486 | 229 | 0001 | 0 | 110 | 1100 | COLIBA | JNR | 12 |
| 487 | 230 | 0010 | 1 | 110 | 1101 | TWO COL | JNF | 13 |
| 488 | 231 | 0000 | 0 | 110 | 1100 | FCLOCK | JNR | 12 |
| 489 | 232 | 0011 | 1 | 101 | 0100 | S07 | JSF | 4 |
| 490 | 233 | 0110 | 0 | 010 | 1111 | 7A | LDA | 1B |
| 491 | 234 | 0110 | 1 | 010 | 1111 | FCYC | LDA | 15 |
| 492 | 235 | 0111 | 0 | 010 | 1111 | CCYC | LDA | 15 |
| 493 | 236 | 1110 | 1 | 110 | 1111 | | JNR | 15 |
| 494 | 237 | 1110 | 1 | 100 | 1111 | | JNF | 15 |
| 495 | 238 | 0110 | 0 | 010 | 1110 | 7A | LDA | 14 |
| 496 | 239 | 0110 | 1 | 010 | 1110 | FCYC | LDA | 14 |
| 497 | 240 | 0111 | 0 | 010 | 1110 | CCYC | LDA | 14 |
| 498 | 241 | 1110 | 1 | 111 | 1111 | | JIR | 15 |
| 499 | 242 | 0011 | 1 | 101 | 0100 | S07 | JSF | 4 |
| 500 | 243 | 1110 | 0 | 101 | 1100 | COINO | JSF | 12 |
| 501 | 244 | 0100 | 0 | 011 | 1111 | S08 | LDS | 15 |
| 502 | 245 | 1110 | 1 | 111 | 1111 | | JIR | 15 |
| 503 | 246 | 0100 | 0 | 101 | 0100 | S03 | JSF | 4 |
| 504 | 247 | 0101 | 0 | 101 | 1101 | 9A | JSF | 13 |
| 505 | 248 | 0101 | 0 | 101 | 1101 | 11A | JSF | 13 |
| 506 | 249 | 0110 | 0 | 101 | 1101 | 7A | JSF | 13 |
| 507 | 250 | 0100 | 1 | 011 | 1111 | S09 | LDS | 15 |
| 508 | 251 | 1110 | 1 | 111 | 1111 | | JIR | 15 |

SEQUENCE CONTROL PROGRAM

| ADD | MHA | ML BSH MIE | I/C NAME | |
|---|---|---|---|---|
| 0 | 0000 | 0110 | WTFCPY | / |
| 1 | 0000 | 1001 | 1BYCFY | / |
| 2 | 0000 | 1110 | KRYOF | / |
| 3 | 0001 | 0110 | CSL7 | / |
| 4 | 0011 | 1101 | 9CSL | / |
| 5 | 0101 | 1001 | 11COL | / |
| 6 | 0110 | 1100 | FCOL | / |
| 7 | 1000 | 1000 | SPARE | / |
| 8 | 1000 | 1001 | PAPELS | / |
| 9 | 1000 | 1101 | SERCAL | / |
| 10 | 1001 | 0011 | SPARE | / |
| 11 | 1001 | 0100 | JANIST | / |
| 12 | 1001 | 0101 | JAM1RT | / |
| 13 | 1001 | 0110 | SPARE | / |
| 14 | 1001 | 1001 | SPARE | / |
| 15 | 1001 | 1010 | SCNCNT | / |
| 16 | 1001 | 1110 | COLCTY | / |
| 17 | 1010 | 0011 | FULCOL | / |
| 18 | 1010 | 1010 | SPARE | / |
| 19 | 1010 | 1011 | SPARE | / |
| 20 | 1010 | 1100 | SPARE | / |
| 21 | 1010 | 1111 | SPARE | / |
| 22 | 1011 | 0000 | SPARE | / |
| 23 | 1011 | 0001 | PAPFL | / |
| 24 | 1100 | 0011 | PAPREG | / |
| 25 | 1100 | 1111 | TEROL | / |
| 26 | 1101 | 1011 | SPARE | / |
| 27 | 1101 | 1110 | GRIP | / |
| 28 | 1110 | 1000 | GRIP | / |
| 29 | 1111 | 0011 | SPARE | / |
| 30 | 1111 | 0101 | SCANLN | / |
| 31 | 1111 | 1001 | FLTF7 | / |
| 32 | 1111 | 1101 | DEV7 | / |
| 33 | 0000 | 0100 | TRES7 | / |
| 34 | 0000 | 1000 | SPARE | / |
| 35 | 0000 | 1001 | FLTR9 | / |
| 36 | 0000 | 1101 | DLV9 | / |
| 37 | 0001 | 0100 | BS9 | / |
| 38 | 0001 | 1000 | SPARE | / |
| 39 | 0001 | 1001 | FLTERF | / |
| 40 | 0001 | 1101 | BEV11 | / |
| 41 | 0010 | 0100 | TRLS11 | / |
| 42 | 0010 | 1000 | SPARE | / |
| 43 | 0010 | 1001 | SPARE | / |
| 44 | 0010 | 1010 | SPARE | / |
| 45 | 0010 | 1011 | SPARE | / |
| 46 | 0010 | 1100 | MNLEV | / |
| 47 | 0010 | 1111 | ILLNOV | / |
| 48 | 0011 | 0110 | STKILM | / |

-continued
SEQUENCE CONTROL PROGRAM

| ADD | MHA | ML BSH MIE | I/C NAME | |
|---|---|---|---|---|
| 49 | 0011 | 1100 | PROLRV | / |
| 50 | 0011 | 1111 | SPARE | / |
| 51 | 0100 | 0000 | 11EISL | / |
| 52 | 0100 | 0111 | TRCL1F | / |
| 53 | 0100 | 1000 | FUSBY | / |
| 54 | 0100 | 1001 | FUSH1 | / |
| 55 | 0101 | 0000 | LSTCRY | / |
| 56 | 0101 | 0110 | TR1 | / |
| 57 | 0101 | 1010 | TR2 | / |
| 58 | 0101 | 1110 | ZCLKA | / |
| 59 | 0110 | 0001 | TR5 | / |
| 60 | 0110 | 0101 | TR6 | / |
| 61 | 0110 | 1010 | TR7 | / |
| 62 | 0110 | 1110 | TR8 | / |
| 63 | 0111 | 0100 | FCLCYC | / |
| 64 | 1000 | 1011 | B2FTYR | / |
| 65 | 1010 | 0101 | TY2CYC | / |
| 66 | 1011 | 1000 | TYSCYC | / |
| 67 | 1100 | 1011 | NAGCYC | / |
| 68 | 1101 | 1000 | YELCYC | / |
| 69 | 1110 | 0101 | CYNCYC | / |
| 70 | 1111 | 0010 | TR3 | / |
| 71 | 1111 | 0110 | TR4 | / |

INST. DECODE R. O. M.

| Mnemonic | Address | Outputs |
|---|---|---|
| | | 1 2 3 4 5 6 7 8 |
| LDO | 0 | 0 0 0 0 0 0 0 0 |
| LD1 | 1 | 0 0 1 0 0 0 0 0 |
| LDA | 2 | 1 1 0 0 1 0 0 0 |
| LDB | 3 | 1 1 0 1 0 0 0 0 |
| LDS | 4 | 1 1 0 1 1 0 0 0 |
| JSF | 5 | 1 1 0 0 0 0 1 0 |
| JNR | 6 | 0 0 0 1 1 0 0 0 |
| JIR | 7 | 1 0 0 0 0 0 0 0 |
| | 8 | |
| | 9 | |
| | 10 | |
| | 11 | |
| | 12 | |
| | 13 | |
| | 14 | |
| | 15 | |

-continued

INST. DECODE R.O.M.

| Mnemonic | Address | Outputs |
|----------|---------|---------|
| L D O | 16 | 1 0 0 0 0 0 0 0 |
| L D I | 17 | 1 0 1 0 0 0 0 0 |
| L D A | 18 | 0 1 0 0 1 0 0 0 |
| L D B | 19 | 0 1 0 1 0 0 0 0 |
| L D S | 20 | 0 1 0 1 1 0 0 0 |
| J S F | 21 | 0 1 0 0 0 0 0 1 |
| J N R | 22 | 1 0 0 1 1 0 0 0 |
| J I R | 23 | 1 0 0 0 0 0 0 0 |
|   | 24 |   |
|   | 25 |   |
|   | 26 |   |
|   | 27 |   |
|   | 28 |   |
|   | 29 |   |
|   | 30 |   |
|   | 31 |   |

The above program lists the instruction words and their associated addresses which are contained in the ROM 538 (FIG. 27). ROM 538 contains 32 memory locations, and the above program occupies sixteen of these locations. The program includes three columns labeled mnemonic, address and output. The mnemonic is the instruction mnemonic. For each instruction mnemonic there are addresses to two memory locations in the decode READ only memory. One of the addresses is derived directly from the three bits of the field B4-B6 of the execution instruction in the ROM 400. The second address is provided by the addition of this field with the state of the output of the bus control multiplexer 420.

The third column lists the output of the decode READ only memory 538 and is arranged in eight columns, each of which lists one BIT of the eight bit output of this memory. For each address there is one word in the memory and the way that word is programmed determines the execution of the instruction. Each output bit of this READ only memory is wired to a particular portion of the control circuitry which for examle, enables the counter, enables the state register, or an auxiliary memory load or the setting or resetting of the instruction. Skip flip-flop, for example, column 1 shows BIT one of the output of this READ only memory which is programmed as a one only in the words of this instruction which correspond to addresses which correspond to mnemonics. When a first counter that addresses the READ only memory 404, is enabled to be incremented to the next address. Another example shows that columns 7 and 8 of the decode READ only memory are arranged so that on execution of the JSF/JRF instruction the instruction skip flip-flop is set or reset. For instance when these two bits are programmed as states of 1 and 0 respectively and the instruction associated with this address (JSF) is executed the instruction skip flip-flop is set, correspondingly when these columns are programmed to 0 and 1 respectively and the instruction JRF is executed the instruction skip flip-flop is reset.

The controller, which is described in detail with respect to FIGS. 25 - 33, is implemented in a particular arrangement by use of the following commercially available components. Appropriate terminal connections are indicated in these figures. The designation of these components is not deemed to limit the invention in any respect.

A. TTL/MSI 1. 9300, 4-bit universal shift register, *1 414
2. 9309, dual 4-bit multiplexer, *1 524, 530, 694, 696
3. 9308, dual 4-bit latch, *1 693
4. 9312, single 8-bit input digital multiplexer, *1 338
5. 9314, 4-bit latch, *1 691, 780, 782
6. 9316, 4-bit binary counter, *1 750, 770
7. 9321, dual one of four decoder, *1 558, 584, 735, 758, 776, 778
8. 9322, quad 2-bit multiplexer, *1 556, 566, 684, 688, 692
9. 9324, 5-bit comparator, *1 504, 514, 518
10. 9334, 8-bit addressable latch, *1 677
11. 9338, 8-bit multiport register, *1 710, 712, 714, 720, 722, 724
12. 9366, 4-bit up/down counters, *1 519, 520, 656, 658, 660, 664, 666, 690
13. 74150, 16-bit multiplexer, *1 420

B. TTL/SSI, DTL 1. 74107, dual J-K flip-flop, *1 560, 574, 604, 734, 774
2. 7400, quad two input NAND gate, *1 505, 507, 568, 576, 585, 587, 592, 602, 608, 609, 612, 760, 772, 788, 792
3. 7404, hex inverter, *1 516, 522, 536, 582, 594, 596, 598, 600, 606, 607, 610, 691, 746, 790, 794, 796
4. 7413, dual NAND Schmitt trigger, *1 784, 786, 797

C. Read/Write Memory (RAM)

1. SN74200, 256 × 1 RAM, *2 675
2. SN7489, 16 × 4 RAM, *2 412

D. Ready Only Memories (ROM)

1. SN54/74187, 256 × 8 ROM, two units, each 256 × 4 bits *2 404
2. SN54/74187, 512 × 12 ROM, two units, each 256 × 4 bits *2 650, 652, 654
3. SN54/7488, 32 × 8 ROM, *2 538

E. Receivers

1. MC1489L, quad MDTL line receivers, *3 742, 744

*1 Manufactured by: Fairchild Semiconductor 464 Ellis Street Mountain View, California 94040
*2 Manufactured by: Texas Instruments Dallas, Texas
*3 Manufactured by: Motorola Semiconductor Products Phoenix, Arizona

SUMMARY

An improved copier apparatus control means has been described which comprises a digital processor adapted for storing and executing a stored apparatus control program. The apparatus features a logical organization of the processor which is relatively simplified by employing non-destructive memory program storage means and control of the apparatus is programmable by altering the program through substitution of the non-destructive memory means. The processor is relatively simple, compact and inexpensive by virtue of its use of a micro-programmed control wherein a second nondestructive memory is provided for effecting control of the processor in accordance with a programmed sequence stored in this second memory.

The processor is further advantageous in that it features reduced storage requirements of the memory means of the processor by providing for the simultaneous addressing of memory storage elements in an input information buffer and in an output data buffer for the controller. In addition, the speed of operation of the controller is enhanced and assynchronous operation of the controller with respect to an input output interface is provided by simultaneously reading and writing in the input and output memory buffers of the interface.

While various particular features of the invention have been described, it will be apparent to those skilled in the art that modifications may be made thereto without departing from the spirit of the invention and the scope of the appended claims.

What is claimed is:

1. A processor for controlling an apparatus by actuating elements of said apparatus in accordance with a predetermined program and in response to apparatus condition indicators comprising:
   a first non-destructive memory which stores an operational program including a multiplicity of instructions at predetermined locations for control of said apparatus;
   memory control means, including a second non-destructive memory coupled to said first non-destructive memory, for controlling a sequence of execution of program instructions stored in the first memory;
   a buffer memory interface for storing input data to said processor and for storing output data from said processor, said memory control means arranged for simultaneously addressing a memory location in said first memory and at least one location in said buffer memory interface; and,
   means for decoding a first memory instruction which is extracted from said first memory and for causing an execution of said first memory instruction as determined by an operation code of said instruction.

2. The process of claim 1 wherein said memory control means provides for addressing a input data buffer memory interface location and an output data buffer memory interface location.

3. The processor of claim 2 wherein said first non-destructive memory includes instructions having stored data word having an address test field and wherein means are provided for directly addressing said input buffer interface location with said address test field.

4. The processor of claim 2 wherein said buffer memory interface includes an address port means, said input data buffer interface locations and said output data buffer interface locations being addressed by said memory control means through said address port means.

5. The processor of claim 2 including an auxiliary register, means for introducing data into said register, a comparator means, means for applying an address-test field of an addressed instruction word in said first memory and the contents of said register to said comparator for comparing information therein, and means for generating a control signal for use by said processor in accordance with the comparison.

6. The processor of claim 3 wherein said apparatus has a plurality of distinct operational states and data is entered into said input buffer memory locations which is indicative of the state of operation of the apparatus.

7. The process of claim 1 wherein said memory control means includes a counter for sequentially addressing the memory locations in said second memory, and means for coupling said counter to said buffer memory interface for simultaneously addressing said input buffer memory locations and output buffer memory locations.

8. The processor of claim 6 including an auxiliary read/write memory, means coupling an address test field to said auxiliary memory for addressing a memory location in said auxiliary memory and means for introducing data to said addressed auxiliary memory location.

9. The processor of claim 8 including a second auxiliary memory, means for coupling said first non-destructive memory to said second auxiliary memory for addressing said second auxiliary memory at a memory location for an introduction of data thereto, and means for coupling said address test field to said second auxiliary memory at an addressed location.

* * * * *